US009630310B2

United States Patent
Ito et al.

(10) Patent No.: US 9,630,310 B2
(45) Date of Patent: Apr. 25, 2017

(54) ELECTRIC TOOL

(71) Applicant: MAKITA CORPORATION, Anjo-shi, Aichi (JP)

(72) Inventors: Miyabi Ito, Anjo (JP); Ryunosuke Kumagai, Anjo (JP); Shin Sugiura, Anjo (JP); Akira Mizutani, Anjo (JP); Takahiro Kawakami, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 0 days.

(21) Appl. No.: 14/807,291

(22) Filed: Jul. 23, 2015

(65) Prior Publication Data

US 2015/0328763 A1    Nov. 19, 2015

Related U.S. Application Data

(63) Continuation of application No. PCT/JP2013/084841, filed on Dec. 26, 2013, and a
(Continued)

(30) Foreign Application Priority Data

Feb. 1, 2013 (JP) .................................. 2013-018868
Feb. 1, 2013 (JP) .................................. 2013-018881

(51) Int. Cl.
*B25F 5/02* (2006.01)
*B24B 23/00* (2006.01)
*H02J 7/00* (2006.01)

(52) U.S. Cl.
CPC .................. *B25F 5/02* (2013.01); *H02J 7/00* (2013.01); *H02J 7/0045* (2013.01); *H02J 7/0063* (2013.01)

(58) Field of Classification Search
CPC ... B25F 5/02; H02J 7/00; H02J 7/0045; H02J 7/0063; B24B 23/02; B24B 55/102; B24B 23/028; B24B 45/006; B24B 23/026
(Continued)

(56) References Cited

U.S. PATENT DOCUMENTS 4,084,123 A    4/1978  Lineback et al.
4,757,566 A *  7/1988  Field ................... A47L 11/4011
                                                        15/320
(Continued)

FOREIGN PATENT DOCUMENTS

JP    2004-034197 A    2/2004
JP    2008-173712 A    7/2008
(Continued)

OTHER PUBLICATIONS

Jul. 5, 2016 Office Action issued in Japanese Patent Application No. 2013-018881.
(Continued)

*Primary Examiner* — George Nguyen
(74) *Attorney, Agent, or Firm* — Oliff PLC

(57) ABSTRACT

An electric tool, such as an angle driver, has a main tool body with a front portion and a rear portion positioned opposite to the front portion. The main tool body houses a motor configured to receive electricity to function as a drive source. A gear head is coupled with the front portion of the main tool body wherein the gear head has a spindle in communication with a motor axis of the motor via mesh-engagement of bevel gears associated with the motor axis. The spindle has with a cutter tool accessory attached thereto such that rotation of the motor axis produces a commensurate rotation of the cutter tool accessory. Battery attachment portions are associated with the rear portion of the main tool
(Continued)

body and are configured to receive a corresponding set of batteries that provide electricity to power the motor.

22 Claims, 64 Drawing Sheets

Related U.S. Application Data continuation of application No. PCT/JP2013/082964, filed on Dec. 9, 2013.

(58) Field of Classification Search
USPC .......................................................... 451/359
See application file for complete search history.

(56) References Cited

U.S. PATENT DOCUMENTS

| | | | | |
|---|---|---|---|---|
| 5,028,858 | A * | 7/1991 | Schnizler | B23B 45/02 320/136 |
| 6,248,007 | B1 * | 6/2001 | deBlois | A46B 13/008 264/328.1 |
| 8,984,711 | B2 * | 3/2015 | Ota | H01M 2/10 15/339 |
| 2002/0175648 | A1 * | 11/2002 | Erko | A47L 11/14 318/560 |
| 2007/0218818 | A1 * | 9/2007 | Schwaiger | B24B 3/00 451/359 |
| 2007/0257638 | A1 * | 11/2007 | Amend | B25F 5/02 320/112 |
| 2008/0315693 | A1 | 12/2008 | Uchida | |
| 2011/0147031 | A1 * | 6/2011 | Matthias | B25F 5/02 173/217 |
| 2011/0198103 | A1 * | 8/2011 | Suzuki | B25F 5/00 173/46 |
| 2012/0037385 | A1 * | 2/2012 | Suzuki | B25F 5/02 173/2 |
| 2012/0045976 | A1 * | 2/2012 | Roser | B24B 23/00 451/358 |
| 2012/0071066 | A1 * | 3/2012 | Banchio | B24B 23/02 451/359 |
| 2012/0139456 | A1 | 6/2012 | Takano et al. | |
| 2012/0165152 | A1 * | 6/2012 | Tokunaga | B23D 47/12 475/159 |
| 2012/0252328 | A1 | 10/2012 | Muto et al. | |
| 2013/0165027 | A1 * | 6/2013 | Sugita | B24B 23/00 451/357 |

FOREIGN PATENT DOCUMENTS

| | | |
|---|---|---|
| JP | 2009-090434 A | 4/2009 |
| JP | 2010-173042 A | 8/2010 |
| JP | 2011-045975 A | 3/2011 |
| JP | 2011-092178 A | 5/2011 |
| JP | 2011-161603 A | 8/2011 |
| JP | 2011-526217 A | 10/2011 |
| JP | 2012-213820 A | 11/2012 |
| WO | 2012/005159 A1 | 1/2012 |

OTHER PUBLICATIONS

Sep. 6, 2016 Office Action issued in Japanese Patent Application No. 2013-018868.
Sep. 27, 2016 Office Action issued in Japanese Patent Application No. 2013-018881.
Feb. 18, 2014 Search Report issued in International Patent Application No. PCT/JP2013/082964.
Feb. 18, 2014 Search Report issued in International Patent Application No. PCT/JP2013/084841.

* cited by examiner

ELECTRIC TOOL

CROSS-REFERENCE TO RELATED APPLICATIONS

The present application is a continuation application based on, and claims priority to, PCT Application No. PCT/JP2013/082964, filed Dec. 9, 2013, which claims priority to Japanese Patent Application No. 2013-018881, filed Feb. 1, 2013, and PCT Application No. PCT/JP2013/084841, filed Dec. 26, 2013, which claims priority to Japanese Patent Application No. 2013-018868, filed Feb. 1, 2013, all of which are incorporated herein in their entireties by reference.

TECHNICAL FIELD

The present invention generally relates to a hand-held electric tool such as an electric drill, i.e. an angle drill used for various types of drilling operations, and/or a disc grinder, which may be adapted to grind and/or machine a surface to produce a desired effect. More particularly, the present invention may include various embodiments directed to the attachment and/or coupling of one or more batteries adapted to engage with the electric tool such that the electric tool may be easily maneuvered by hand during operation.

BACKGROUND ART

An electric tool, generally referred to in the art as an angle drill, may include a main tool body with a cylindrical motor housing that houses an electric motor configured to operate as a drive source. Further, the cylindrical motor housing may also include a grip portion for the convenience of a user and/or an operator, who may grasp the grip to operate the angle drill by hand. A gear head may be provided at a front end of the main tool body and provide structural support to a spindle to allow the spindle to rotate about an axis that is positioned orthogonal to (i.e. crossing and/or intersecting) a motor axis. In detail, the spindle may mesh and/or engage with bevel gears associated with the motor axis to rotate as needed. Further, a specific type of cutter tool accessory, such as a drill bit, may attach to the electric tool via connection to a chuck located at a distal end of the spindle. As discussed here, the electric tool may be hand-held, and may be manufactured to be compact in height, i.e., in an axial direction of the spindle shaft, to be well suited for cases where drilling operation, screw tightening operation and/or the like must conducted in limited space. Moreover, a technique related to fabricating and/or using such an angle drill as described above may be generally disclosed in Japanese Laid-Open Patent Publication No. 2004-34197.

The angle drill, in recent years, has developed to become cordless, and may be configured to use a rechargeable battery as a power source, similar to other electric tools such as a battery-powered electric screwdriver. The battery may have an output voltage adapted to correspond with a rated voltage of an electric motor included in the main tool body of the angle drill and/or electric tool, where the electric motor may provide power as a drive source as discussed earlier. Accordingly, a battery with an output voltage of 36V may be selected for use in conjunction with an electric motor with an identical rated voltage of 36V.

SUMMARY

Although 36V batteries may be desirable to power specific appliances demanding such a voltage, for example, such 36V batteries often cost more to produce and sell than other, more commonly available batteries with lower output voltage ratings. For example, an 18V may be applied to a larger variety of electric-powered portable industrial tools than a 36V battery. Also, a power tool user, such as an operator, may be more likely to have access to 18V batteries, rather than the relatively rarer 36V batteries, for example, the power tool user possesses a plurality of the 18V battery as spare batteries or the like.

An objective of the present invention is to enhance general usability of an electric tool while reducing the associated battery cost for the same by, for example, configuring the electric tool, such as an angle drill and/or a disc grinder, to accept multiple 18V batteries to provide similar results as a traditional angle drill and/or a disc grinder requiring, for example, a single 36V battery power source.

The electric tool of the present invention may include a main tool body that contains an electric motor configured to operate as a drive source. A gear head may be connected to a front of the main tool body and have a spindle with a cutter tool accessory attached thereto. In detail, the cutter tool accessory may be attached to the spindle so as to freely rotate about an axis that is positioned orthogonal to a motor axis. The spindle may mesh and/or engage with bevel gears associated with the motor axis of the electric motor such that rotation of the motor axis may translate to a commensurate rotation of the spindle. Further, a plurality of battery attachment portions, i.e. to which batteries may attach to, as a power source, may be provided at a rear of the main tool body.

In accordance with an embodiment of the present invention, an electric tool may be powered by an electric motor of a rated voltage that corresponds to a sum total of voltages of the batteries attached to the plurality of battery attachment portions. For instance, a 36V specification electric tool with an electric motor of a rated voltage of 36V as a drive source may be driven by attaching two separate 18V batteries (which produce a combined output voltage of 36V).

As described above, an electric tool of a 36V specification may be used with two 18V batteries that a user may have as spare batteries, thus avoiding the need to obtain a single, dedicated 36V battery. Thus, an electric tool of higher output, i.e. 36V, may be used with readily accessibly 18V batteries, thus potentially reducing the costs associated with purchasing the often rarer, and more expensive, 36V battery. As a result, the convenience and/or usability of a high-output electric tool may be enhanced.

In an embodiment, an electric tool has two battery attachment portions, each battery attachment portion directed to receive and/or connect with a corresponding battery, i.e. and 18V battery. Thus, as disclosed here, an electric tool of a high-output specification may have an electric motor as a drive source, where the electric motor may be configured to accept a rated voltage double the output voltage of the batteries.

In an embodiment, an electric tool has a plurality of battery attachment portions, to which batteries may be attached, such that the longitudinal direction of the plurality of battery attachment portions extends vertically along a spindle axis. The batteries may be attached to and/or detached from the plurality of battery attachment portions by sliding the batteries vertically into their corresponding battery attachment portions. Further, since the batteries may be attached in a lengthwise fashion with their longitudinal direction oriented vertically, the electric tool may be relatively compact when viewed in a width-wise direction.

In an embodiment, an electric tool to which batteries may attach, has a plurality of battery attachment portions allowing for batteries to be arranged side-by-side with respect to a motor axis. Since the batteries may be attached side-by-side with their longitudinal direction being vertical, the electric tool may be relatively compact in the vertical direction when compared to an instance where batteries are arranged vertically and side-by-side.

In an embodiment, an electric tool has a plurality of battery attachment portions to which batteries can be attached to and detached from by sliding the batteries in a vertical direction along a spindle axis. The batteries may be easily attached to and detached from the battery attachment portions. In this respect, the electric tool may satisfy needs associated with general operability and usability.

In an embodiment, an electric tool has a plurality of battery attachment portions to which batteries may attach. The plurality of battery attachment portions may have attachment surfaces oriented to face each other. Thus, batteries may be attached to the plurality of battery attachment portions in various orientations, i.e. horizontally and/or vertically. Such battery attachment flexibility as provided by the plurality of battery attachment portions may enhance operability and/or usability regarding attachment and detachment of the batteries to their corresponding battery attachment portions.

In an embodiment, the electric tool in accordance with the present invention may include various means, such as two battery attachment portions to which rechargeable batteries may be attached through sliding, an electric motor configured to rotate a motor shaft by electric power supplied from the rechargeable batteries, and a tool accessory retaining portion driven by, for example, operation of the motor shaft. The two battery attachment portions may be respectively arranged on a housing that forms an exterior member in symmetry with respect to an axis of the motor shaft.

Given that the electric power tool of the above-described embodiment includes two battery attachment portions, two rechargeable batteries may be inserted into their corresponding battery attachment portions to thus be attached to the electric power tool. In such a configuration as described here, power supplied to electric power tool may have a relatively high voltage and/or large supply capacitance when necessary and/or desirable. As described earlier in connection with the electric tool in accordance with the first embodiment, the two battery attachment portions may be respectively arranged on the housing that forms the exterior member in symmetry and/or alignment with respect to, for example, a central axis of the motor shaft. This may achieve a balance in weight increased through the attached rechargeable batteries. Such an arrangement and/or configuration of the batteries on the housing as described here, i.e. in sequence and/or in parallel, may allow for uniform weight distribution across the central axis of the motor shaft of the disc grinder, and thus suppress and/or reduce deterioration in the maneuverability of the electric tool, while held in hand of an operator and used to machine, for example, a surface.

In accordance with an embodiment of the present invention, an electric tool may include two battery attachment portions to which rechargeable batteries may be attached through sliding, an electric motor configured to rotate a motor shaft by electric power supplied from the rechargeable batteries, and a tool accessory retaining portion driven by the motor shaft. The battery attachment portions are provided on a motor housing configured to support the electric motor.

In accordance with an embodiment of the present invention, an electric tool may include two battery attachment portions to which rechargeable batteries may be attached through sliding, an electric motor configured to rotate a motor shaft by electric power supplied from the rechargeable batteries, and a tool accessory retaining portion driven by the motor shaft. Two battery attachment portions are provided on a housing constituting an exterior member such that axes along which the rechargeable batteries are attached through sliding may be positioned in parallel with each other.

In accordance with an embodiment of the present invention, an electric tool may include two battery attachment portions to which rechargeable batteries may be attached through sliding, an electric motor rotating a motor shaft by electric power supplied from the rechargeable batteries, and a tool accessory retaining portion driven by the motor shaft. The housing constituting the exterior member may include a handle portion generally formed in a loop configuration. The battery attachment portions are provided with respect to a part of the loop configuration.

DETAILED DESCRIPTION OF THE PRESENTLY PREFERRED EMBODIMENTS

Figure 1:
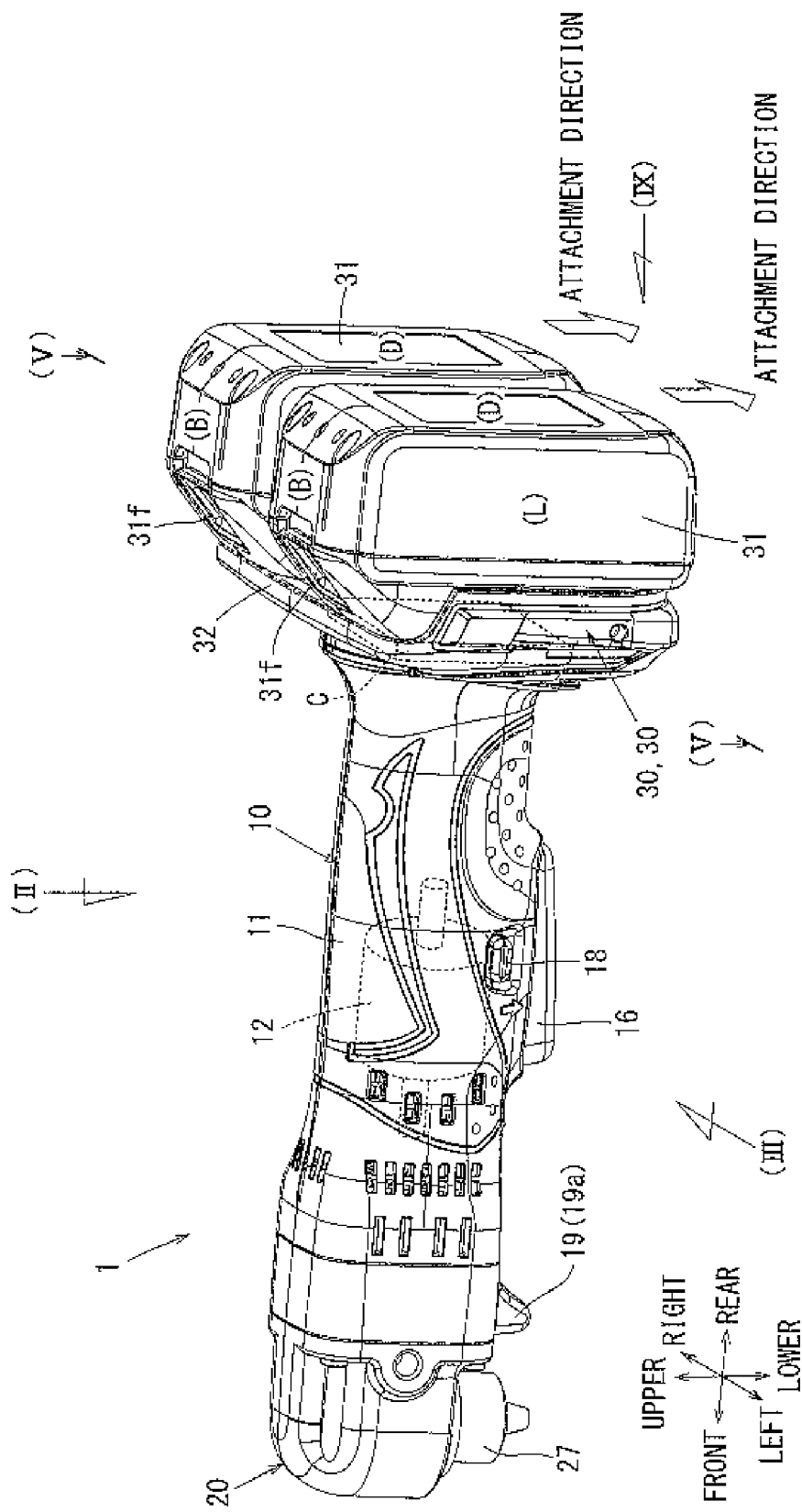
FIG. 1 illustrates a perspective view of an electric tool in accordance with a first embodiment.
Figure 2:
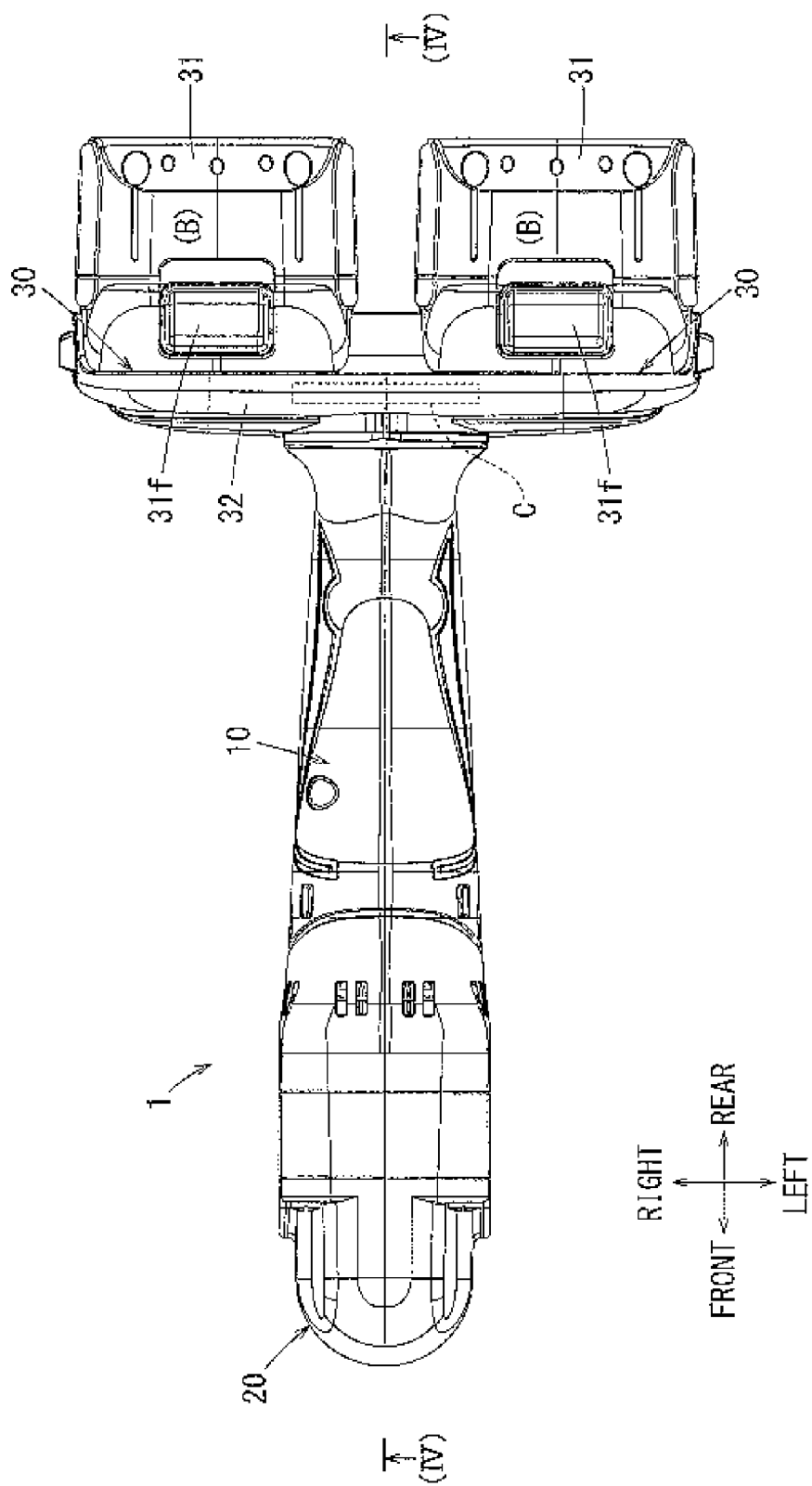
FIG. 2 illustrates a plan view of the electric tool in accordance with the first embodiment, as seen in a direction of an arrow (II) in FIG. 1.

Next, a first through ninth embodiments of the present invention will be described with reference to FIGS. 1 through 46. In detail, in the first through eighth embodiments, an electric tool 1, such as an angle drill, in which a spindle axis (output axis) is configured to cross, engage and/or mesh with a motor axis is described in further detail. As shown in FIGS. 1 through 4, the electric tool 1 of the first embodiment has a main tool body 10 with a main body housing 11 that contains an electric motor 12 that may be configured to be powered by electric current having a rated voltage of 36V, further where the electric motor 12 may function as a drive source, a gear head 20 connected to a front portion of the main tool body 10, and two battery attachment portions 30 formed at a rear portion of the main tool body 10. In detail, batteries 31 may insert into and attach with their corresponding battery attachment portions 30. The main tool body 10 may be of a cylindrical configuration with a suitable diameter, i.e. such that the main tool body 10 may be easily grasped and/or held by a user, such as an operator. In the configuration shown in FIGS. 1 through 4, the main tool body 11 may function as and/or provide a grip to be grasped by a user. For instance, a user may be positioned within a vicinity of the main tool body 10 and grasp the main tool body 10 with, for example, either a right hand and/or a left hand. The relative directions of front-rear, right-left, upper, and lower may be defined from the perspective of a user of the electric tool 1 and may be shown in a key and/or a legend in the FIGS. Further, the directions described above may be used in the following description to describe the spatial orientation, connection and/or configuration of various parts, elements, members and/or components of the electric tool 1, etc.

Figure 4:
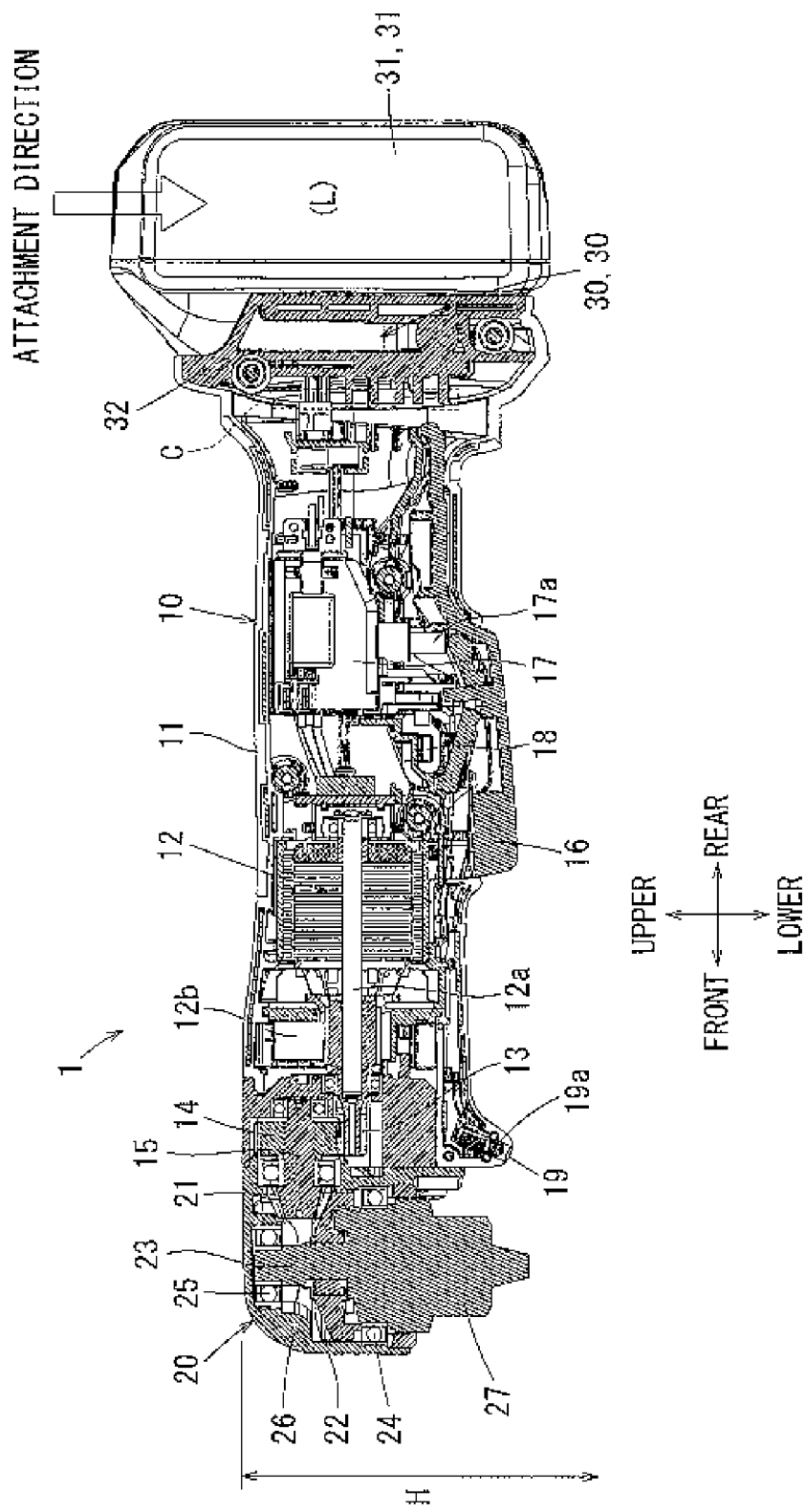
FIG. 4 illustrates a longitudinal sectional view of the electric tool in accordance with the first embodiment taken along line (IV)-(IV) in FIG. 2.
Figure 5:
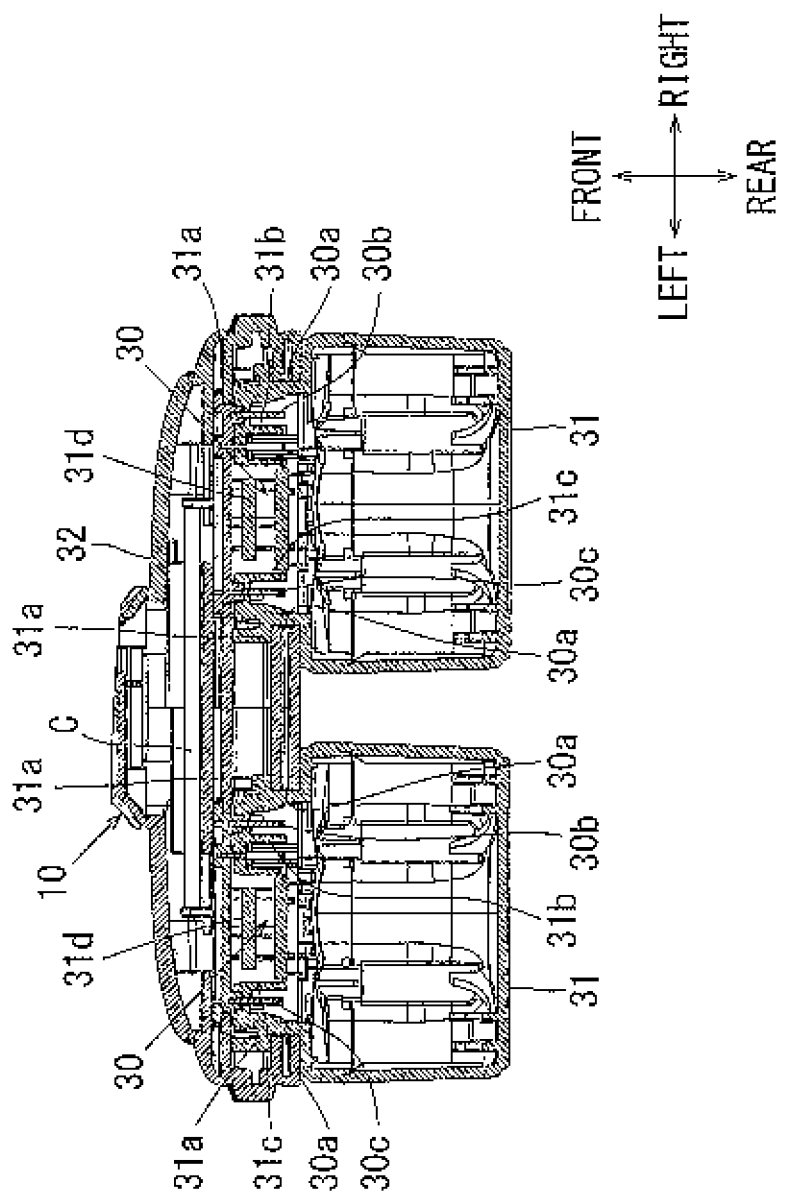
FIG. 5 illustrates a cross-sectional view of a battery attachment portion taken along line (V)-(V) of FIG. 1.

As shown in FIG. 4, the electric motor 12 may transmit a rotational output to a drive shaft 15 via mesh-engagement of a drive gear 13, attached to an output shaft 12a, and an intermediate gear 14. In FIG. 4, reference numeral 12b may indicate a carbon brush. A driving side bevel gear 21 is integrally formed at a distal end of the drive shaft 15. The driving side bevel gear 21 may mesh with a driven side bevel gear 22 which may be fixed to and/or in communication with a spindle 23. A gear head housing 26 may support the spindle 23 via bearings 24 and 25 such that the spindle 23 may rotate relative to the gear head housing 26. A rotational axis (spindle axis) of the spindle 23 may be positioned orthogonal to a rotational axis (i.e., a motor axis) of the output shaft 12a of the electric motor 12 and rotate as a result of engagement and/or meshing of the driving side bevel gear 21 and the driven side bevel gear 22. A chuck 27 for attaching a cutter tool accessory such as a drill bit (not shown in the FIGS.) may be formed integrally with the spindle 23 at a distal end of the spindle 23. A lower portion of the chuck 27 protrudes downwardly from the gear head housing 26. The cutter tool accessory attached to the spindle 23 via the chuck 27 may rotate around the spindle axis to, for example, perform a drilling operation when driven by the electric motor 12. In the electric tool 1, i.e. herein also referred to as an "angle drill", a height dimension H may be measured from a distal end of the cutter tool accessory to an upper surface of the gear head 20. Further, the height dimension H, as described here, may be relatively short and/or compact to better accommodate drilling and/or operation of the electric tool in, for example, difficult to reach areas and/or crevices. Moreover, such a configuration as described here may allow for the efficient performance of a drilling operation in a space of a relatively short height, as measured in a vertical direction in the FIGS.

Referring generally to FIG. 4, a battery base 32 may be formed as a plate and be integrally with the main body housing 11 at a rear portion of the main body housing 11. In the first embodiment, the battery base 32 may be configured within the main body housing 11 to extend, i.e., substantially symmetrically, in the right-to-left direction. As described below, the battery base 32 may be an attachment seat portion configured to receive and/or attach to two batteries 31, and the battery base 32 may prevent a hand of the user from, for example, inadvertently sliding and/or slipping on the main tool body 10. Also, the battery base 32 may contain a controller board C that may primarily control the electric motor 12.

Two battery attachment portions 30 may be formed on a rear surface of the battery base 32. The battery attachment portions 30 are illustrated in further detail in FIG. 9. The battery attachment portions 30, as shown in the FIGS., include a right battery attachment portion 30 and a left battery attachment 30 where right and left battery attachment portions 30 are of the same configuration. Further, each battery attachment portion 30 includes a pair of right and left rail portions 30a. The rail portions 30a may be arranged to extend vertically and be positioned parallel to each other. Positive and negative connection terminals 30b and 30c may be arranged between the two rail portions 30a. Further, the positive and negative connection terminals 30b and 30c are also vertically elongated and parallel to each other. An engagement recess 30d into which a lock claw portion 31e (See FIG. 8) of the battery 31 may be fitted is formed at a top portion of the battery attachment portion 30.

Figure 6:
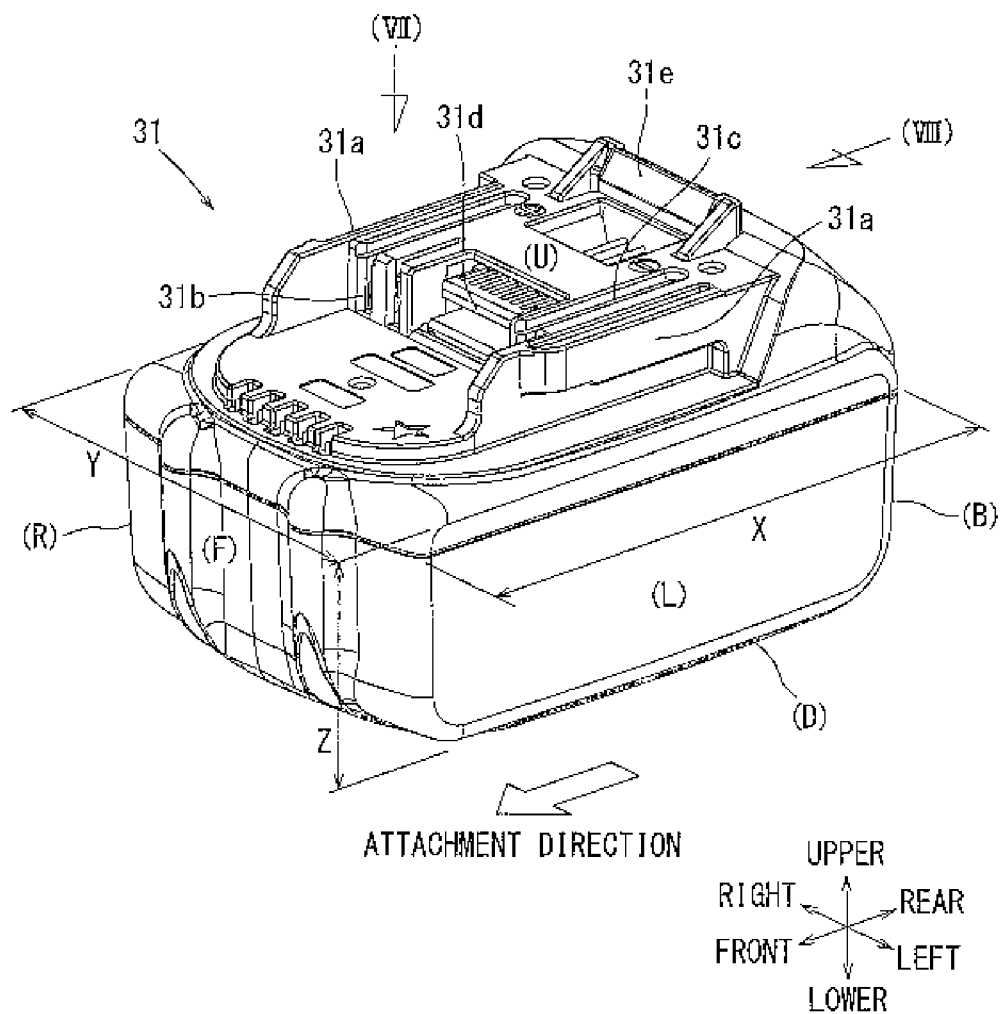
FIG. 6 illustrates a perspective view of a battery.
Figure 7:
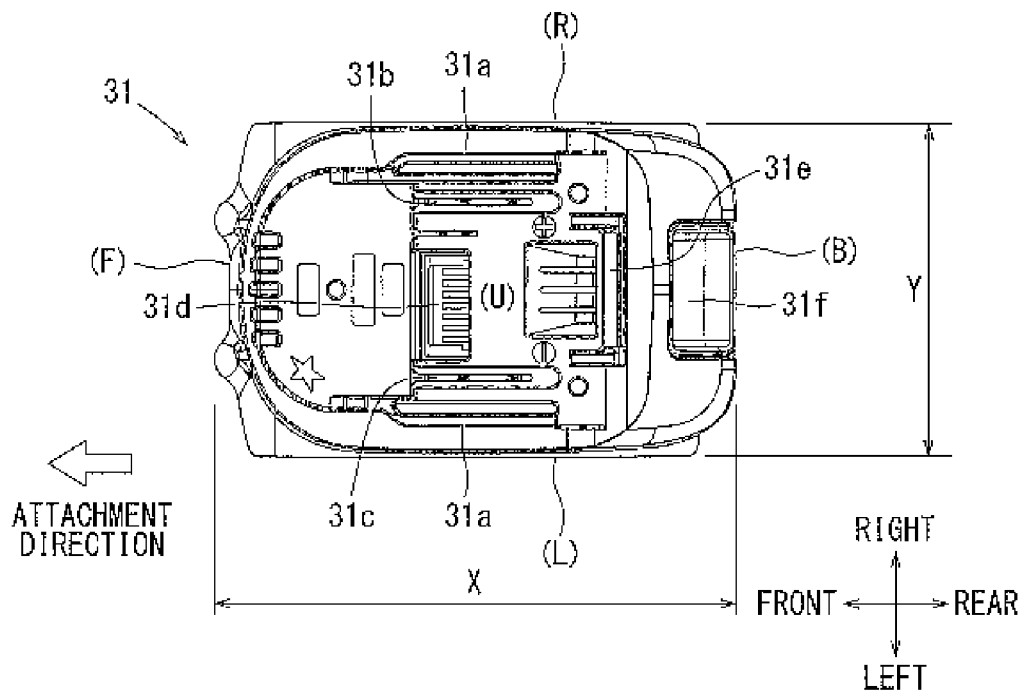
FIG. 7 illustrates a plan view of the battery, as seen in a direction of an arrow (VII) in FIG. 6.
Figure 8:
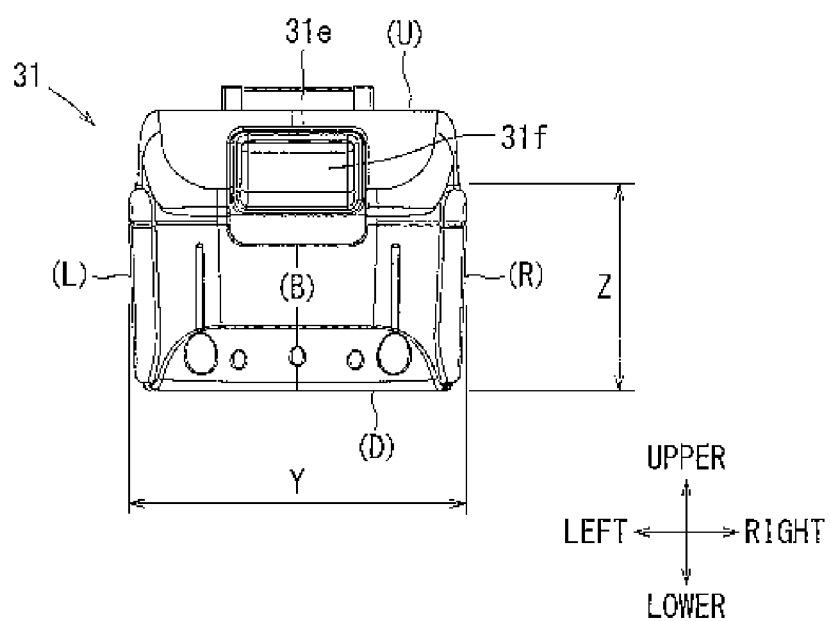
FIG. 8 illustrates a rear view of the battery, as seen in a direction of an arrow (VIII) in FIG. 6.

Each of the FIGS. 6 through 8 illustrates a battery 31, i.e. of the batteries 31. The battery 31 may be inserted into and attach to a corresponding right or left battery attachment portions 30. In an embodiment, the battery 31 may be a lithium ion battery with an output voltage of 18V. The each battery 31 may have a battery case formed as, for example, a parallelepiped defined by the following relative dimensions: length X>width Y>height Z. Further, a battery case of the battery 31 may be configured to contain and/or house a plurality of battery cells. Moreover, the battery 31 may be repeatedly used to provide power to the electric tool 1 as needed by, for example, removal from the battery attachment portion 30, charge by a dedicated battery charger, and re-insertion to the battery attachment portion 30 post-charging to once again power the electric tool 1.

The 18V battery 31 may be attached to and/or detached from the battery attachment portion 30 through sliding along a pair of right and left rail receiving portions 31a formed on an upper surface thereof. In detail, the 18V battery 31 may be a slide-attachment type battery, the upper surface of which may be superimposed on, i.e. lined up against, the battery attachment portion 30 to attach to and/or connect with the battery attachment portion 30.

As shown in FIGS. 6 and 7, the pair of right and left rail receiving portions 31a and positive and negative terminal receiving portions 31b and 31c may be arranged on an upper surface of the 18V battery 31. When the battery is viewed as a single unit, the pair of right and left rail receiving portions 31a may extend outwardly in a front-to-rear direction (i.e., longitudinal direction; and/or when the battery 31 is inserted and/or attached to a corresponding battery attachment portion 30, the pair of right and left rail receiving portions 31a may extend in a vertical direction) and also be arranged parallel to each other. The terminal receiving portions 31b and 31c may be arranged to extend along an inner side of the right and left rail receiving portions 31a. A connector 31d, which may be connected to a charger (not shown in the FIGS.), may be arranged between the terminal receiving portions 31c and substantially positioned at the center of the upper surface of the battery 31. Further, in an embodiment, various control signals may be both transmitted and received between the battery 31 and a charger during charging through the connector 31d.

The lock claw portion 31e may be provided at a rear portion of the upper surface of the battery 31. A spring incorporated into the battery case may bias the lock claw portion 31e to protrude, for example, upwardly. The lock claw portion 31e may reversibly deform, upon receiving an external force and/or pressure, for example, to elastically fit into the engagement recess 30d of the battery attachment portion 30. Accordingly, the attachment state of the battery 31 may be locked and/or fixed in position with respect to the battery attachment portion 30.

As shown in FIGS. 7 and 8, an unlock switch and/or an unlock button 31f may be provided to and/or on a rear surface of the battery 31. In an embodiment, the unlock button 31f may be formed integrally, i.e. as a single, uniform piece, with the lock claw portion 31e. Thus, should the unlock button 31f be compressed and/or depressed by a fingertip of a user and/or operator of the electric tool 1, the lock claw portion 31e may be withdrawn and/or retracted downwards, i.e. opposed to and/or against the biasing force of the spring. The lock claw portion 31e may be retracted to the unlock position below and removed from the engagement recess 30d. Thus, the battery 31 may then be detached from the battery attachment portion 30 by, for example, sliding the battery 31 in a detaching direction.

Figure 3:
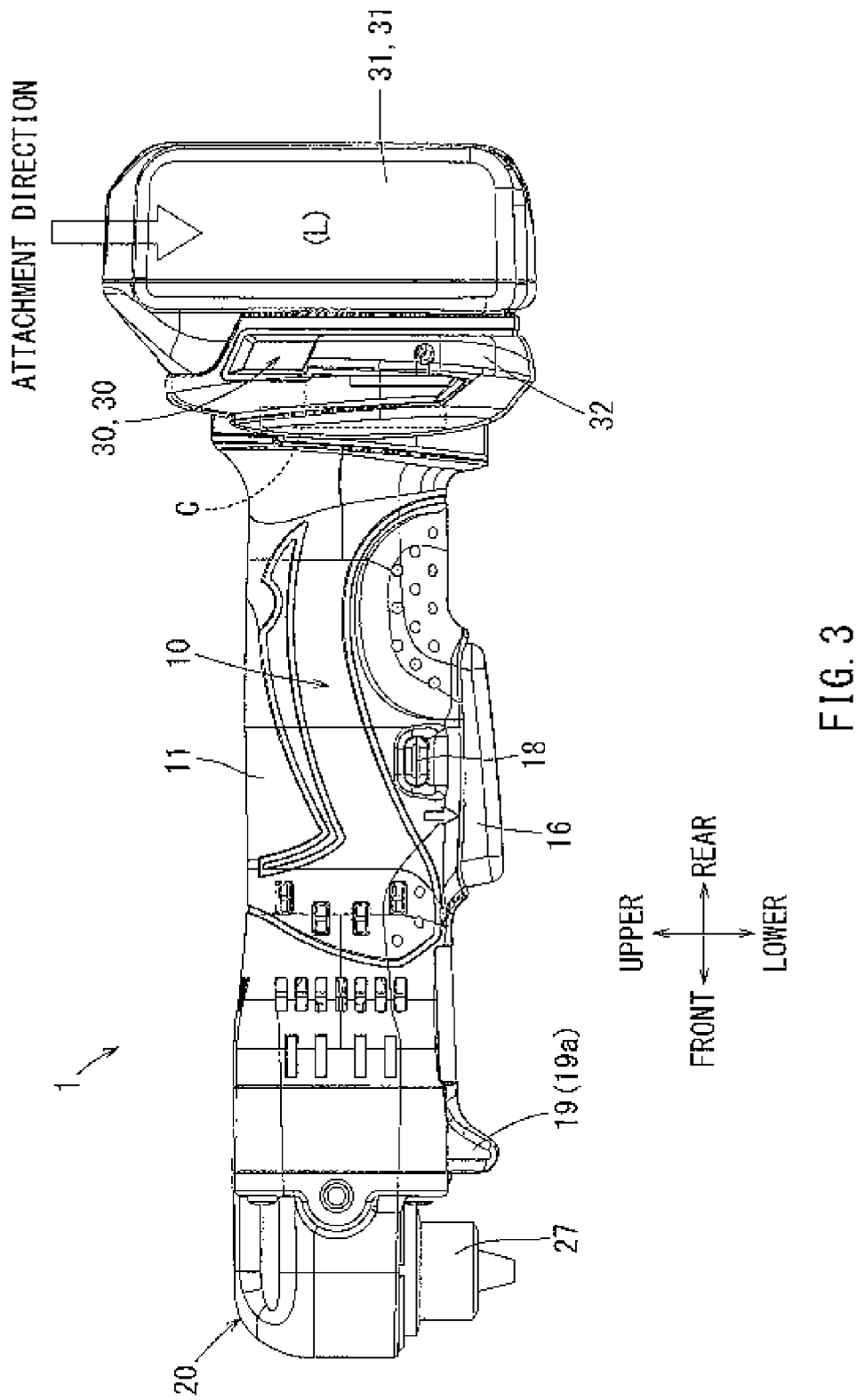
FIG. 3 illustrates a left side view of the electric tool in accordance with the first embodiment, as seen in a direction of an arrow (III) in FIG. 1.

Referring generally now to FIGS. 1, 3 and 4, a switch lever 16 may be attached on a lower surface of the main tool body 10 such that, when a user pulls the switch lever 16 with a fingertip of his or her hand, i.e., grasping the main tool body 10, a switch rod 17a may be upwardly pushed in to thus activate a main switch 17. Further, a normal-to-reverse directional switching lever 18 to switch the rotational direction of the electric motor 12 may be positioned above the switch lever 16.

Figure 10:
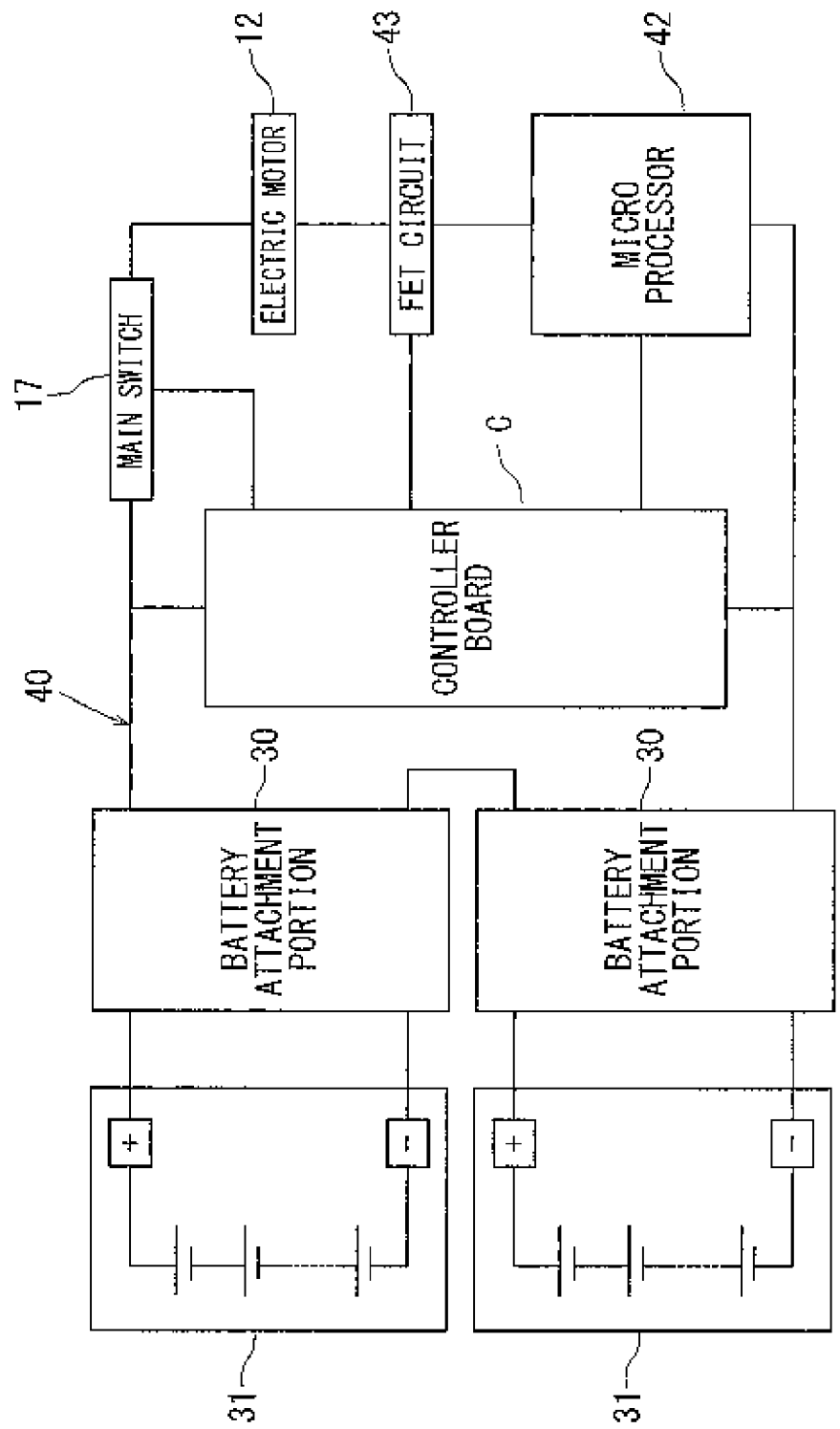
FIG. 10 illustrates a block diagram of an electric circuit.

Referring generally now to FIG. 10, when a main switch 17 is activated, electricity may be supplied to a power circuit 40 to thus activate. The two batteries 31 may be attached to the right and left battery attachment portions 30 to be electrically connected in series. As a result, the two 18V batteries 31, connected to each other in a series, may be connected to the power circuit 40 to provide a total, i.e. combined, power source with a total output voltage of 36V. A controller board C, configured to primarily control the electric motor 12, may be incorporated into the power circuit 40 as shown in FIG. 10. Further, a microprocessor 42 for control, a FET (switching element) 43, etc. may be mounted on the controller board C.

Accordingly, the electric motor 12 may function as a drive source with a rated voltage of 36V, i.e. such that the electric motor 12 may be configured to operate with electric current of a 36V voltage. In detail, the two 18V batteries 31 connected in series may combine to provide a total system voltage of 36V to drive the electric motor 12 as needed. Thus, the electric tool 1 of a 36V specification may be powered by two 18V batteries 31 connected in series, as described here, as the power source.

Returning now to that shown by FIGS. 1, 3 and 4, a protrusion 19 extending downwardly may be formed at a front portion of a lower surface of the main body housing 11. The protrusion 19 may be formed to include an illumination device (LED) 19a, which may be activated simultaneously along with the activation of the electric motor 12 by, for example, pulling of the switch lever 16. Further, the illumination device (LED) 19a may be turned off, i.e. extinguished simultaneously with stopping of the electric motor 12 by releasing pressure against the switch lever 16, i.e. such that the switch lever 16 may decompress to return to an original and/or natural disengaged and/or deactivated position. The portion around the cutter tool accessory (i.e. the portion being machined) may be illuminated brightly by the illumination device 19a to, for example, illuminate a vicinity of the electric tool 1 to efficiently perform a drilling operation and/or the like in a dimly-lit area. Further, the protrusion 19 may also assist in preventing inadvertent and/or accidental activation of the switch lever 16 when the electric tool 1 is placed on a work-bench or the like.

The first through eighth embodiments described herein may differ from each other in, for example, attachment positions, attachment orientation and/or attachment/detachment direction of the two batteries 31. Nevertheless, the first through eighth embodiments may be identical with regard to basic formative components of the electric tool 1 such as the main tool body 10 and/or the gear head 20. Accordingly, like components are indicated by like reference numerals, and a description of the same will thus be omitted. In the drawings, symbol F indicates the front surface, symbol B indicates the rear surface, symbol L indicates the left-hand side surface, symbol R indicates the right-hand side surface, symbol U indicates the upper surface (attachment surface), and symbol D indicates the lower surface of the battery to make it clear which surface of the battery 31 is visible. This helps to clarify the attachment orientation, the attachment/detachment direction, and the arrangement state, i.e. being attached or detached, of the two batteries in the drawings.

As shown in FIGS. 1 through 5, in the first embodiment, the two batteries 31 may be positioned side-by-side, in a longitudinal state longitudinal direction of each battery 31 of the batteries 31 (i.e. the front-rear direction for each battery) may be oriented vertically. As indicated by the hollow arrows in FIGS. 1 and 3, the attachment direction of the two batteries 31 may be generally downward. Each of the batteries 31 may be attached to the battery attachment portion 30 by sliding downwards while also causing the rail portions 30a of the battery attachment portion 30 to enter, i.e. slide into to engage with, for example, the corresponding rail portions 31a of the battery attachment portion 30, with the front surface F facing downwards. When the battery 31 reaches the slide insertion and/or engagement end with respect to the battery attachment portion 30a, the lock claw portion 31e may reversibly deform to be elastically fitted into the engagement recess 30d, whereby the battery 31 may then be locked in the attached position.

In the first embodiment, both batteries 31 may be attached in a lengthwise orientation in which the longitudinal direction of each battery 31 of the batteries 31 extends vertically. Alternatively put, upon successful insertion and/or engagement of the batteries 31 with their corresponding battery attachment portions 30, the rear surfaces B may be directed upwards as shown in FIG. 1.

To remove and/or detach the battery 31 from the battery attachment portion 30, a user of the electric tool 1 may depress the unlock button 31f with his or her fingertip to retract the lock claw portion 31e out of the engagement recess 30d. As a result, the battery may become upwardly slidable and can now be detached from the battery attachment portion 30.

Figure 9:
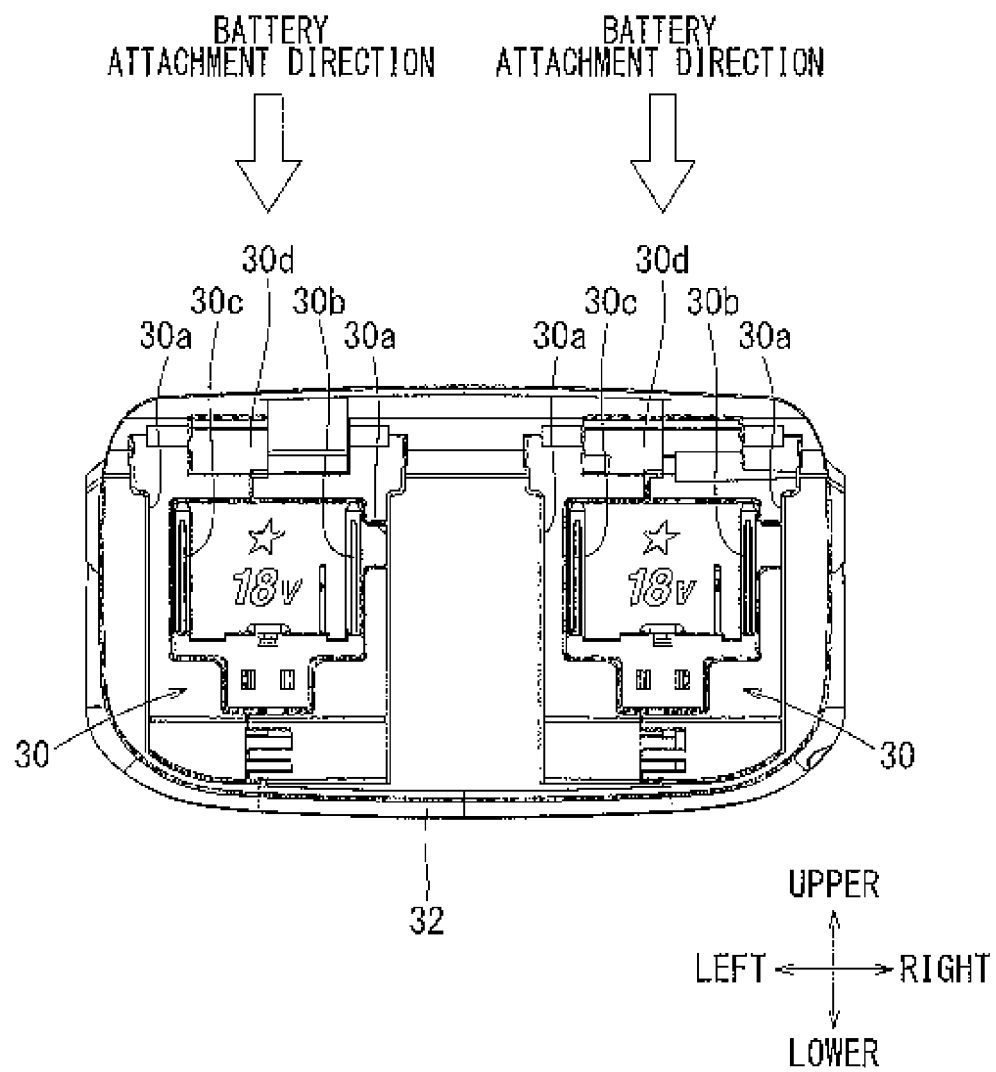
FIG. 9 illustrates a rear view of the battery attachment portion, as seen in a direction of an arrow (IX) in FIG. 1.
Figure 11:
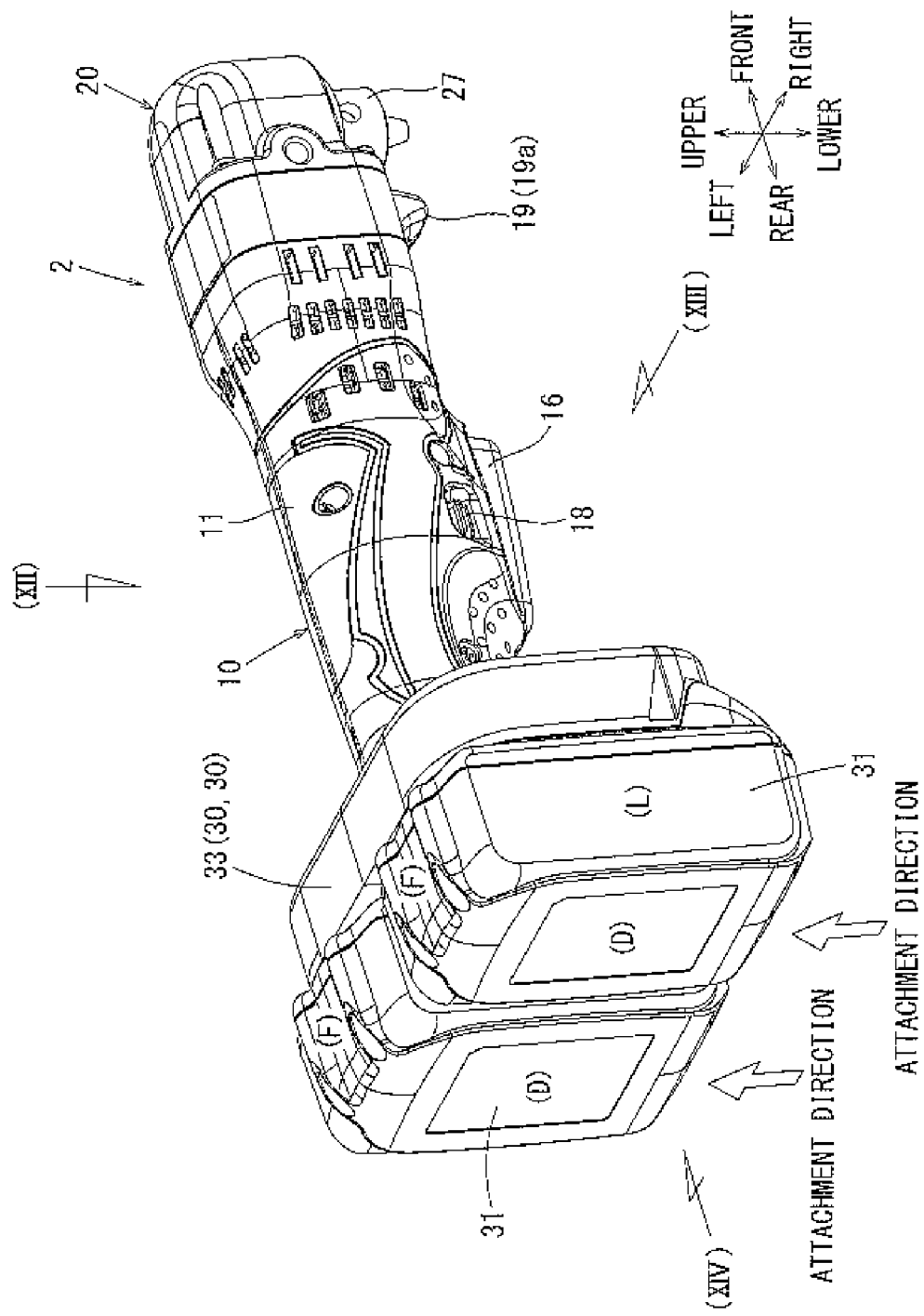
FIG. 11 illustrates a perspective view of an electric tool in accordance with a second embodiment.
Figure 12:
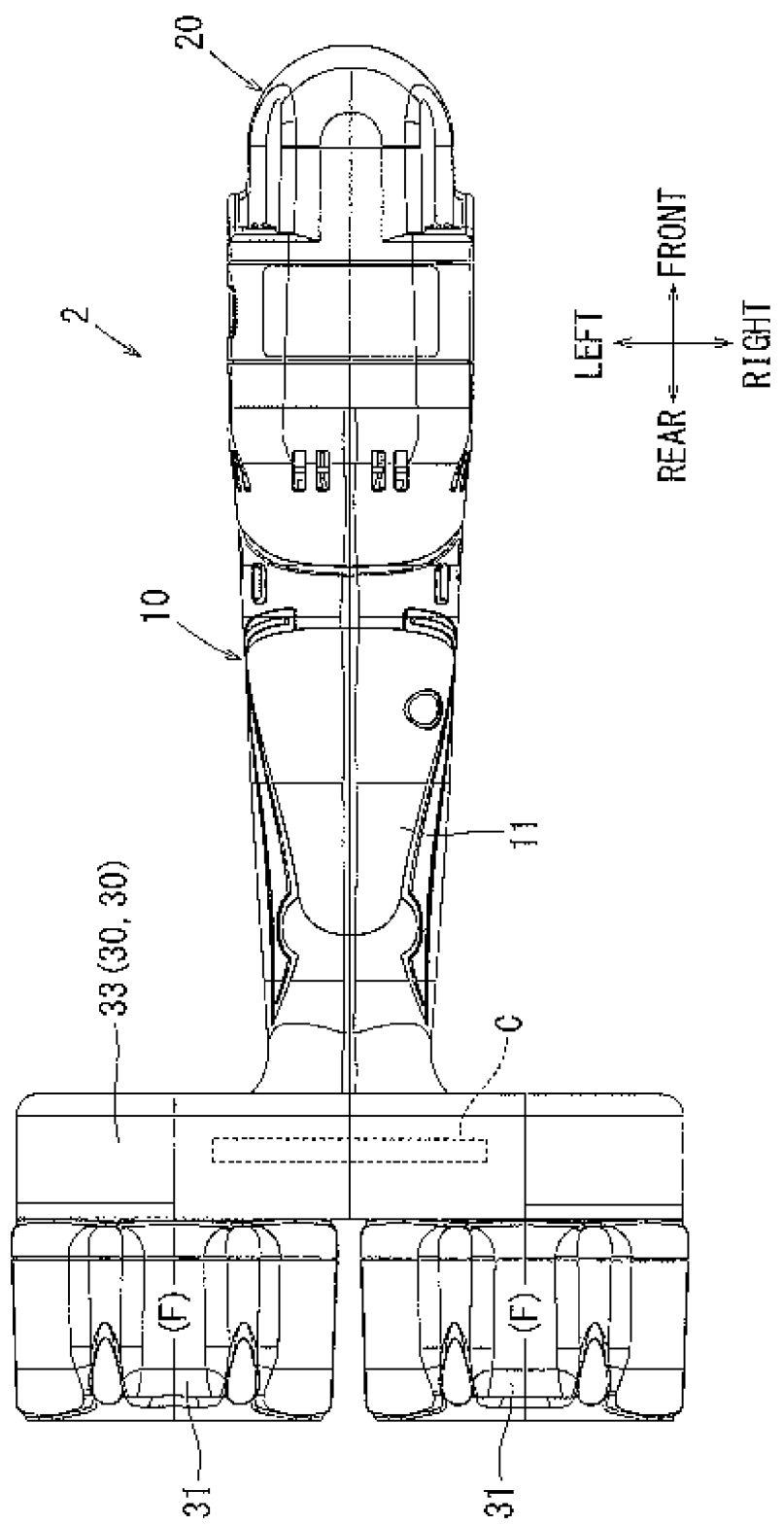
FIG. 12 illustrates a plan view of the electric tool in accordance with the second embodiment, as seen in a direction of an arrow (XII) in FIG. 11.
Figure 13:
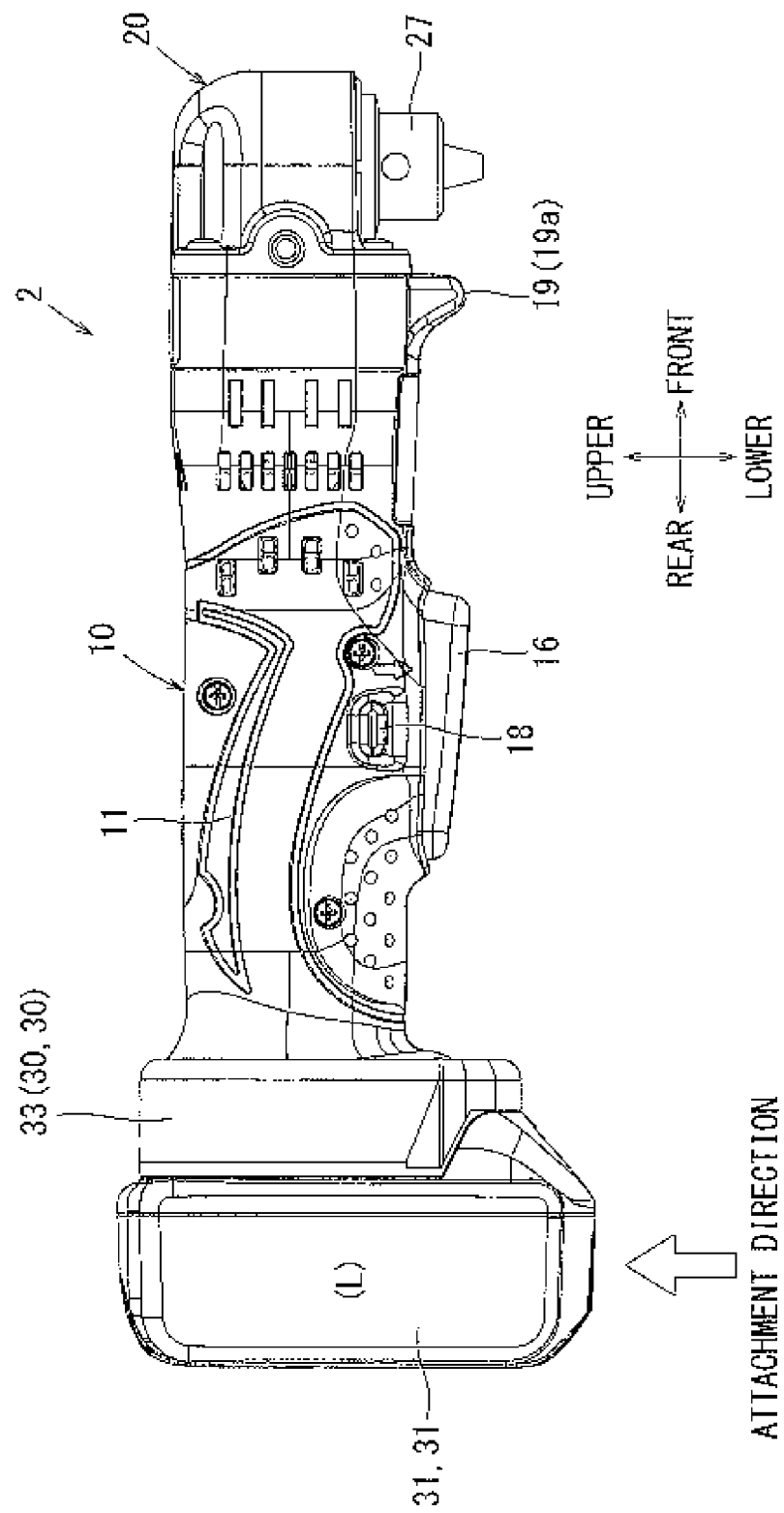
FIG. 13 illustrates a right side view of the electric tool in accordance with the second embodiment, as seen in a direction of an arrow (XIII) in FIG. 11.
Figure 14:
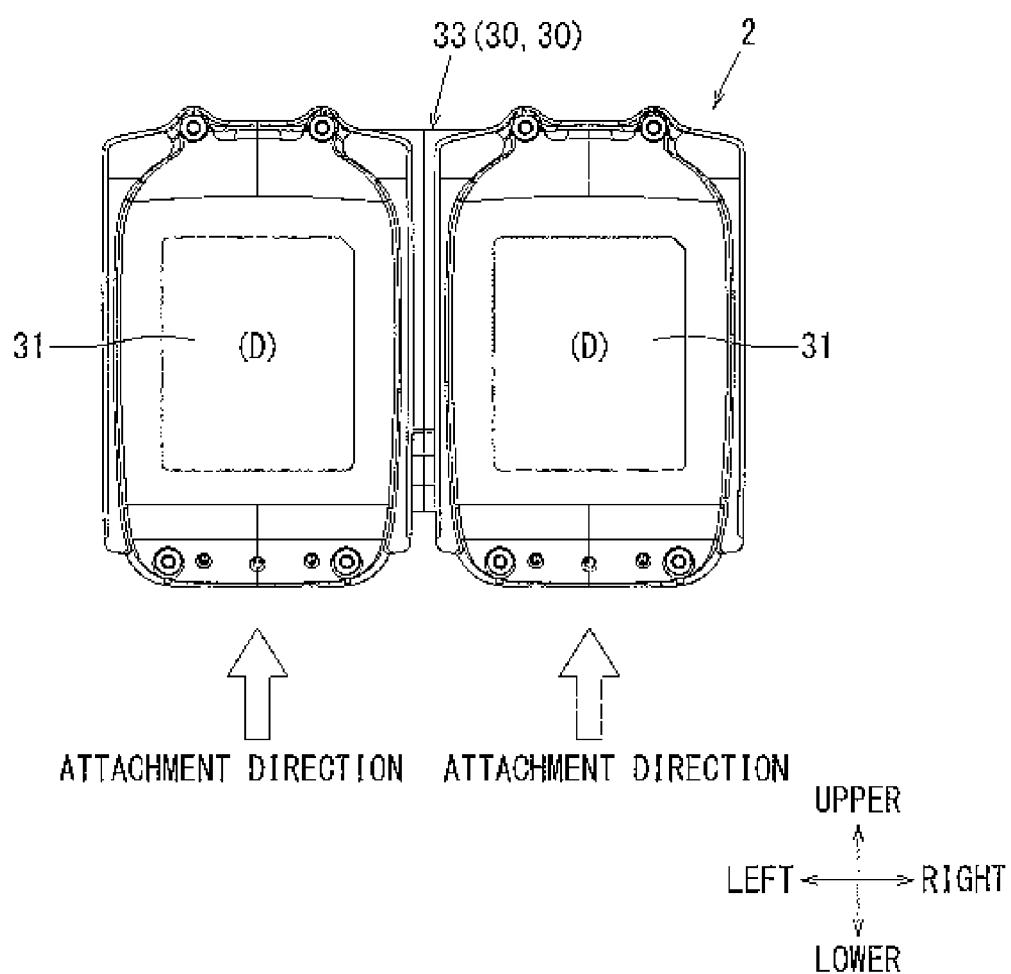
FIG. 14 illustrates a rear view of the electric tool in accordance with the second embodiment, as seen in a direction of an arrow (XIV) in FIG. 11.

Referring now to FIGS. 11 through 14, an electric tool 2 in accordance with the second embodiment is shown. In the second embodiment, the attachment direction of the two batteries 31 may be generally opposite to that of the first embodiment, i.e. in that the batteries 31 slide in down-to-up direction. In detail, in the second embodiment, the batteries 31 may be attached to the two battery attachment portions 30 formed on the battery base 33 through upward sliding where the front surfaces F of the batteries 31 are pointed upwards. The two batteries 31 may be attached in a lengthwise orientation in which the longitudinal direction of each battery of the batteries 31 extends along the vertical direction such that the front surfaces F of each battery 31 of the batteries 31 face upwards while arranged side-by-side. The battery base 33 may be formed at the rear of the main tool body 10 and extend in a width-wise direction from right-to-left. Two battery attachment portions 30 may be arranged on the rear surface of the battery base 33 in a direction vertically reversed when compared to that shown by the first embodiment (i.e. as illustrated in FIG. 9). In detail, as shown in FIGS. 11, 13, and 14, the attachment direction of the two batteries 31 may be generally upward, with the front surfaces F thereof facing upwards while attached to the corresponding battery attachment portions 30. The battery base 33 of the second embodiment also includes the controller board C, which configured to primarily control the electric motor 12.

As described and discussed above in connection with the first and second embodiments, the two batteries 31 are attached in an orientation in which their longitudinal direction (i.e., the length-wise X direction) extends in the vertical direction while arranged side-by-side (twice the distance of width Y). Accordingly, such a placement and/or configuration as described here may be relatively compact in the horizontal direction when compared to a construction where the two batteries 31 may be attached in an orientation in which their width Y direction extends vertically while arranged side-by-side (twice the distance of length X). As described here, the two batteries 31 may be attached to the corresponding battery attachment portions 30 while arranged side-by-side. As shown in FIGS. 3 and 13, sizes of attachment space for the two batteries 31 in the vertical direction and the longitudinal direction are big enough of sizes of one battery in those directions. Such a compact configuration as described here may allow for drilling operation to be performed efficiently in a relatively tight space.

Referring now to FIGS. 15 through 18, an electric tool 3 in accordance with the third embodiment is shown. In the electric tool 3 of the third embodiment, the two batteries 31 may be attached in a lengthwise orientation in which the longitudinal direction of each battery 31 extends in the vertical direction while arranged vertically, i.e. where one battery is oriented above and/or on top of the other, as shown in at least FIG. 15 side-by-side. Also, in the third embodiment, a battery base 34 may be formed at the rear of the main tool body 10 and protrude relatively further in the vertical direction than in the horizontal direction. The two battery attachment portions 30 may be arranged at an upper and lower portion of a rear surface of the battery base 34, respectively. The battery attachment direction of the upper battery attachment portion 30 may be relatively downward (i.e. the same direction as that shown in FIG. 9), and the battery attachment direction of the lower battery attachment portion 30 may be diametrically opposed to the attachment direction of the upper battery attachment portion 30 to be positioned upward (i.e. vertically reverse to the direction as shown in FIG. 9). Thus, as indicated by hollow arrows in FIG. 15, the attachment direction of the upper battery 31 may be downward, and the attachment direction of the lower battery 31 may be upward.

Figure 15:
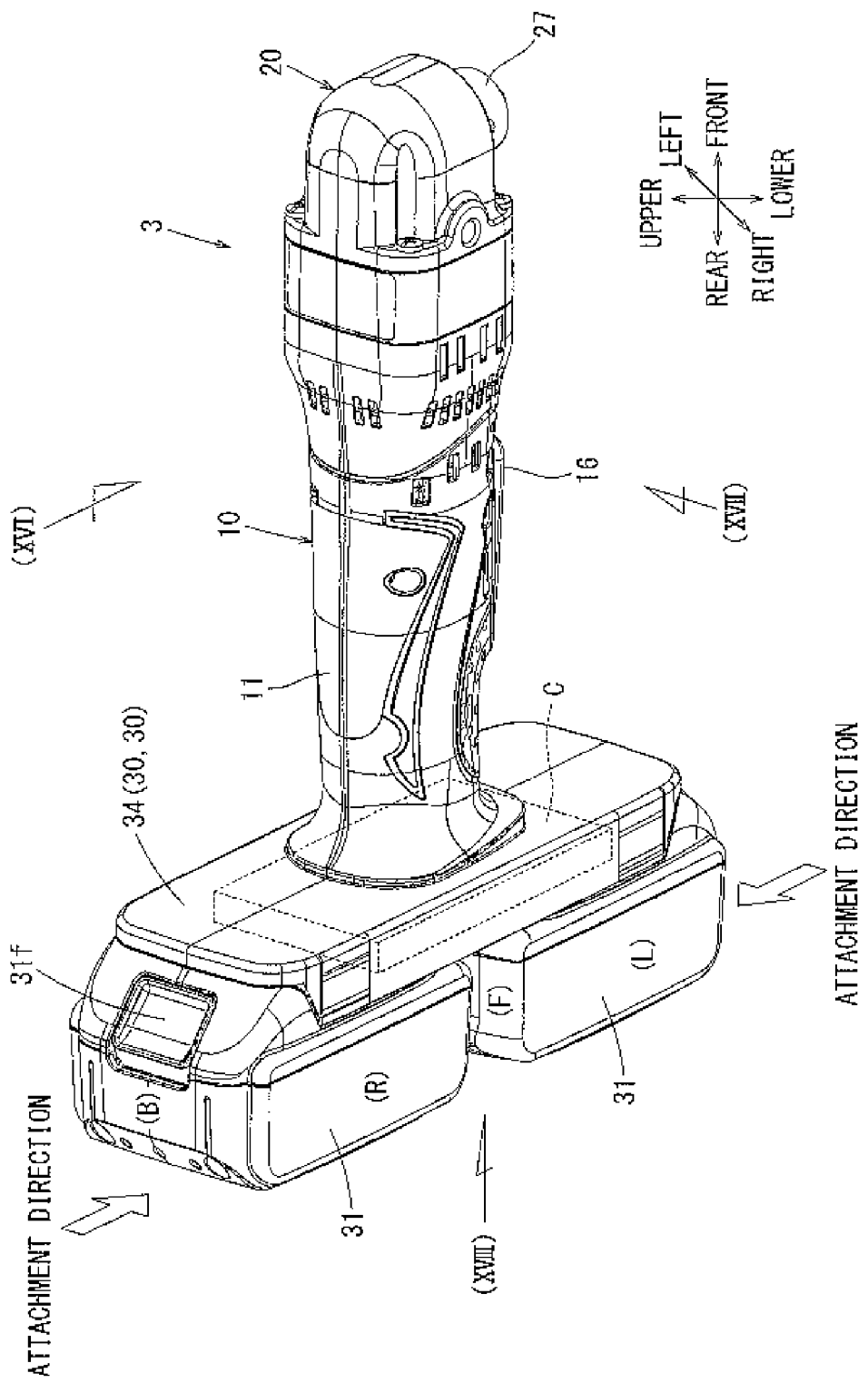
FIG. 15 illustrates a perspective view of an electric tool in accordance with a third embodiment.

As shown in FIG. 15, the battery 31, i.e. any one of the batteries 31, may be attached to the upper battery attachment portion 30 in a downward lengthwise orientation where the front surface F of the battery 31 is directed downwards. Conversely, the other battery 31, i.e. the remaining battery of the batteries 31, may be attached to the lower battery attachment portion 30 in an upward lengthwise orientation where the front surface F of the battery 31 is directed upwards. Further, the two upper and lower batteries 31 are attached while arranged vertically side-by-side such that their front surfaces F are opposed, i.e. face each other.

Figure 16:
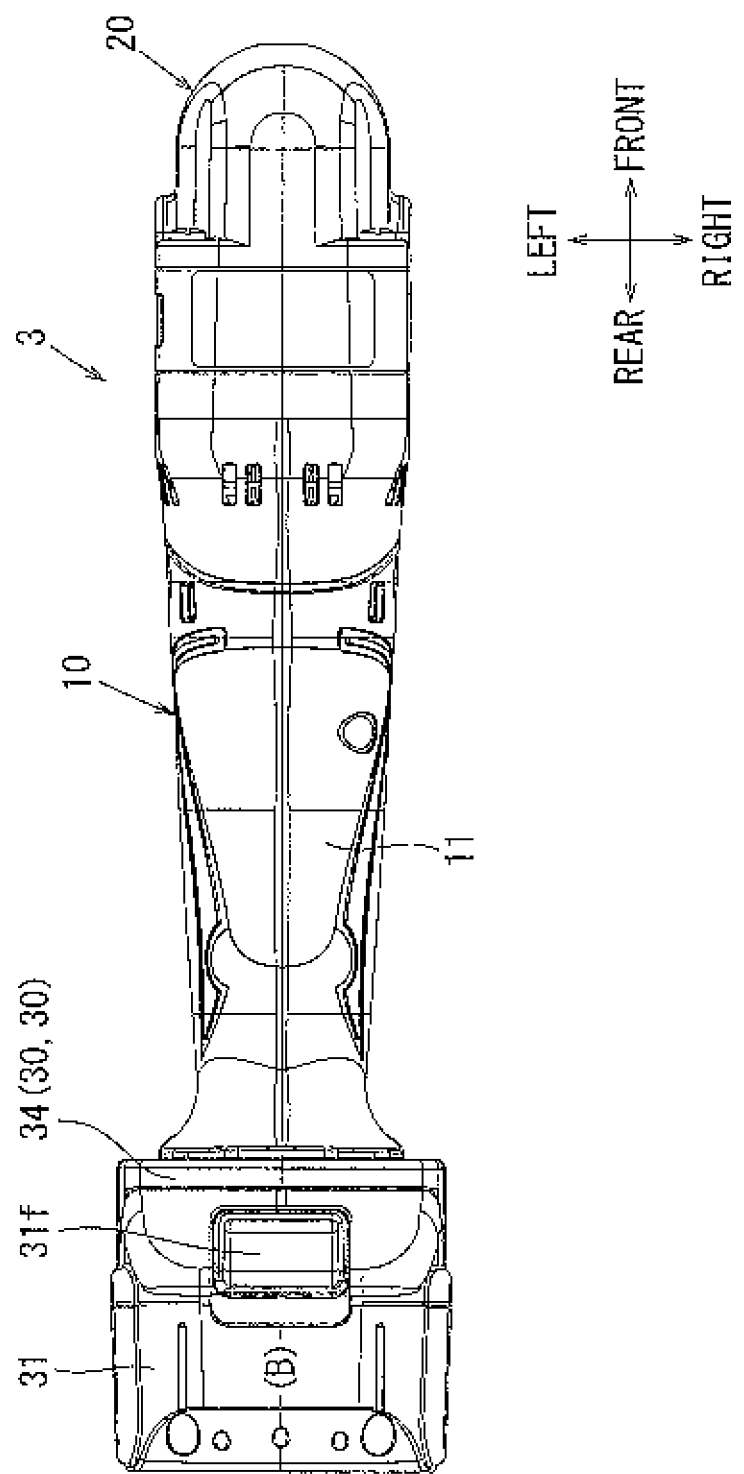
FIG. 16 illustrates a plan view of the electric tool in accordance with the third embodiment, as seen in a direction of an arrow (XVI) in FIG. 15.
Figure 17:
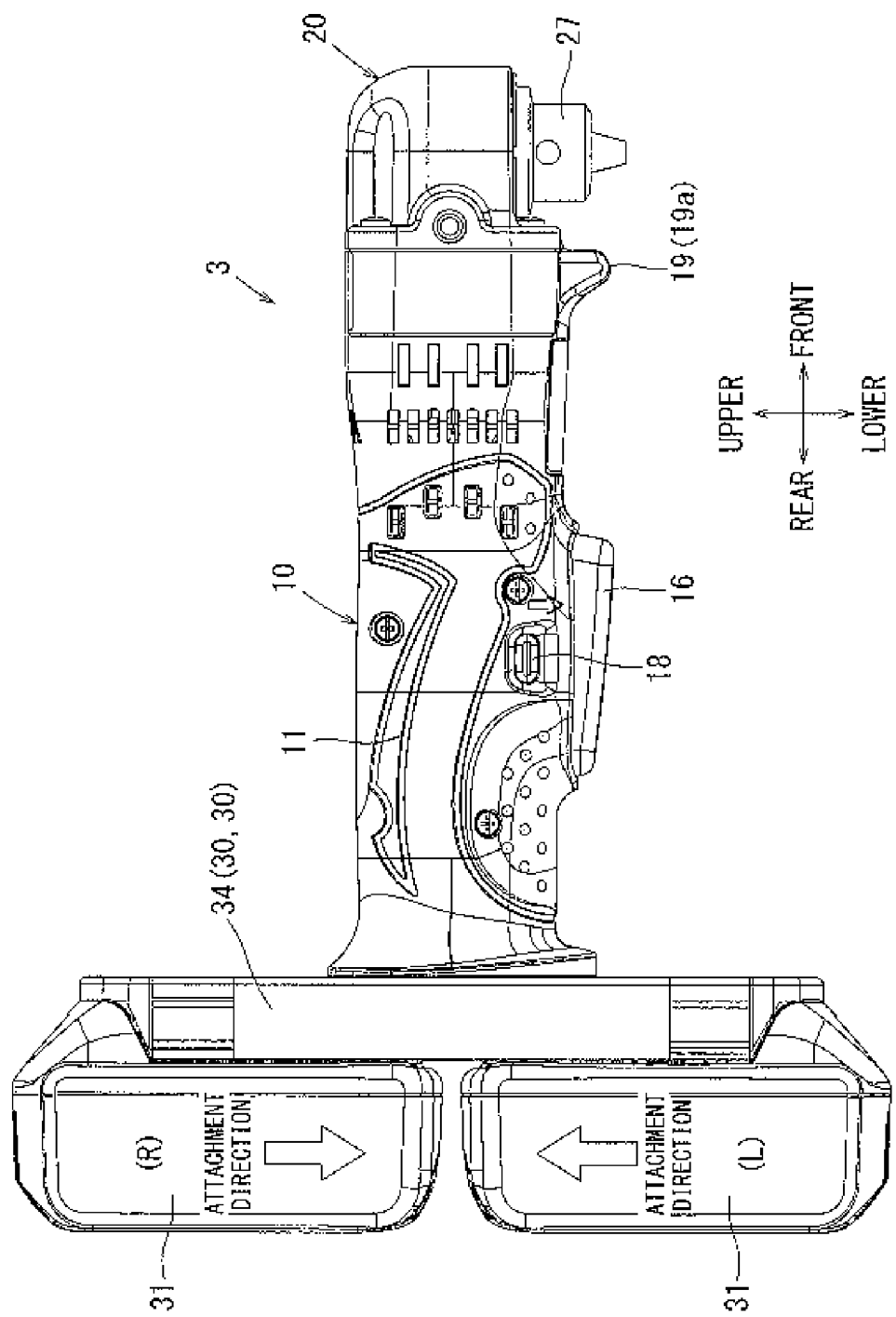
FIG. 17 illustrates a right side view of the electric tool in accordance with the third embodiment, as seen in a direction of an arrow (XVII) in FIG. 15.
Figure 18:
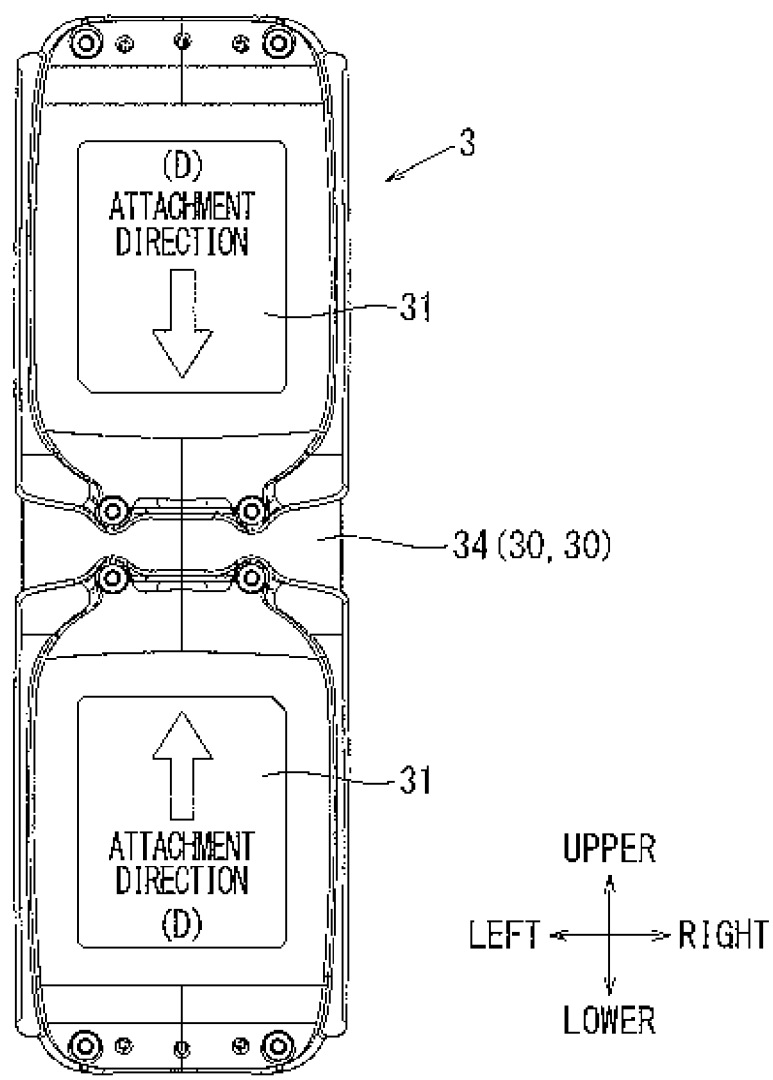
FIG. 18 illustrates a rear view of the electric tool in accordance with the third embodiment, as seen in a direction of an arrow (XVIII) in FIG. 15.

The battery base 34 of the third embodiment also includes the controller board C, which is configured to primarily control the electric motor 12. In the third embodiment, the two batteries 31 may be attached while arranged vertically side-by-side, and/or with one battery 31 positioned above and/or on top of the other, depending on the perspective of a user of the electric tool 1, with their width Y direction extending in the horizontal direction. Thus, as shown in FIG. 16, the configuration and/or orientation of the batteries 31 as described in connection with the third embodiment need only occupy the width of one battery in the right-to-left direction. Further, such a configuration may allow for the performance of a drilling operation efficiently in a relatively tight space, especially where room in the right-to-left direction is lacking.

Referring now to FIGS. 19 through 22, an electric tool 4 in accordance with the fourth embodiment is shown. In the fourth embodiment, the two batteries 31 may be attached to the corresponding batter attachment portions 30 in a lengthwise orientation in which the batteries may be positioned to face each other in the horizontal direction. A battery base 35 may be formed at the rear of the main tool body 10 and configure to extend backwards, i.e. away from the chuck 27. The battery attachment portions 30 may be arranged to extend along right and left sides of this battery base 35. The battery attachment portions 30 may be arranged such that the battery attachment direction generally upward (vertically reverse to the direction as shown in FIG. 9), with engagement recesses 30d situated at the lower positions on the battery attachment portions 30. As indicated by the hollow arrows in the drawing, the attachment direction of the batteries 31, with respect to the battery attachment portions 30 may be upward. In detail, the batteries 31 may be attached to the battery attachment portions 30 by upwardly sliding the batteries 31 with respect to the battery attachment portions 30. As shown in the drawings, the batteries 31 may be attached in a lengthwise orientation in which longitudinal direction of the battery 31 may extend in the vertical direction, i.e. and in an upward lengthwise orientation in which their front surfaces F are directed upwards.

Figure 19:
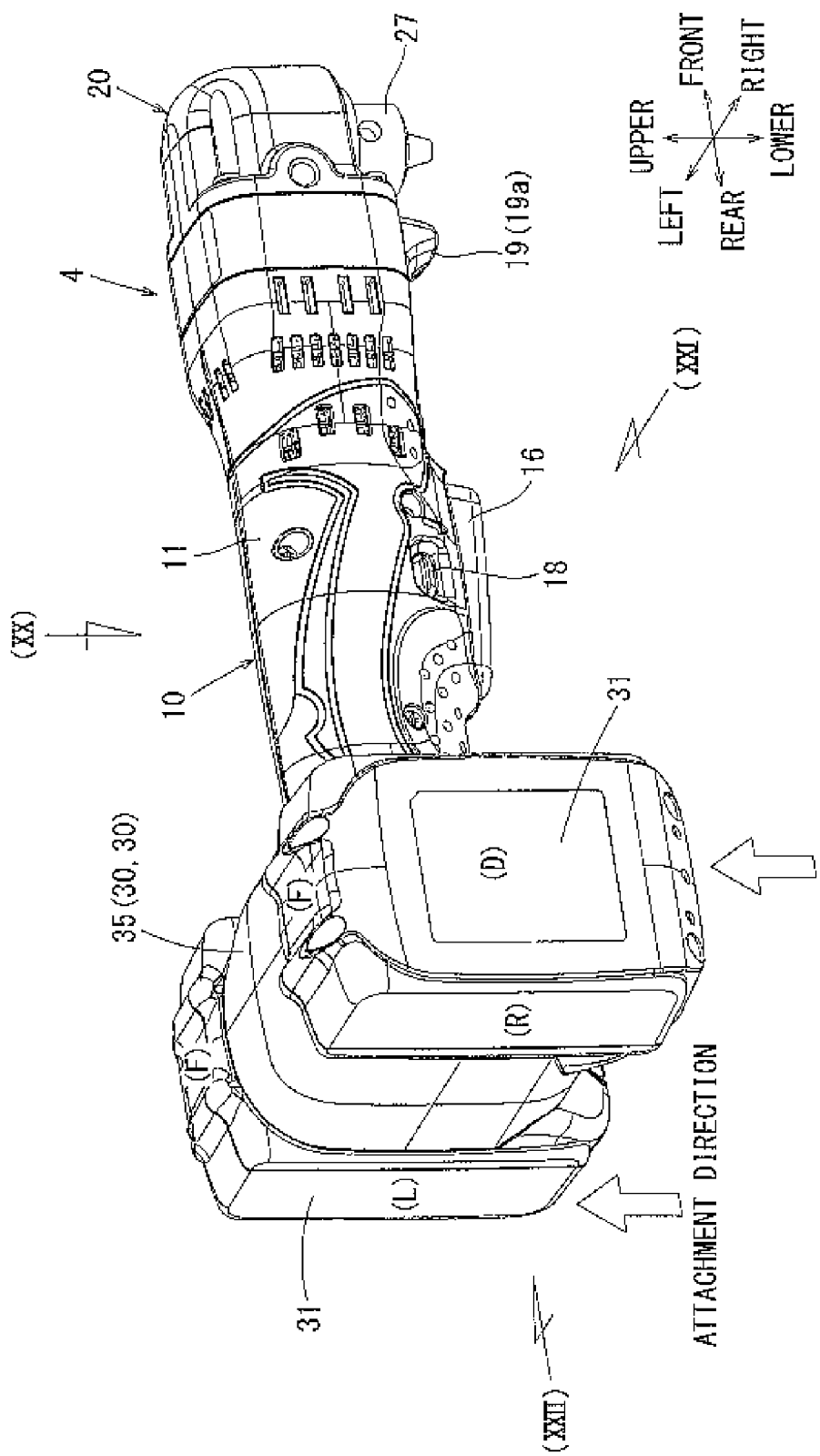
FIG. 19 illustrates a perspective view of an electric tool in accordance with a fourth embodiment.
Figure 20:
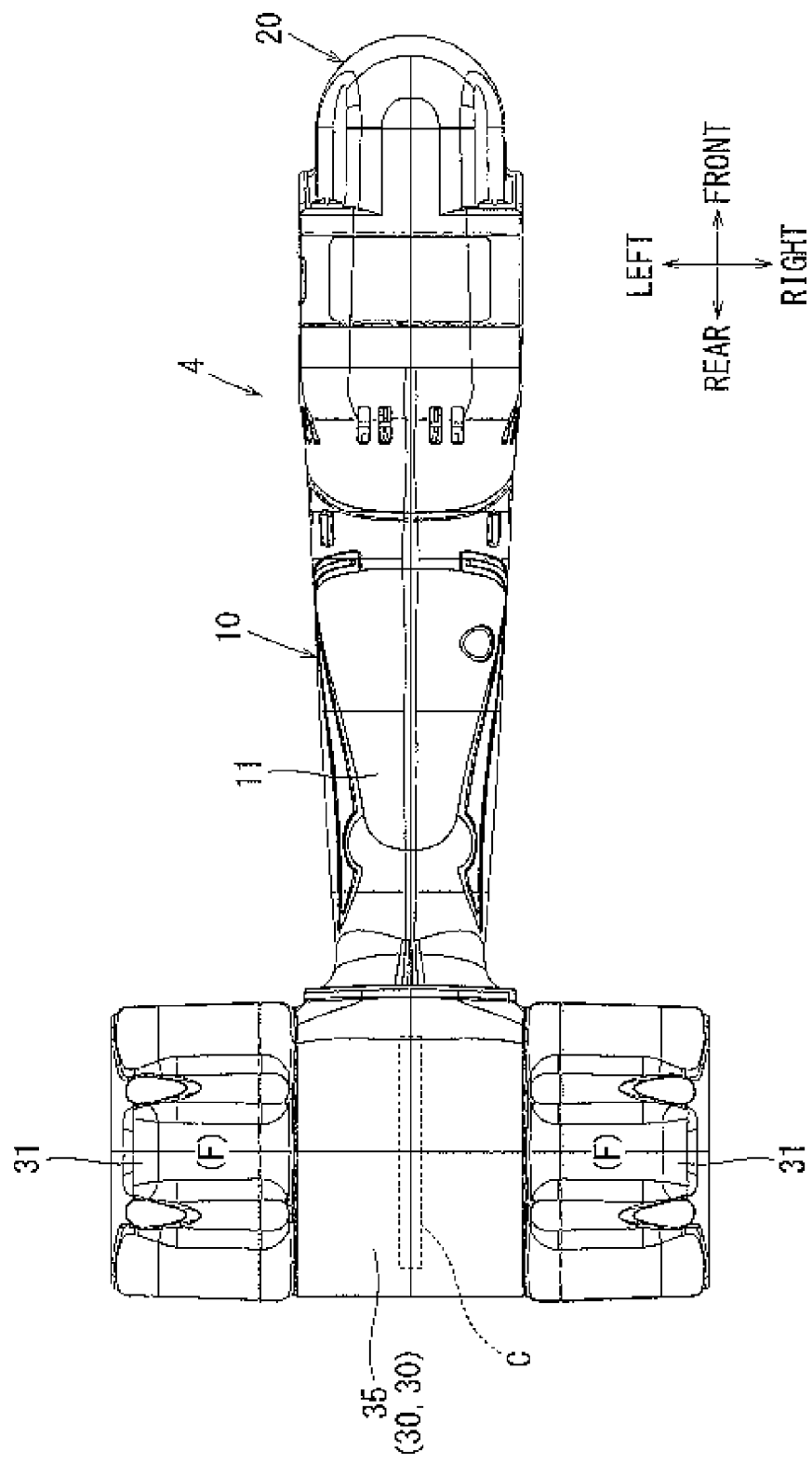
FIG. 20 illustrates a plan view of the electric tool in accordance with the fourth embodiment, as seen in a direction of an arrow (XX) in FIG. 19.
Figure 21:
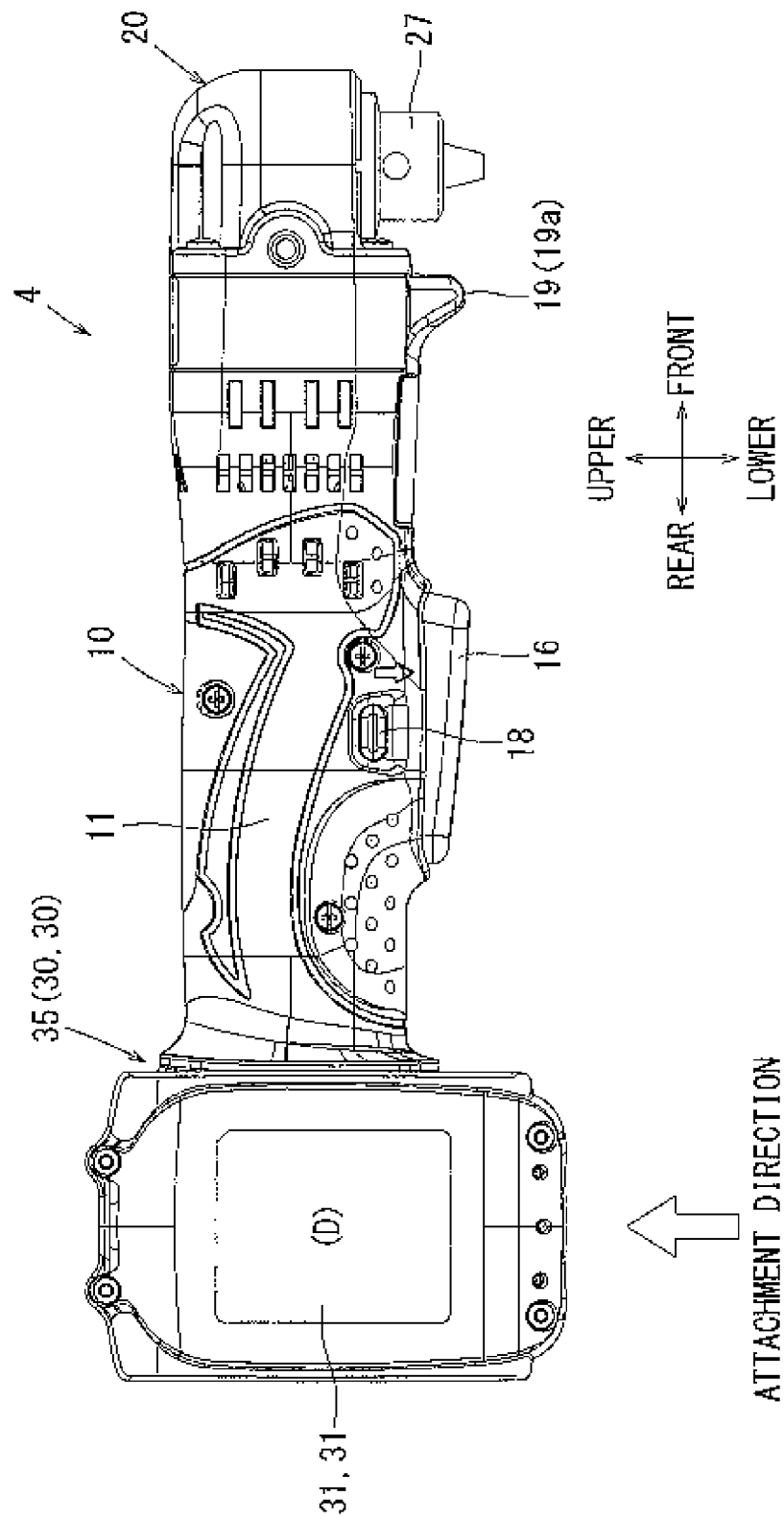
FIG. 21 illustrates a right side view of the electric tool in accordance with the fourth embodiment, as seen in a direction of an arrow (XXI) in FIG. 19.
Figure 22:
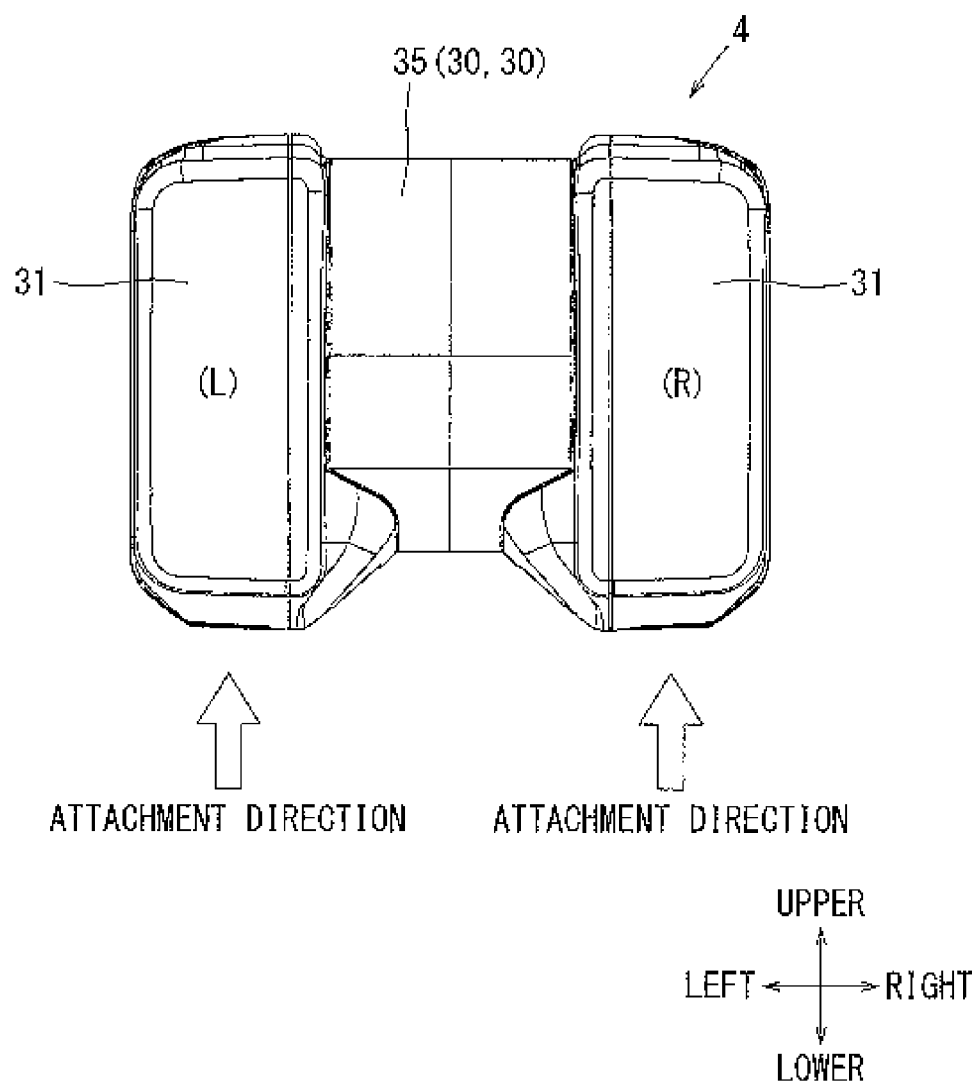
FIG. 22 illustrates a rear view of the electric tool in accordance with the fourth embodiment, as seen in a direction of an arrow (XXII) in FIG. 19.

Moreover, the two right and left batteries 31 may be attached to the corresponding battery attachment portions 30 in a lengthwise orientation where the upper surfaces U of the batteries 31 face each other as shown in FIG. 19.

Figure 23:
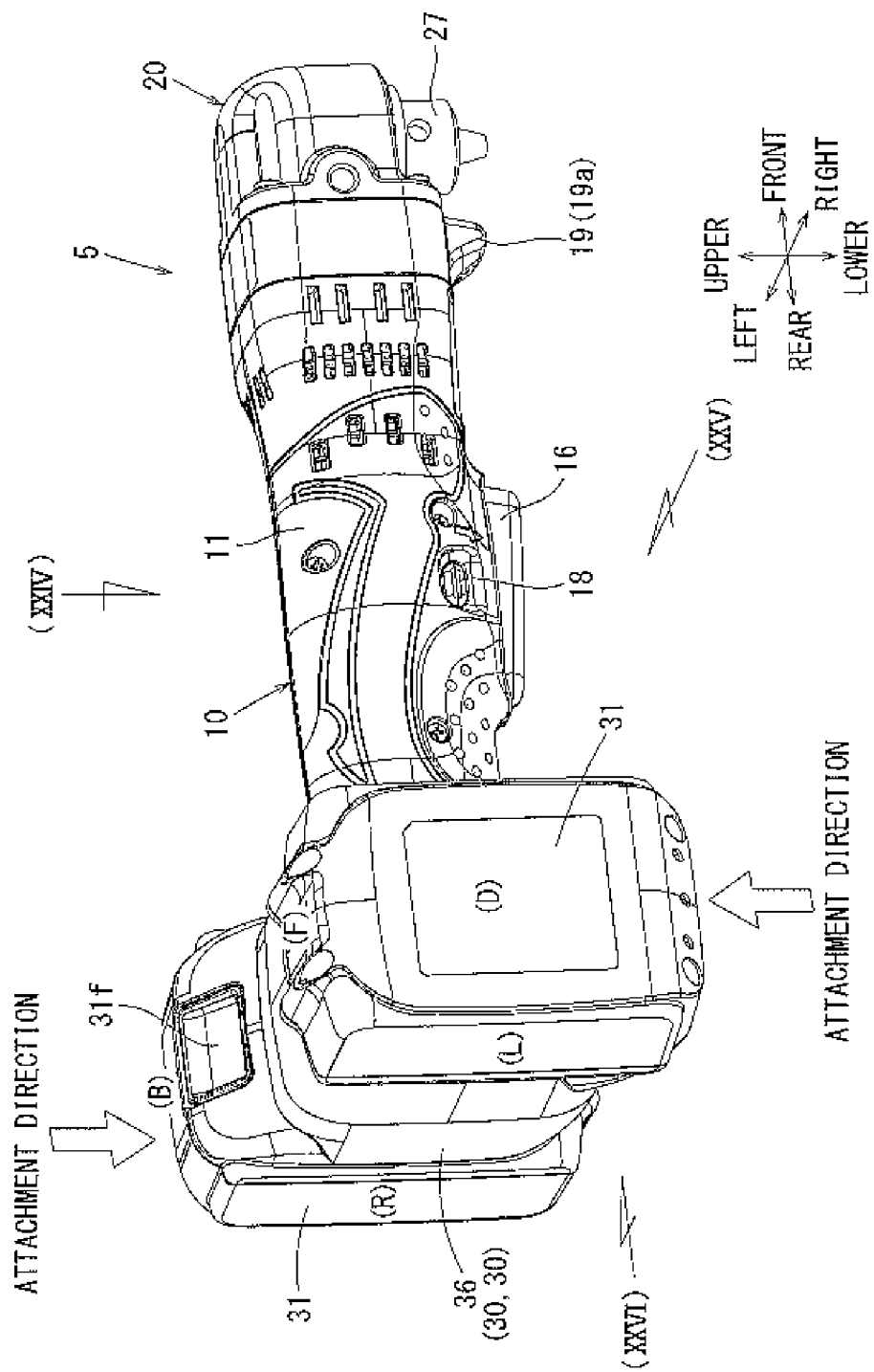
FIG. 23 illustrates a perspective view of an electric tool in accordance with a fifth embodiment.
Figure 24:
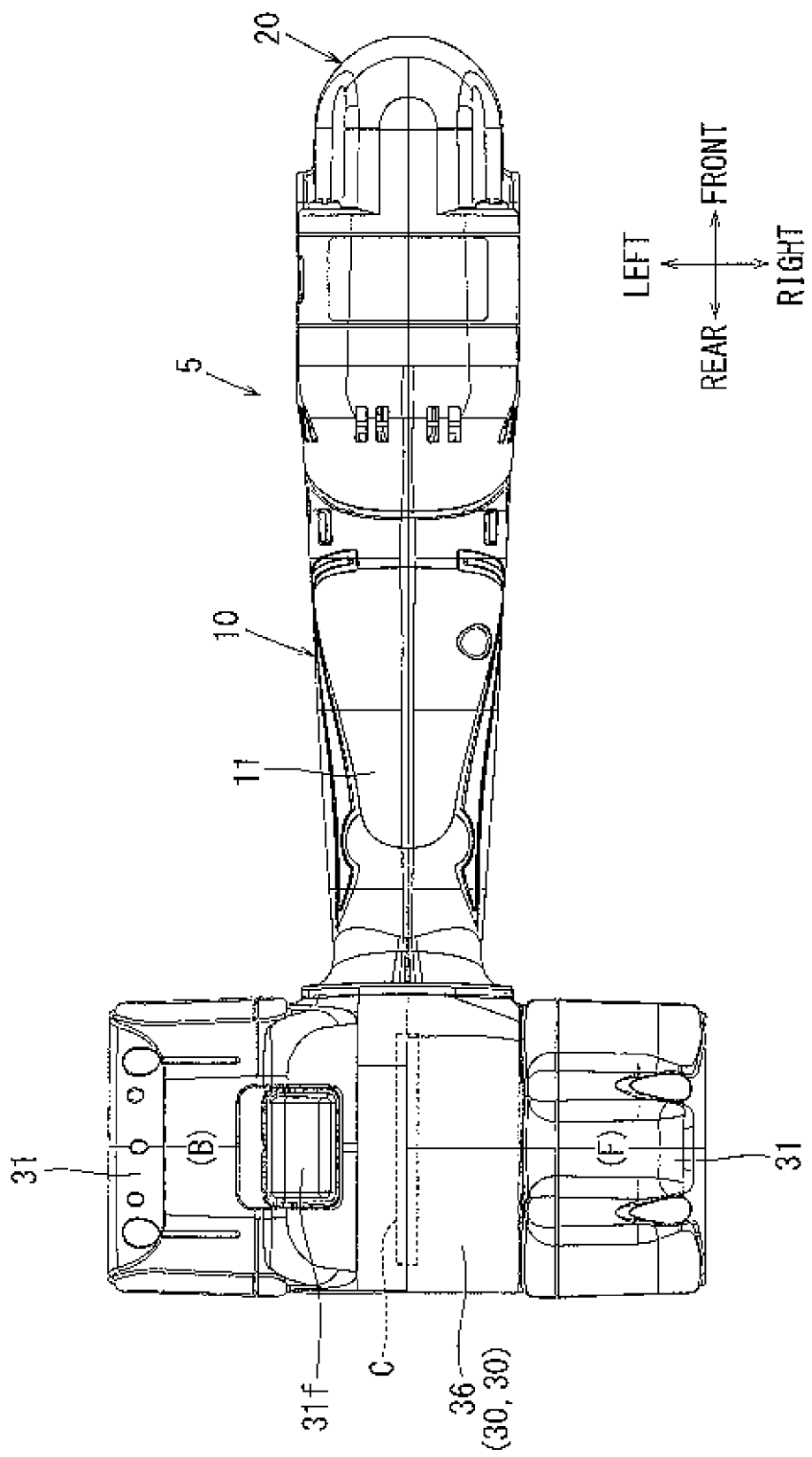
FIG. 24 illustrates a plan view of the electric tool in accordance with the fifth embodiment, as seen in a direction of an arrow (XXIV) in FIG. 23.
Figure 25:
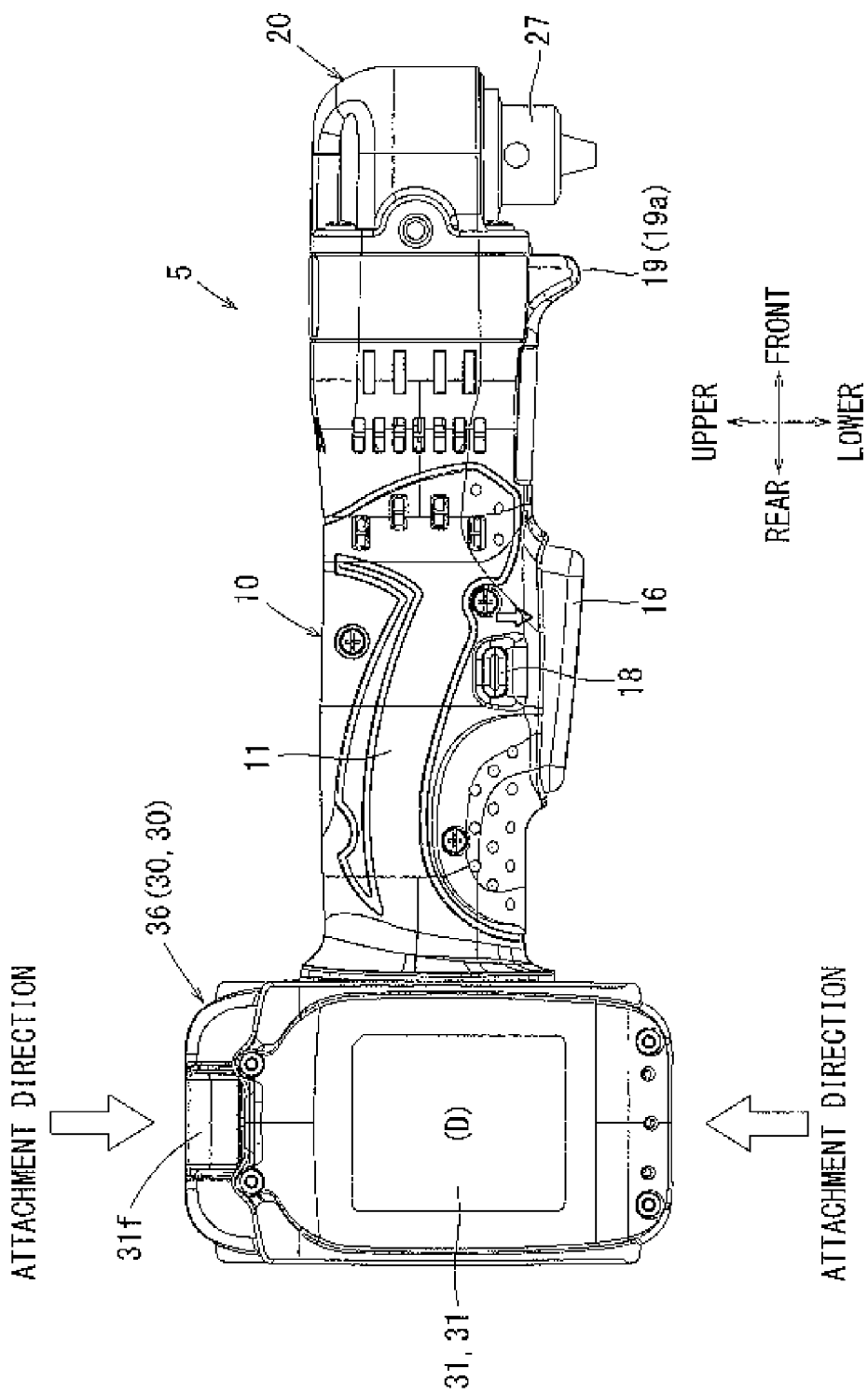
FIG. 25 illustrates a right side view of the electric tool in accordance with the fifth embodiment, as seen in a direction of an arrow (XXV) in FIG. 23.
Figure 26:
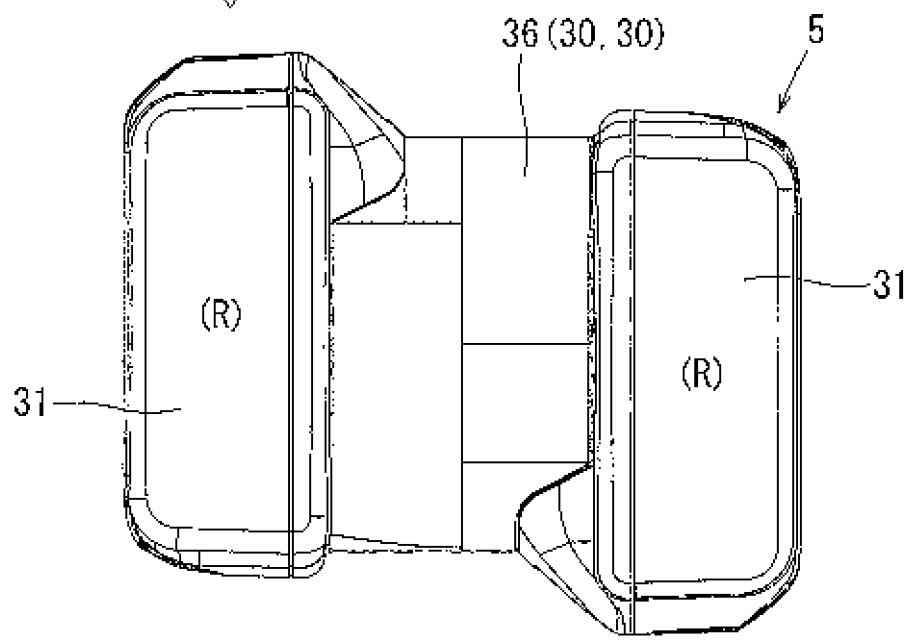
FIG. 26 illustrates a rear view of the electric tool in accordance with the fifth embodiment, as seen in a direction of an arrow (XXVI) in FIG. 23.

Referring now to FIGS. 23 through 26, an electric tool 5 in accordance with the fifth embodiment is shown. The fifth embodiment may differ from the fourth embodiment in that the attachment directions of the two batteries 31 may be opposite each other. Similar to that shown in the fourth embodiment, a battery base 36 may be formed toward and/or at the rear of the main tool body 10 and may protrude backwards, i.e. away from the chuck 27. The battery attachment portions 30 may be positioned and/or arranged to extend along right and left sides of the battery base 36. Further, the right and left battery attachment portions may be arranged to face each other, i.e. to be opposite each other along a vertical and/or longitudinal direction. Thus, as indicated by the hollow arrows in the drawings, the attachment direction of the left-hand side battery 31 may be downward. Conversely, the attachment direction of the right-hand side battery 31 may be upward. The battery 31 attached to the left-hand side battery attachment portion 30 may be attached in a downward lengthwise orientation such that a rear surface B thereof may face upwards as shown in FIG. 23. Also, battery 31 attached to the right-hand side battery attachment portion 30 may be attached in an upward lengthwise orientation such that the front surface F thereof may face upwards. Moreover, the right-hand side and left-hand side batteries 31 may be attached in a longitudinal and/or lengthwise orientation such that their upper surfaces U face each other.

In accordance to that shown in both the fourth and fifth embodiments, the two batteries 31 may be attached to the corresponding battery attachment portions 30 such that the height Z direction of each battery 31 extends horizontally such that two batteries 31 may face each other when viewed in a right-to-left direction. Thus, the weight of the two batteries 31 may be balanced across a center axis spanning the length of the electric tool 1. Further, the configuration shown by the fourth and fifth embodiments may allow for the electric tool 1 to be relatively compact in the vertical direction, the horizontal direction, and the front-to-rear direction.

Figure 27:
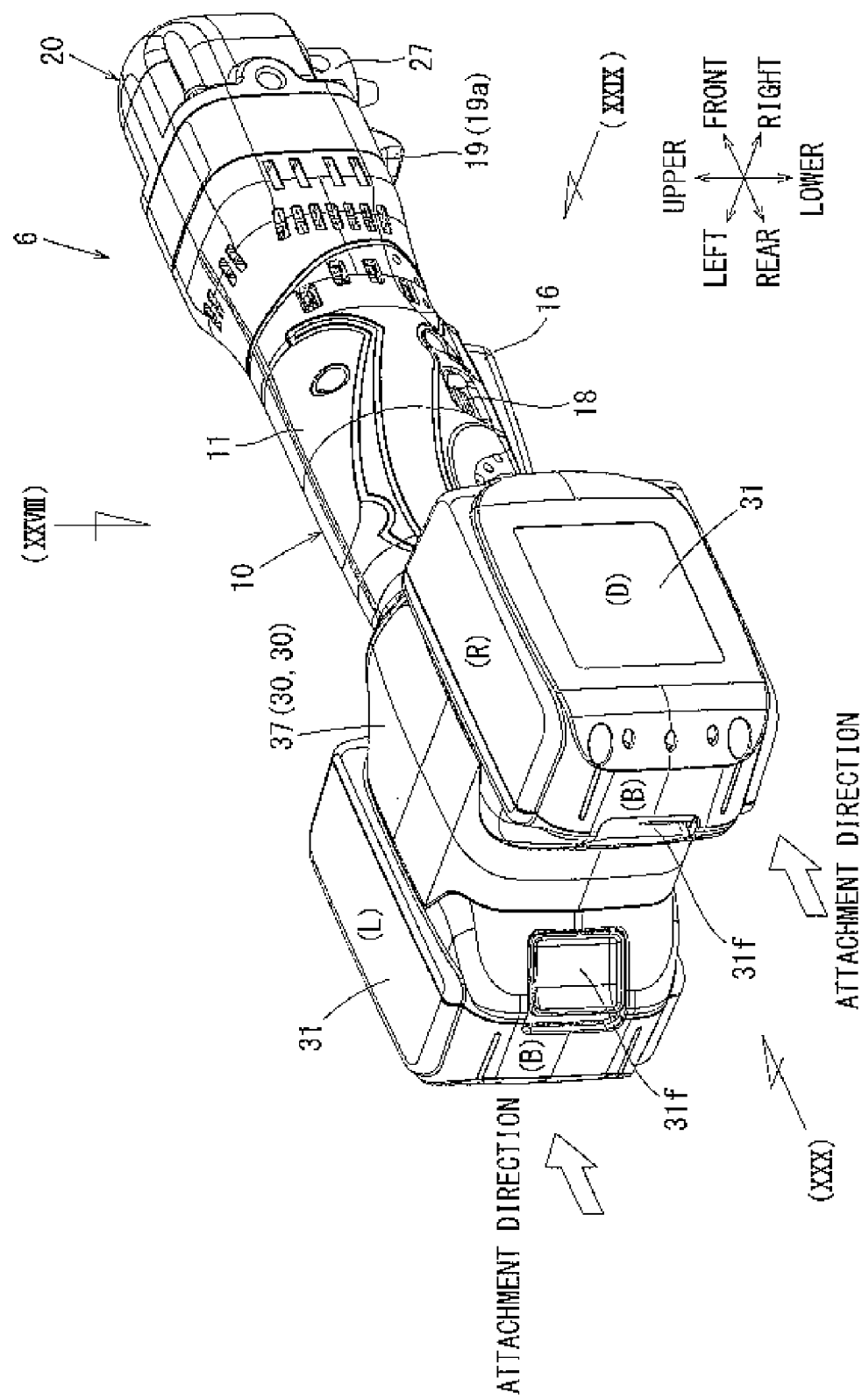
FIG. 27 illustrates a perspective view of an electric tool in accordance with a sixth embodiment.
Figure 28:
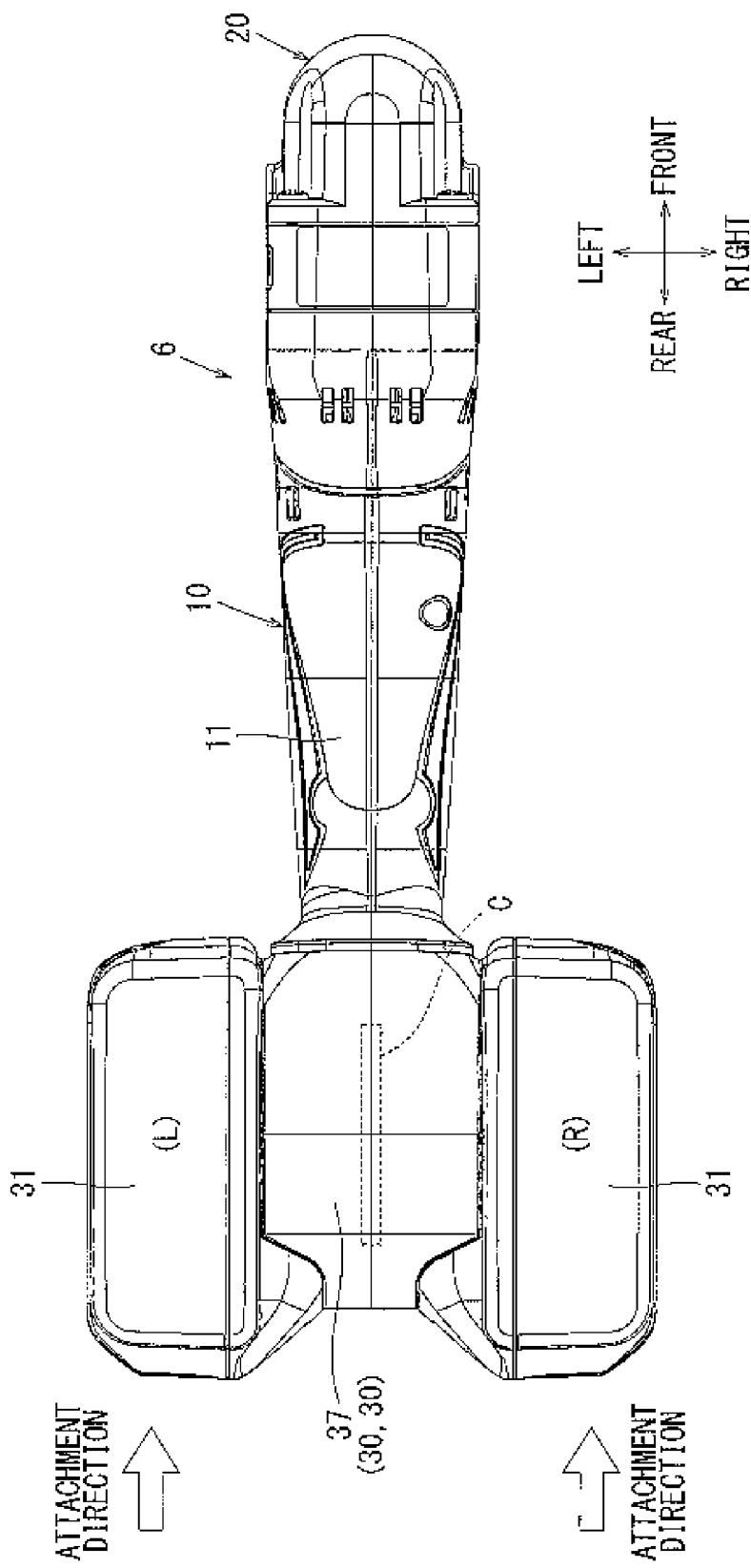
FIG. 28 illustrates a plan view of the electric tool in accordance with the sixth embodiment, as seen in a direction of an arrow (XXVIII) in FIG. 27.

Referring now to FIGS. 27 through 30, an electric tool 6 in accordance with the sixth embodiment is shown. In the sixth embodiment, the battery attachment portions 30 may be arranged at right-hand side and left-hand side of a battery base 37 formed at the rear of the main tool body 10, i.e. away from the chuck 27. Moreover, the battery attachment portions 30 may be arranged horizontally such that their attachment/detachment direction extends along the front-to-rear direction of the main tool body 10. Thus, the two batteries 31 may be inserted and attached to the corresponding battery attachment portions 30 in a forward lateral orientation. In detail, the longitudinal direction of the two batteries 31 may extend in the front-to-rear direction of the main tool body 10 where the front surfaces F of the two batteries 31 may be directed toward the front of the main tool body 10 as shown in FIG. 27. Further, the two batteries 31 may be attached in a lateral orientation such that their upper surfaces U face each other.

As indicated by the hollow arrows in FIGS. 27 through 30 both the batteries 31 are inserted into and attach with the corresponding battery attachment portions 30 in a forward-facing direction, i.e. toward the chuck 27. Thus, the two batteries 31 may be attached to the battery attachment portions 30 such that the back surfaces B of the batteries 31 may be directed toward a rear of the electric tool 1, i.e. away from the chuck 27.

Figure 29:
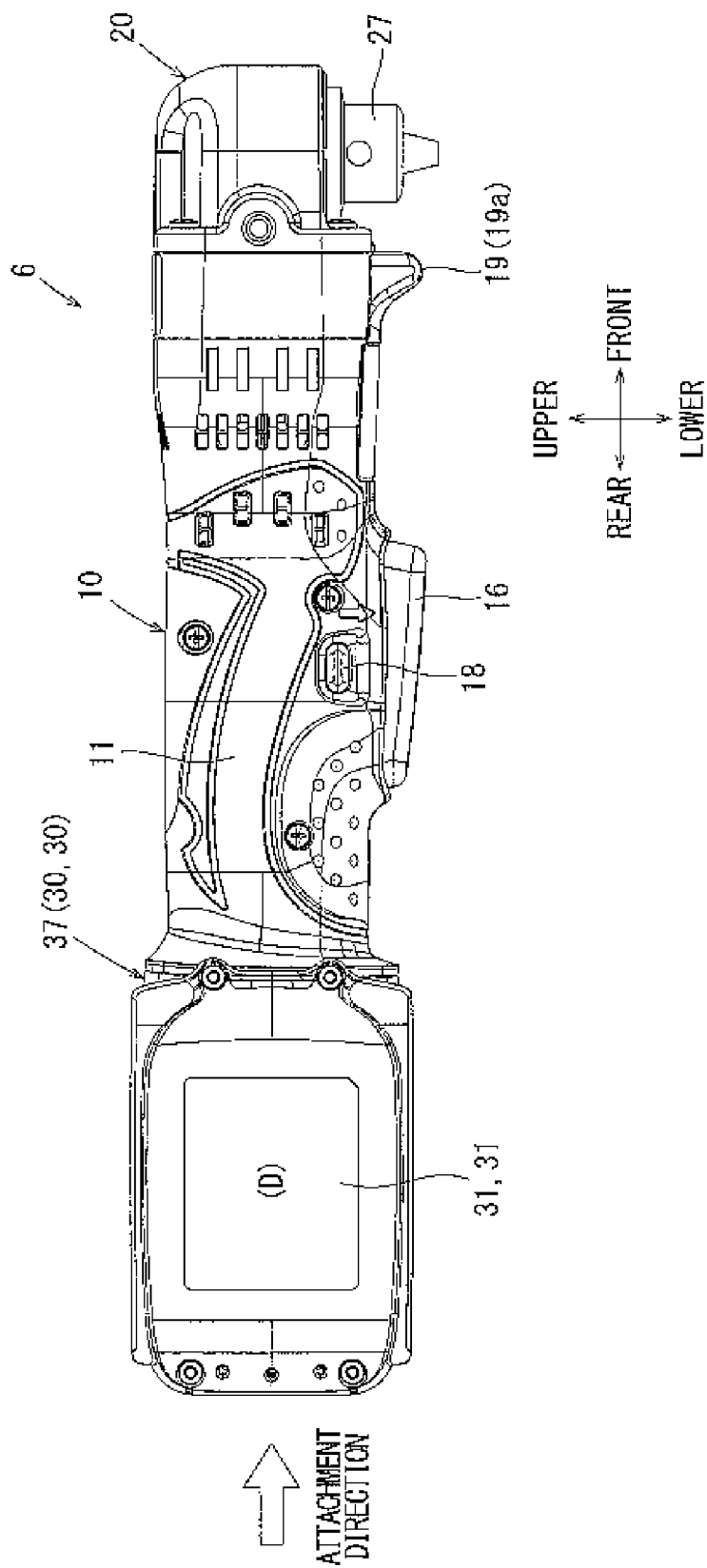
FIG. 29 illustrates a right side view of the electric tool in accordance with the sixth embodiment, as seen in a direction of an arrow (XXIX) in FIG. 27.
Figure 30:
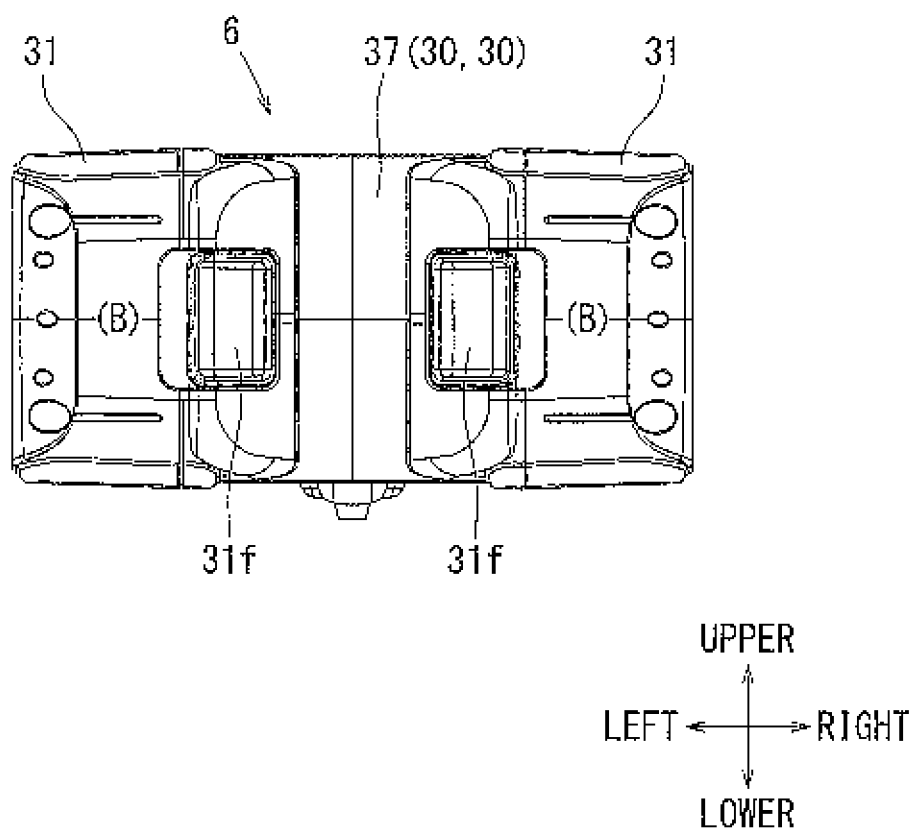
FIG. 30 illustrates a rear view of the electric tool in accordance with the sixth embodiment, as seen in a direction of an arrow (XXX) in FIG. 27.

Further, and in accordance with the sixth embodiment the sixth embodiment, the two batteries 31 may be attached such that the longitudinal direction (i.e. the length-wise X direction) extends along the front-to-rear direction of the electric tool 1 and that the two batteries 31 may be positioned to face each other, i.e. in a generally horizontal configuration as shown in FIG. 27. Also, and as shown in FIG. 29, a size of attachment space for the batteries in the vertical direction may require only the size of one battery in the vertical direction. The lateral and/or horizontal configuration of the two batteries 31 allows for the electric tool 1 to occupy a relatively smaller volume than that shown by earlier embodiments, i.e. where the batteries 31 were attached in an upright and/or longitudinal direction. The horizontal configuration shown by the sixth embodiment may allow the electric tool 1 to perform a drilling operation efficiently in a space which is relatively small in, for example, the vertical direction.

Figure 31:
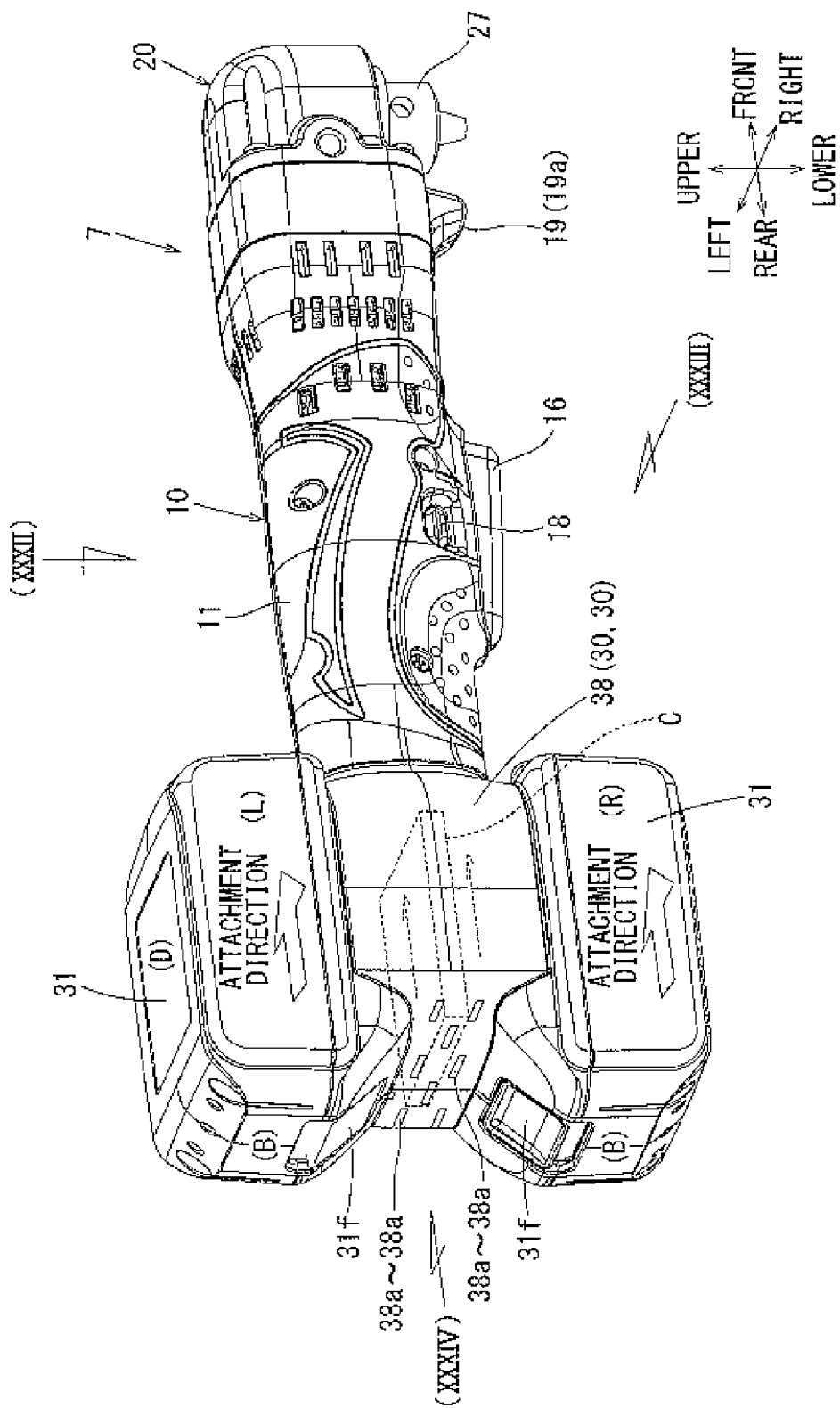
FIG. 31 illustrates a perspective view of an electric tool in accordance with a seventh embodiment.

Referring now to FIGS. 31 through 34, an electric tool 7 in accordance with the seventh embodiment is shown. Reviewing that discussed earlier for the sixth embodiment, the two batteries 31 may be horizontally attached in a forward lateral orientation such that their upper surfaces U face each other. In contrast, the seventh embodiment differs from the sixth embodiment with regard to the orientation of the attachment of the two batteries 31 to the corresponding battery attachment portions 30 relative to the electric tool 1. Specifically, as shown here for the seventh embodiment, the two batteries 31 may be arranged vertically, i.e. with one battery 31 above the remaining battery 31. Further, the batteries 31 may be inserted into and/or attached with the corresponding battery attachment portions by sliding in, for example, a forward direction and such that the upper surfaces U of the batteries face each other as shown in FIG. 31.

The battery attachment portions 30 may be arranged respectively on the upper and lower surfaces of a battery base 38 formed toward and/or at the rear of the main tool body 10, i.e. away from the chuck 27. As in the sixth embodiment, the two battery portions 30 may be arranged such that the attachment orientation and/or direction of the batteries 31 may be forward. Thus, the seventh embodiment may correspond to a construction obtained by displacing and/or rotating the battery base 37 by 90 degrees about the motor axis, i.e. to rotate both the batteries 31 and the battery attachment portions 30 from that shown by the sixth embodiment to that shown by the seventh embodiment.

Figure 32:
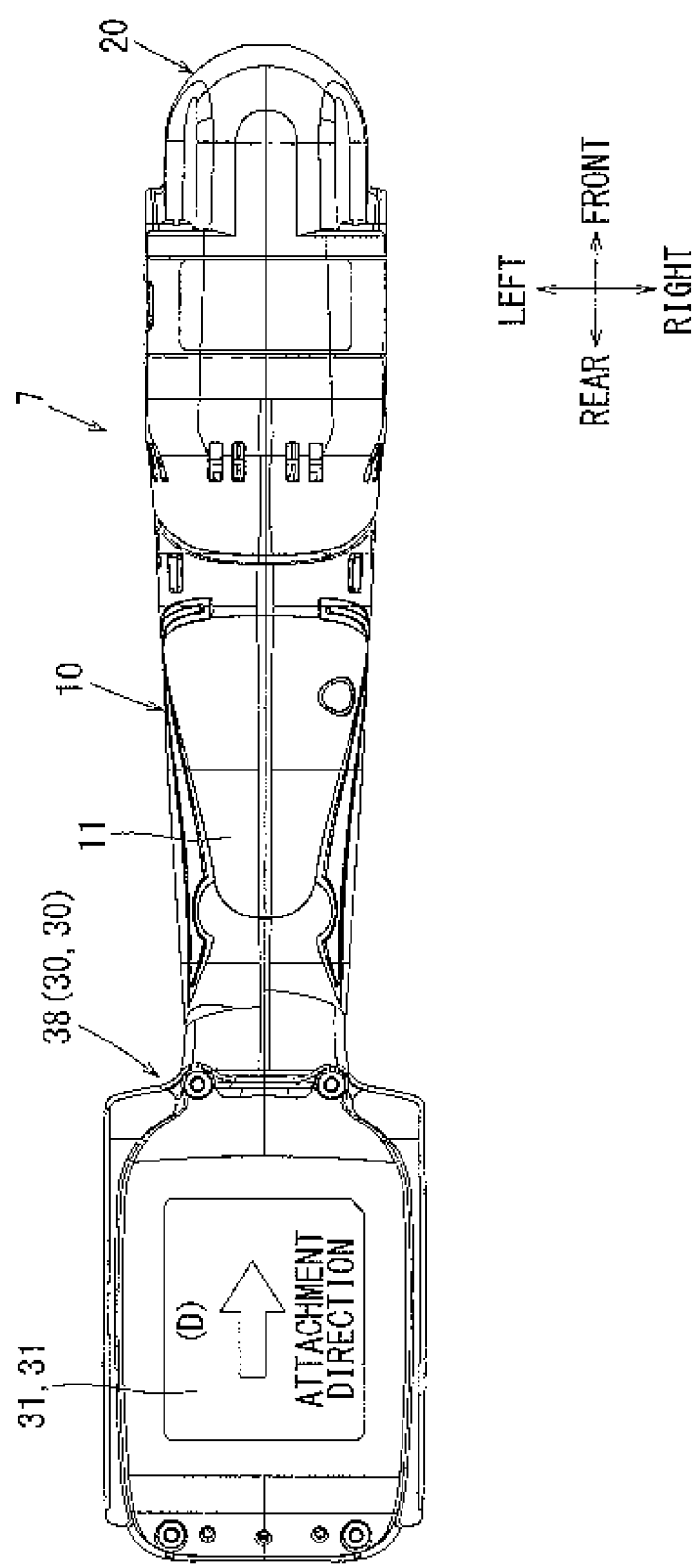
FIG. 32 illustrates a plan view of the electric tool in accordance with the seventh embodiment, as seen in a direction of an arrow (XXXII) in FIG. 31.
Figure 33:
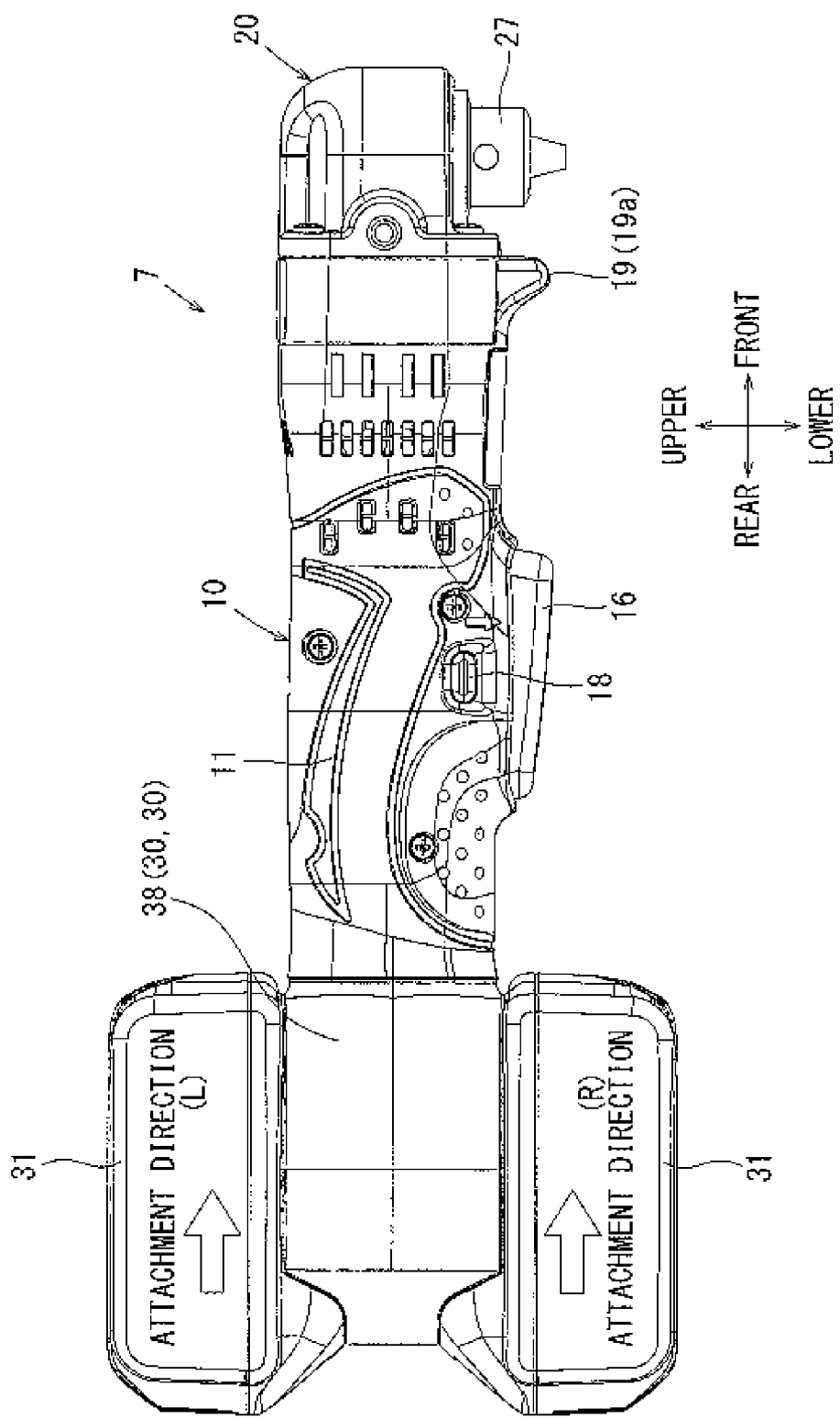
FIG. 33 illustrates a right side view of the electric tool in accordance with the seventh embodiment, as seen in a direction of an arrow (XXXIII) in FIG. 31.
Figure 34:
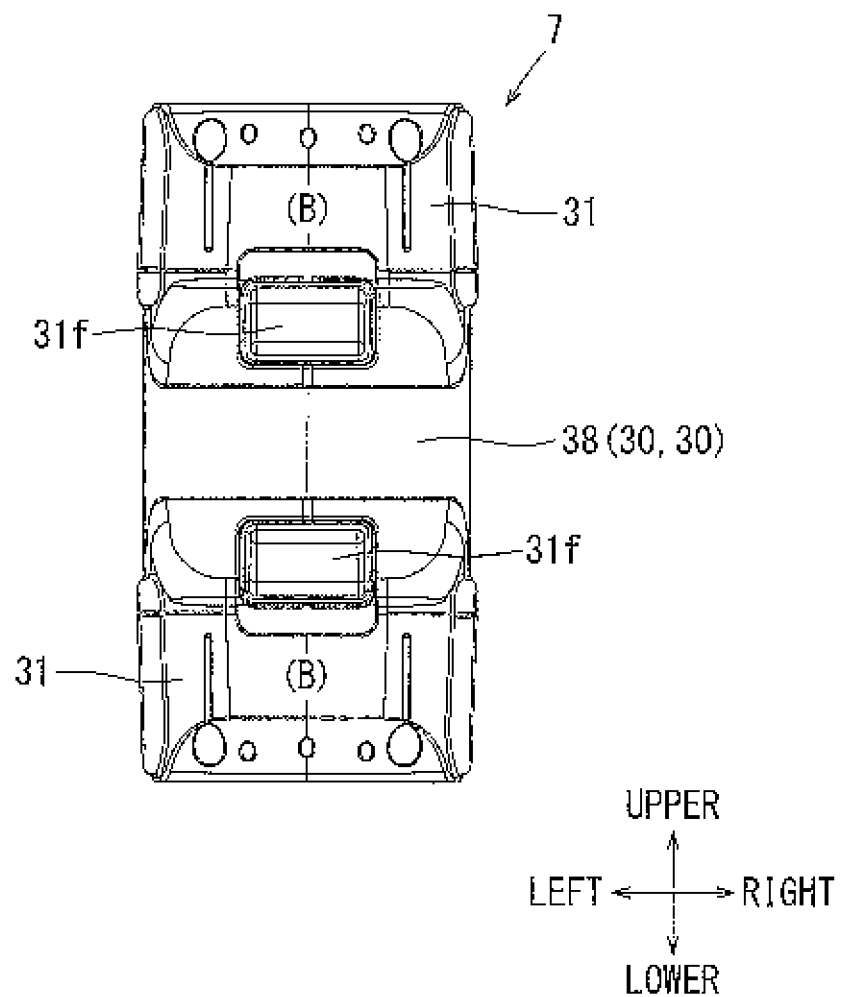
FIG. 34 illustrates a rear view of the electric tool in accordance with the seventh embodiment, as seen in a direction of an arrow (XXXIV) in FIG. 31.
Figure 35:
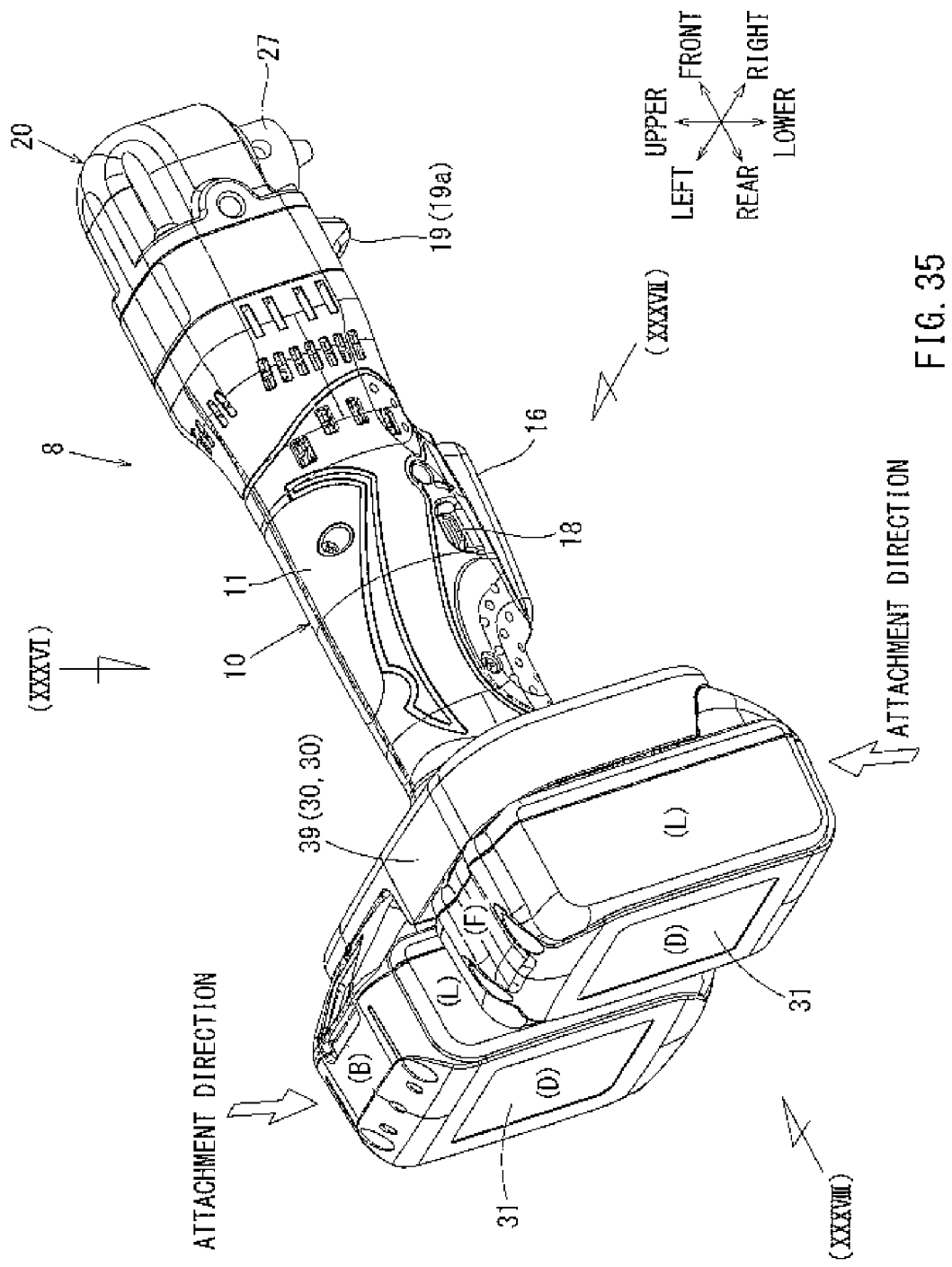
FIG. 35 illustrates a perspective view of an electric tool in accordance with an eighth embodiment.
Figure 36:
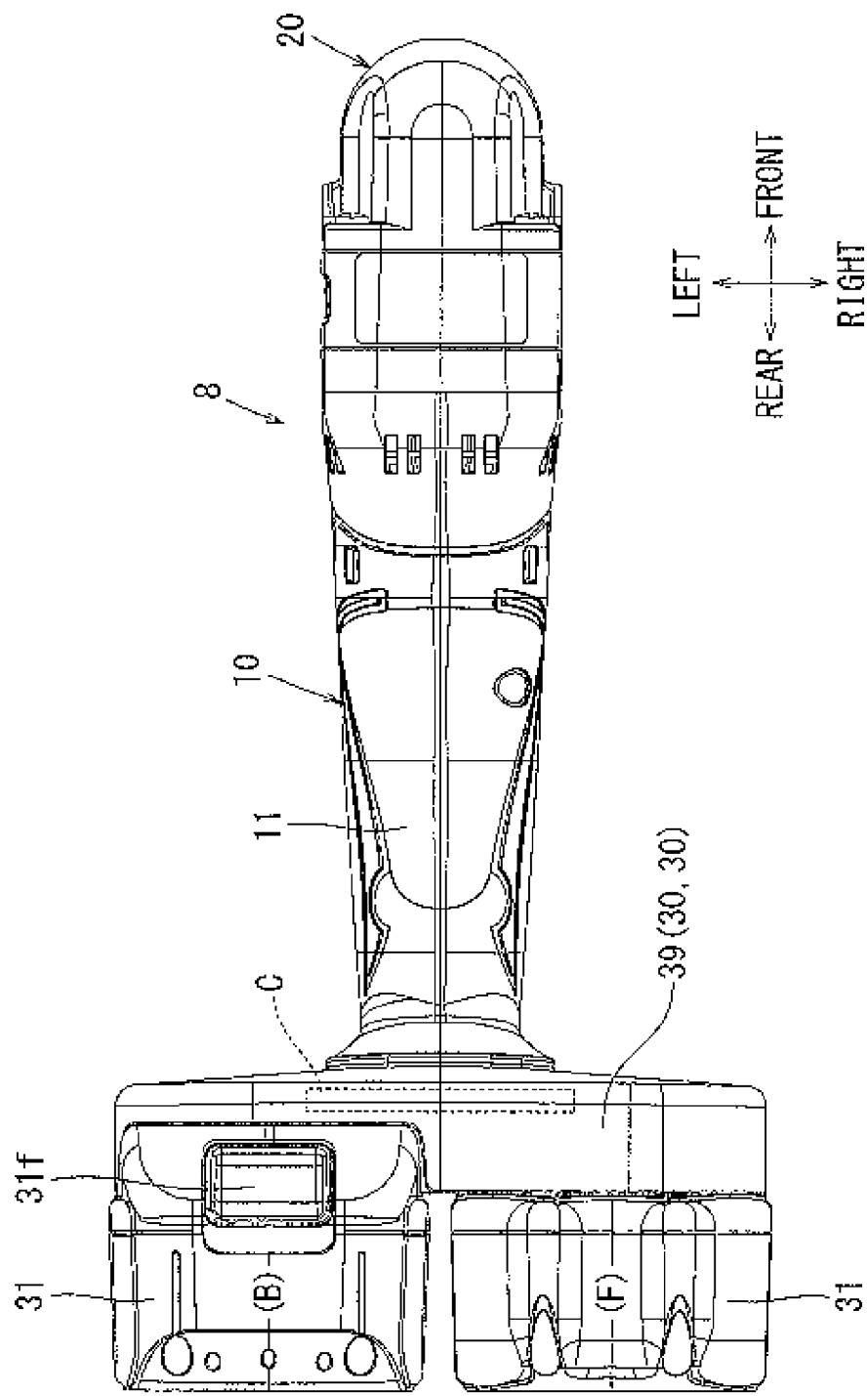
FIG. 36 illustrates a plan view of the electric tool in accordance with the eighth embodiment, as seen in a direction of an arrow (XXXVI) in FIG. 35.

The two batteries 31 may be inserted into and attached to the battery attachment portions 30 by sliding forward as indicated by hollow arrows in FIGS. 31 through 33 in an orientation such that the longitudinal direction of the two batteries 31 extends in the front-to-rear direction. Thus, in an attached condition, the back faces B of the upper and lower batteries 31 may be directed backwards.

In accordance with the seventh embodiment, the two batteries 31 may be attached to face each other vertically, with the longitudinal direction (i.e., length X direction) of the batteries 31 extending in the front-to-rear direction as shown in FIGS. 31 through 33. Further, as shown in FIG. 32, a size of attachment space for the batteries in the right-to-left direction may require only the size of one battery when viewed in the right-to-left direction. Such a configuration as described here may allow for the efficient performance of a drilling operation in a relatively small and/or tight space in the right-to-left direction.

The battery bases 35 through 38 of the fourth through seventh embodiments described above may also include the controller board C, which may be configured to primarily control the electric motor 12, i.e. activating and/or deactivating the electric motor 12. As shown in FIG. 31 illustrating the seventh embodiment, intake ports 38a may be formed near and/or in rear surfaces of the battery bases 35 through 38 of the fourth through seventh embodiments. Further, the intake ports 38a may receive air from outside the electric tool and redirect the air within the electric tool 1 as indicated by the dashed-line arrows in the drawing. In detail, the air may flow toward the main tool body 10 to cool the electric motor 12. The controller board C may be arranged at, for example, a midpoint of the route taken by air traveling to the motor such that the controller board C is also cooled by the air.

Referring now to FIGS. 35 through 38, an electric tool 8 in accordance with the eighth embodiment is shown. In detail, aspects of the eighth embodiment may generally correspond to that shown and discussed earlier in connection with at least the first embodiment and the second embodiment. Specifically, the two batteries 31 may be attached in a longitudinal and/or lengthwise orientation in which the longitudinal direction (i.e., length-wise X direction) of the batteries 31 extends in the vertical direction while the batteries 31 are arranged horizontally, i.e. side-by-side. With regard to the attachment direction of the batters 31, both of two batteries 31 may be attached downwardly in the first embodiment. In contrast, both of two batteries 31 may be attached upwardly in the second embodiment. In comparison to that shown and discussed for both the first and second embodiments, the eighth embodiment allows for one of the two batteries 31 to be attached in an upward direction, while the remaining battery of the two batteries 31 may be attached in a downward direction.

Specifically, in the eighth embodiment, the left-hand side battery 31 of the two batteries 31 may slide into and thus be attached to a corresponding battery attachment portion 30 in a downward lengthwise orientation. In comparison, the right-hand side battery 31 may be similarly attached to a corresponding battery attachment portion 30, but by sliding in an upward lengthwise orientation. Thus, as indicated by the hollow arrows in the drawing, the attachment direction of the left-hand side battery 31 may be downward, and the attachment direction of the right-hand side battery 31 may be upward. Accordingly, while attached to their corresponding battery attachment portions 30, the rear surface B of the left-hand side battery 31 and the front surface F of the right-hand side battery 31 may be facing and/or directed upwards.

Similar to the first and second embodiments, a battery base 39 may be formed near and/or at the rear of the main tool body 10 to extend in both right and left directions. The battery base 39 may also be configured to include the controller board C, which may be configured primarily to control the electric motor 12. Two battery attachment portions 30 may be arranged on a rear surface of the battery base 39 to be arranged horizontally, i.e. side-by-side. Although not shown in the FIGS., the left-hand side battery attachment portion 30 may be arranged such that the engagement recess 30d thereof is located on an upper part of the battery attachment portion 30 (i.e., the same orientation as shown in FIG. 9), whereas the right-hand side battery attachment portion 30 may be arranged such that the engagement recess 30d thereof is located on a lower part of the battery attachment portion 30.

Figure 37:
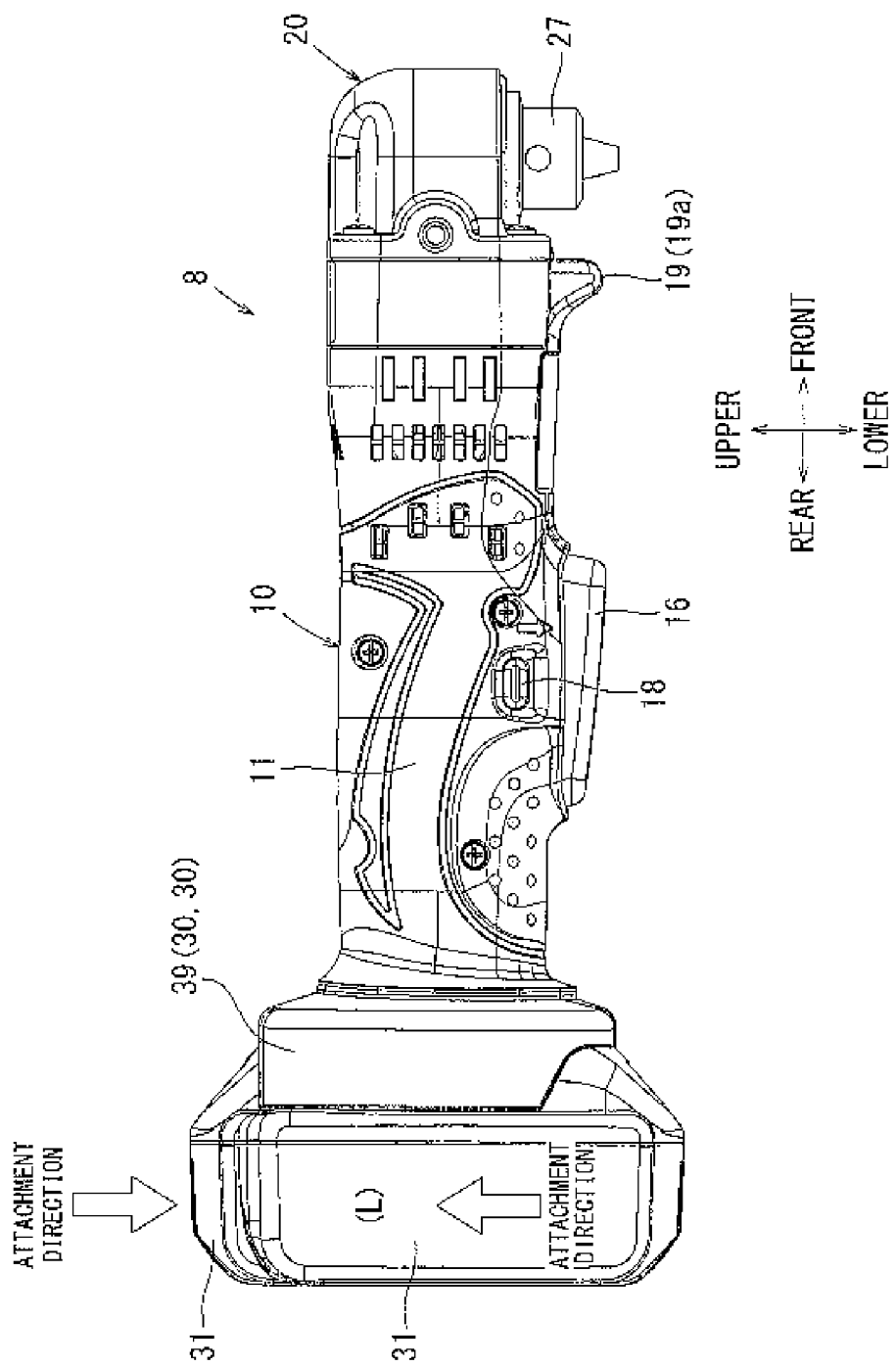
FIG. 37 illustrates a right side view of the electric tool in accordance with the eighth embodiment, as seen in a direction of an arrow (XXXVII) in FIG. 35.
Figure 38:
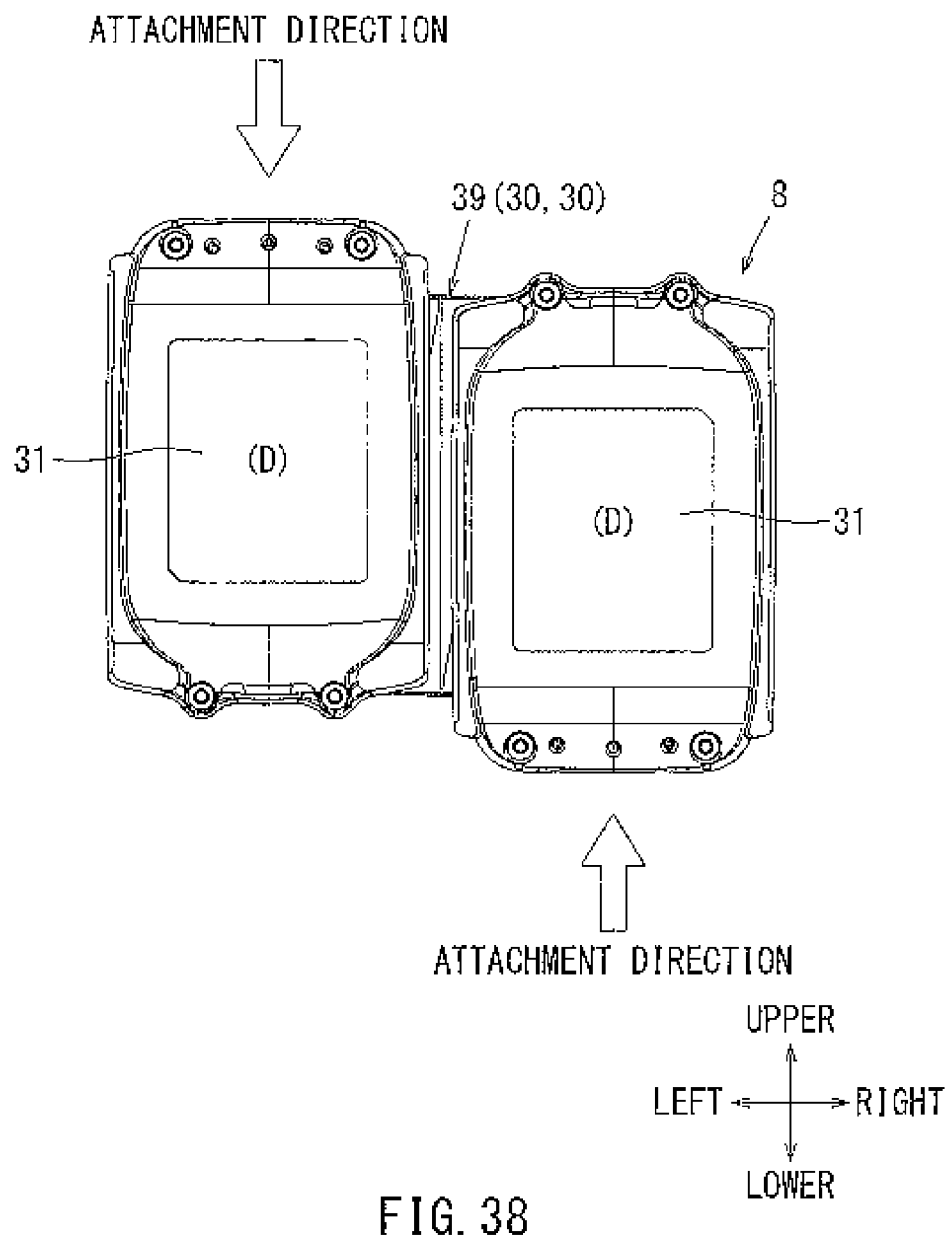
FIG. 38 illustrates a rear view of the electric tool in accordance with the eighth embodiment, as seen in a direction of an arrow (XXXVIII) in FIG. 35.
Figure 39:
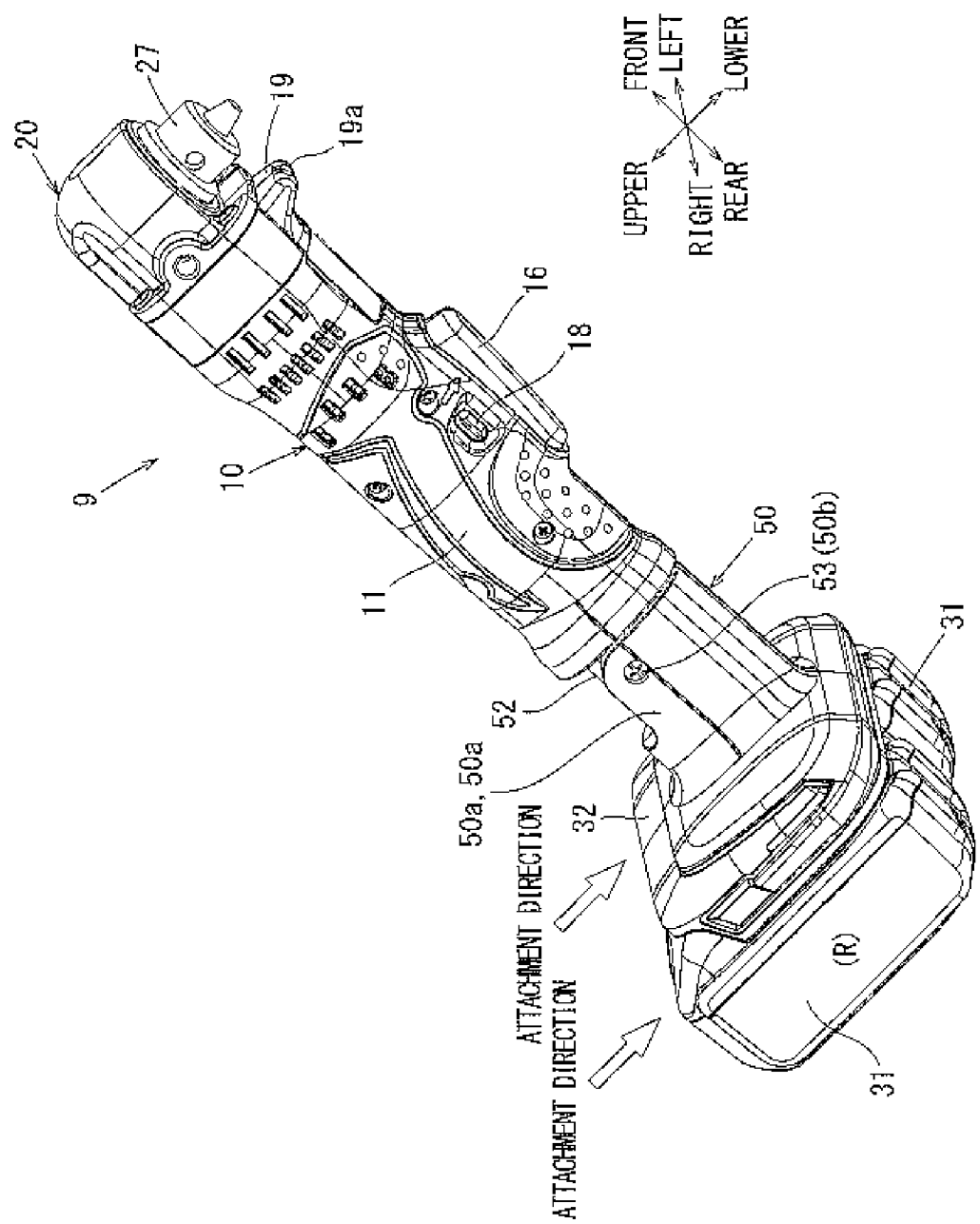
FIG. 39 illustrates a perspective view of an electric tool in accordance with a ninth embodiment in a configuration where a leg erects with respect to a tool body.

Similar to the first and second embodiments, the two batteries 31, in accordance with the eighth embodiment, may be attached such that the longitudinal direction (i.e. the length X direction) of the batteries 31 extends along the vertical direction while arranged horizontally, i.e. side-by-side (i.e. twice the size of width Y). Such a configuration may be relatively compact when viewed in the right-to-left direction when compare to a configuration where the batteries 31 may be attached in a horizontal orientation such that their width Y direction extends along the vertical direction while arranged horizontally, i.e. side-by-side (i.e. twice the size of length X). Similar to that shown and discussed for the first and second embodiments, the two batteries 31 may be attached while arranged horizontally, i.e. side-by-side. Further, the sizes of the space occupied by the batteries 31 in the vertical direction and the longitudinal direction may require only the sizes, i.e. the dimension, of one battery of the batteries 31 in those directions, as shown in FIG. 37. Such a configuration of the batteries 31 as disclosed by the eighth embodiment may allow for drilling operation to be performed efficiently in a relatively tight space spaces and/or confines especially along the vertical direction (i.e. the axial direction of the drill bit) or relatively small space at the rear of the electric tool 1.

Referring now to FIGS. 39 through 46, an electric tool 9 in accordance with the ninth embodiment is shown. In detail, the electric tool 9 of the ninth embodiment may differ from the electric tool 1 of the first embodiment with regard to the inclusion of several additional, unique features, such as a tiltable leg portion 50 at a rear of the main tool body 10, and a battery base 32 configured to attach the two batteries 31 formed at a rear of the leg portion 50. The main tool body 10 and a gear head 20 may be generally of the same construction as that of the first embodiment. Various members, components, etc. that are identical to that of the first embodiment are indicated by the same reference numerals, and a respective description thereof will be omitted.

Figure 40:
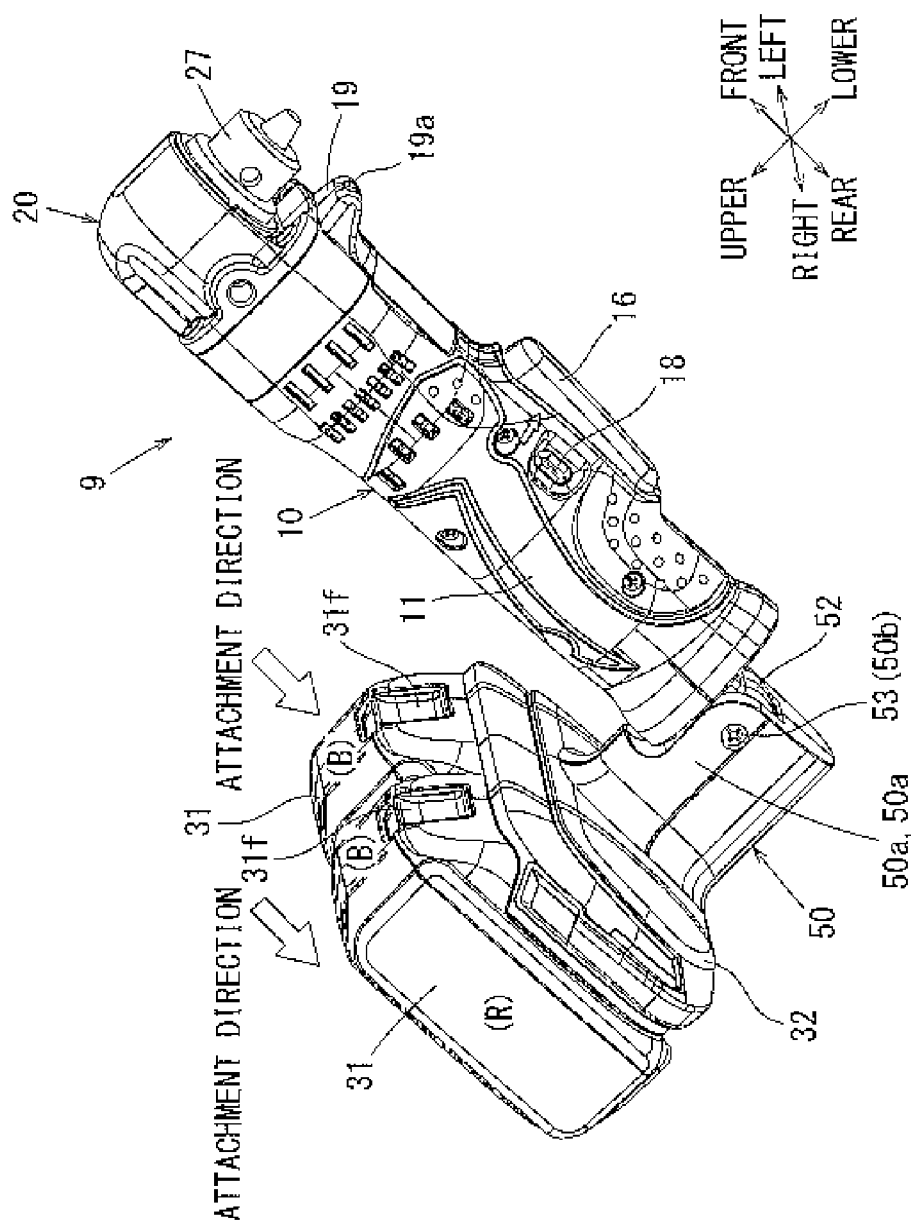
FIG. 40 illustrates a perspective view of the electric tool in accordance with the ninth embodiment in a configuration where a leg is positioned in an erect position with respect to a main tool body.
Figure 41:
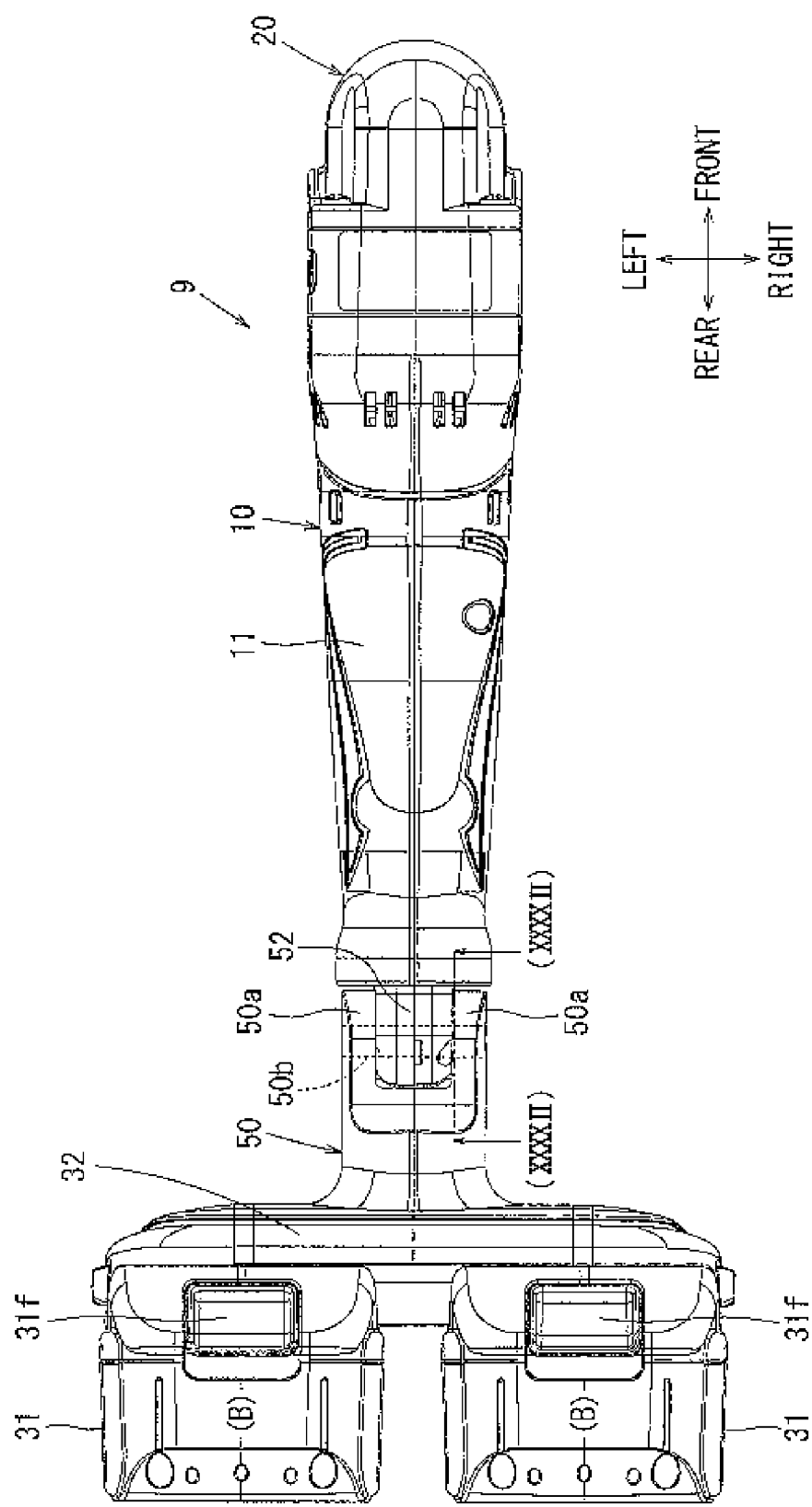
FIG. 41 illustrates a plan view of the electric tool in accordance with the ninth embodiment in a configuration where the leg is positioned in the erect position with respect to the main tool body.

As shown in FIG. 41, a support protrusion 52 may be integrally formed with the main body housing 11 to extend outwardly from the main body housing 11. Also, the leg portion 50 may be tiltably connected to the support protrusion 52, i.e. such that the leg portion 50 may tilt and/or at least partially rotate to be positioned at an angle relative to the main body housing 11 of the electric tool 9 as shown in FIG. 40. Connection edges 50a may be integrally formed at a front end of the leg portion 50 such that the connection edges 50a may be parallel to each other to generally form a forked pattern and/or configuration. The support protrusion 52 may be inserted between the connection edges 50a. Next, the support protrusion 52 may be connected so as to allow relative rotation by a connection shaft portion 50b provided between the connection edges 50a. Accordingly, the leg portion 50 may be connected to the rear portion of the main tool body 10 to be tiltable in, for example, the vertical direction. The connection portion described here is illustrated in further detail in at least FIGS. 42, 45, and 46.

A support hole 52b (not shown in the FIGS.) may be formed at a center of the support protrusion 52 to extend there-through in the thickness direction of the electric tool 9 (i.e. the width-wise and/or horizontal direction). In detail, the connection shaft portion 50b may be inserted into the support hole 52b. Further, the connection shaft portion 50b may be generally formed as a cylinder, and be supported and/or held in place at both ends, while in between both connection edges 50a, by a screw 53 inserted and screwed into an inner surface of the connection shaft portion 50b.

Figure 42:
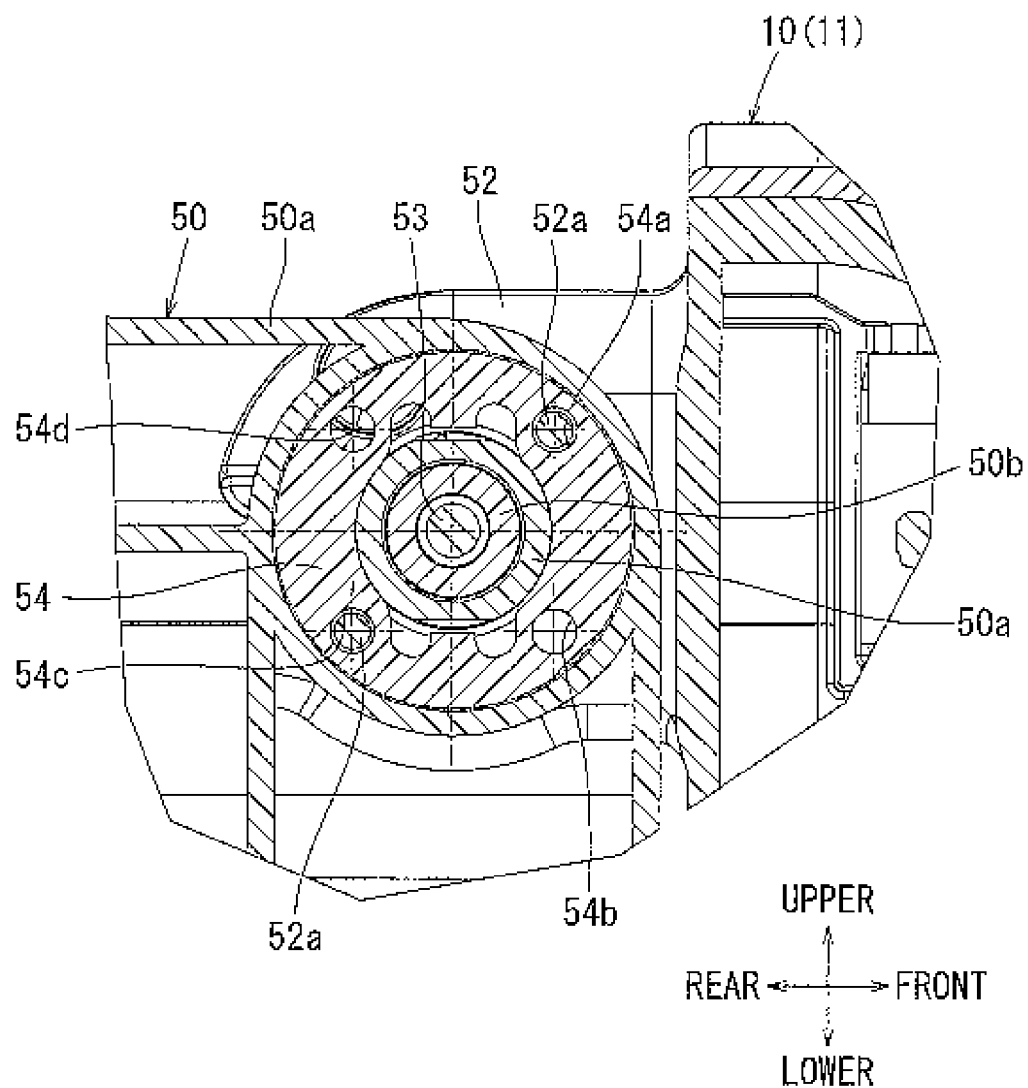
FIG. 42 illustrates a longitudinal sectional view of a tiltable support portion of the leg taken along line (XXXXII)-(XXXXII) in FIG. 41.
Figure 43:
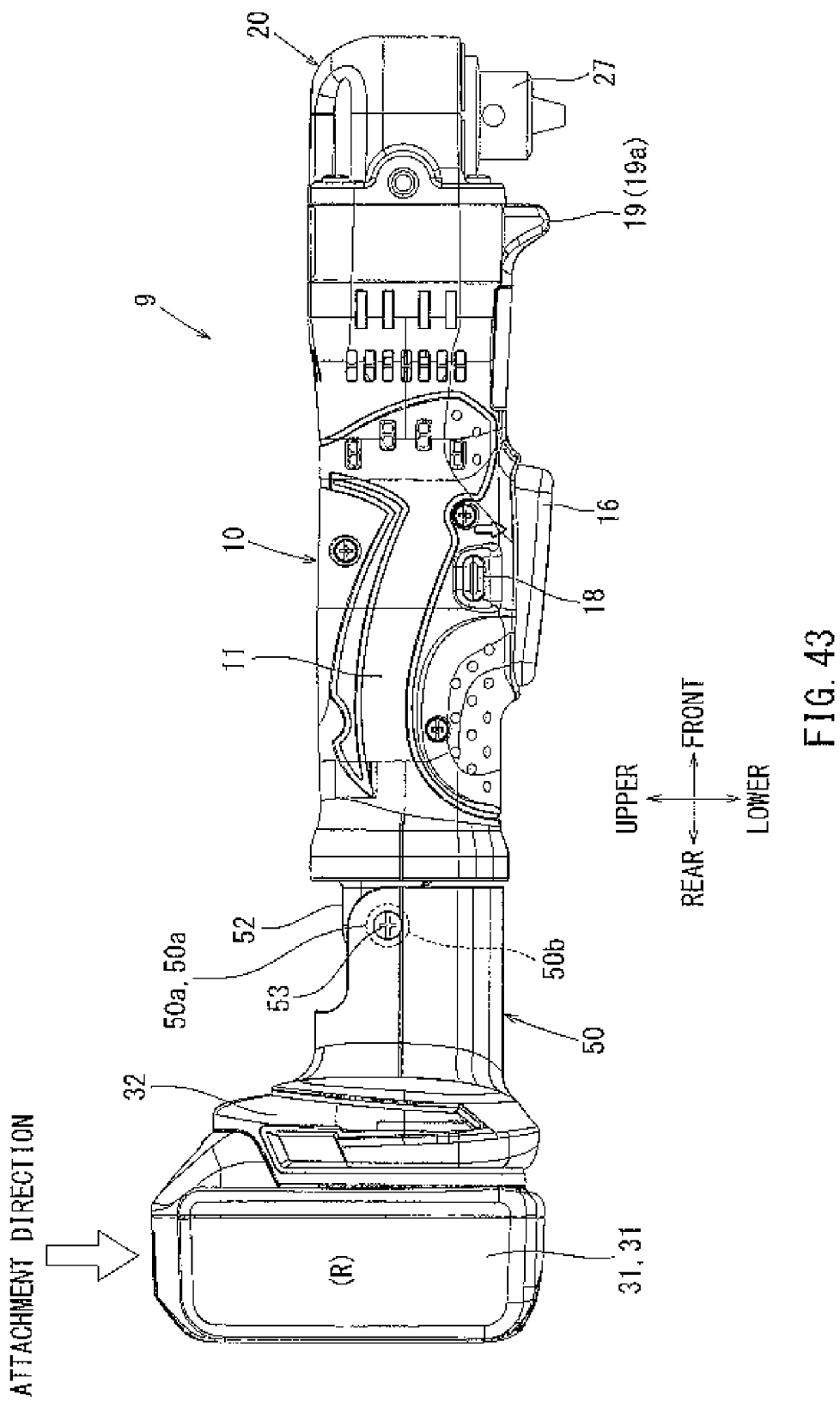
FIG. 43 illustrates a side view of the electric tool in accordance with the ninth embodiment in a configuration where the leg is positioned in the erect position with respect to the main tool body.

As shown in FIG. 42, two steel balls 52a may be retained on each of right-hand side and left-hand side surfaces of the support protrusion 52, specifically such that the two steel balls 52a may both be retained on the same circular region while being mutually mutually deviated from each other by 180 degrees, i.e., retained at positions opposite each other. The four steel balls 52a in total may be held in place to emerge from the surfaces of the support protrusion 52. Engagement plates 54 of an annular configuration may be superimposed on the right and left surfaces of the support protrusion 52. The two engagement plates 54 may be fixed to the connection edge 50a and exhibit a degree of elasticity in the thickness direction of the connection edge 50a.

Four circular holes (i.e. a first through fourth engagement holes 54a through 54d) may be formed and positioned in each of the two engagement plates 54 on the same circle at, for example, equal intervals. Two steel balls 52a on the support protrusion 52 may be inserted and/or fitted into two engagement holes 54a and 54c (or 54b and 54d) of the four engagement holes 54a through 54d, which may be deviated from each other by 180 degrees, i.e., situated on opposite sides. The steel balls 52a may be formed with a specific elasticity and/or bias to be able to enter and/or be elastically fitted into the engagement holes 54a through 54d due to the elasticity of the engagement plate 54.

In the configuration shown in FIGS. 39 and 41 through 44, the leg portion 50 may be positioned, set and/or retained in generally straight and/or erect position where the leg portion 50 is positioned straight with respect to the main tool body 10. As shown in FIG. 42, the erect position of the leg portion 50 with respect to the main tool body 10 may be held in place and/or otherwise maintained by steel balls 52a which may be elastically fitted into the first engagement hole 54a on the front upper position and the third engagement hole 54c on the rear lower position of the four engagement holes 54a through 54d. At this time, the second engagement hole 54b on the front lower position and the fourth engagement hole 54d on the rear upper position may be empty.

Alternatively, as shown in FIG. 40, when the leg portion 50 is upwardly rotated (i.e. clockwise as seen in the drawing) by 90 degrees into a bent position, both engagement plates 54 may be tilted and/or rotated in the same direction by 90 degrees with the leg portion 50. As a result of the clockwise rotation by 90 degrees of the two engagement plates 54 from the state shown in FIG. 42, the two steel balls 52a may be elastically fitted into the second engagement hole 54b, which is displaced downwardly rearwards and into the fourth engagement hole 54d displaced upwardly forwards. The leg portion 50 may be held in place and/or retained in the bent position, with respect to the main tool body 10, due to the insertion and elastic fitting of the two steel balls 52a into the second and fourth engagement holes 54b and 54d.

Accordingly, the electric tool 9 of the ninth embodiment may include the leg portion 50 at the rear of the main tool body 10 to be capable tilting and/or bending from the erect position to the bent position. Similar to that shown and discussed for the first embodiment, the battery base 32 may be formed at the rear of the leg portion 50 to extend primarily in the right-to-left direction. As shown in FIG. 9, the two battery attachment portions 30 may be formed on the rear surface of the battery base 32 and arranged horizontally, i.e. side-by-side. The two battery attachment portions 30 may be electrically connected to the main tool body 10 by appropriate wiring (not shown in the FIGS.). Further, two separate 18V batteries 31 may be attached to the corresponding two battery attachment portions 30. Similar to the first embodiment, the attachment direction of the two 18V batteries 31 may be in a downward direction. The attached two 18V batteries 31 may be connected in series to function as a power source with a combined total output voltage of 36V.

Figure 44:
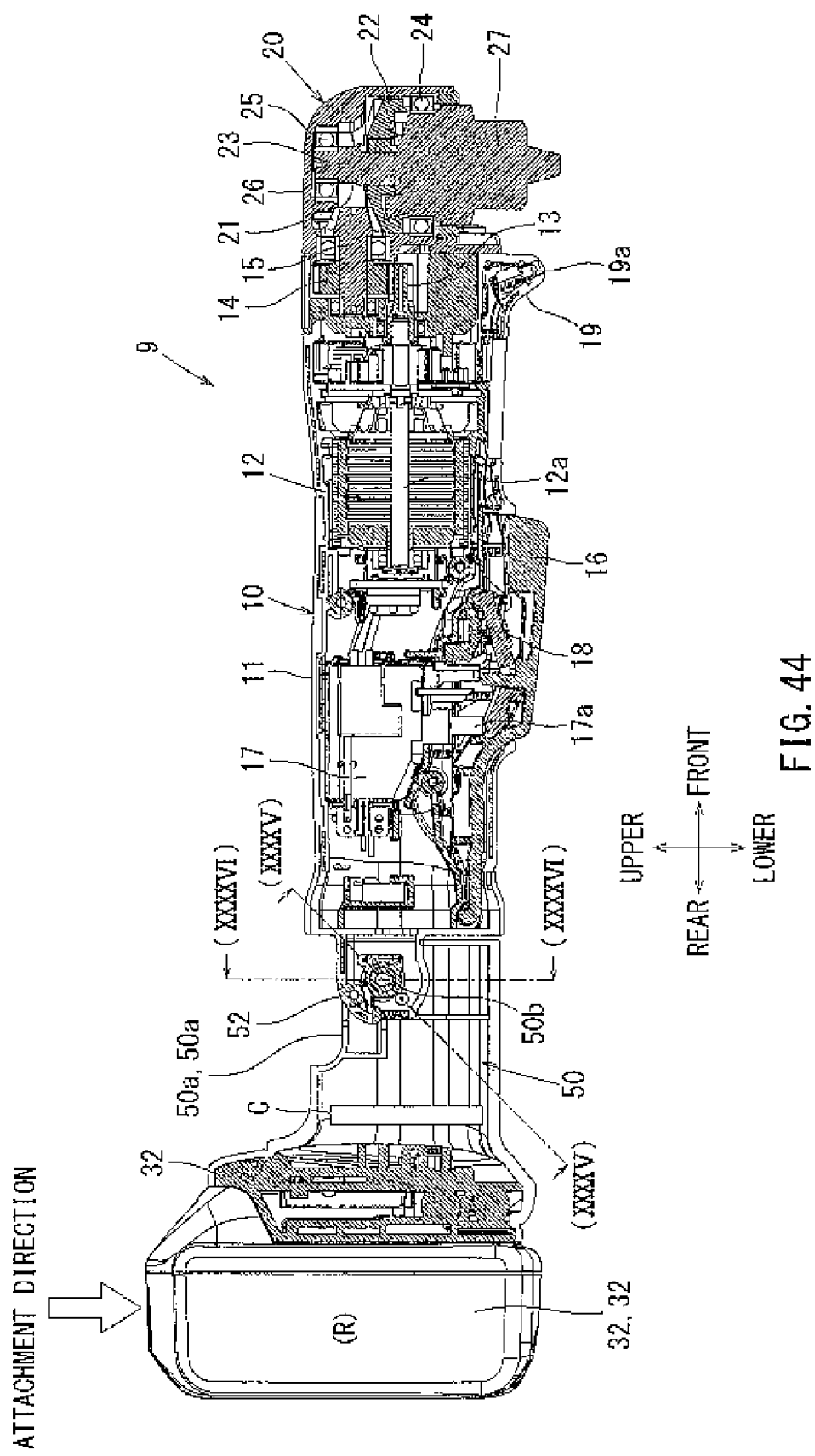
FIG. 44 illustrates a longitudinal sectional view of the electric tool in accordance with the ninth embodiment in a configuration where the leg is positioned in the erect position with respect to the main tool body.
Figure 45:
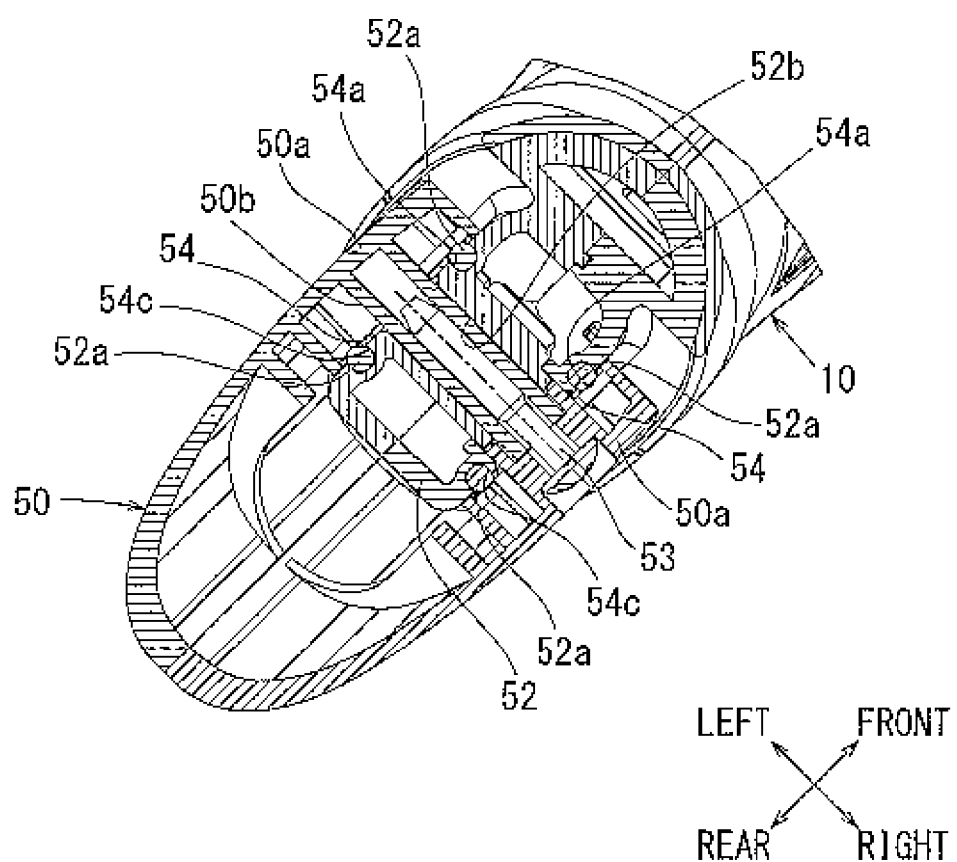
FIG. 45 illustrates a cross-sectional view of the tiltable support portion of the leg taken along line (XXXXV)-(XXXXV) in FIG. 44.
Figure 46:
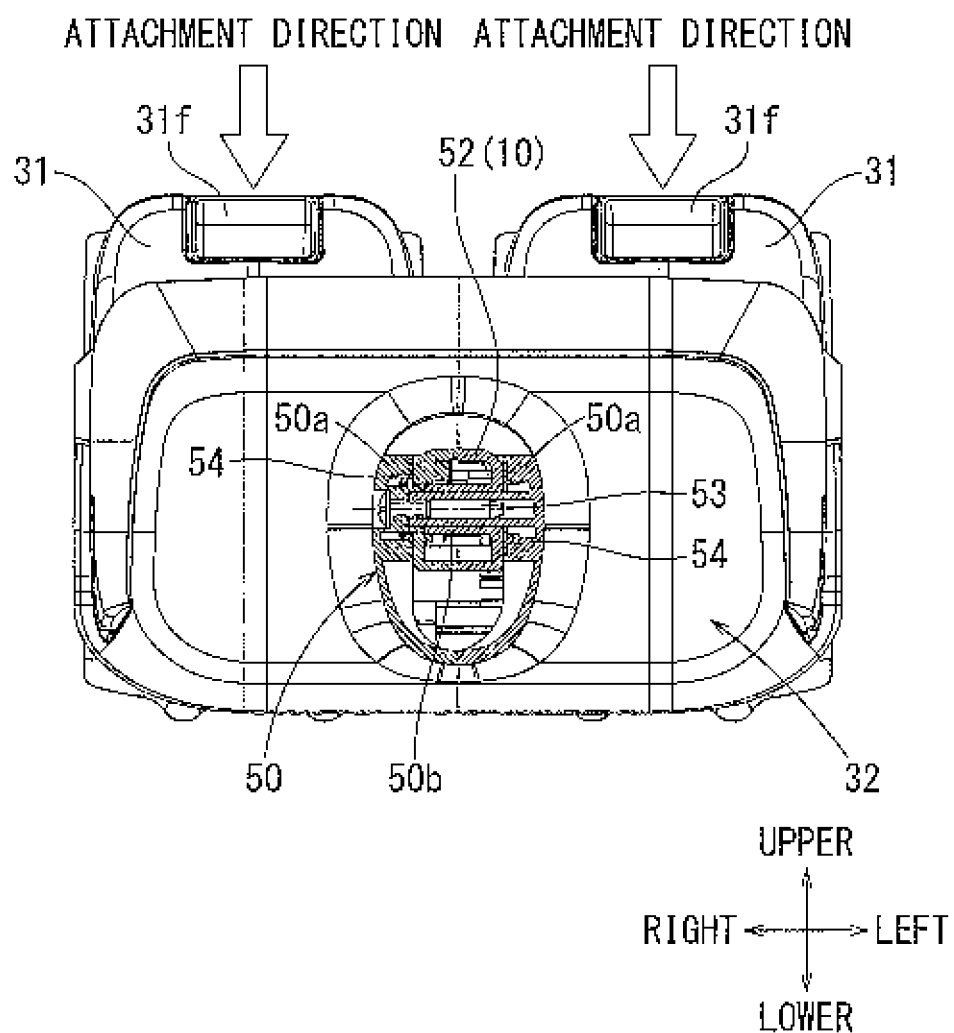
FIG. 46 illustrates a front view of a battery base taken along line (XXXXVI)-(XXXXVI) in FIG. 44.

Further, as shown in FIG. 44, the rear portion of the leg portion 50 may contain the controller board C which is configured to control the electric motor 12 in a method similar to that presented and discussed for the other embodiments.

The electric tool 9 of the ninth embodiment may be constructed and/or configured as described above. Specifically, the leg portion 50 may be provided at a rear of the main tool body 10 to be rotatable between an erect position and a bent position as discussed. Moreover, two 18V batteries 31 may be attached to the rear portion of the leg portion 50. Such a configuration as described may shorten a length of the electric tool 9 in the front-to-rear direction (i.e., longitudinal direction of the main tool body) by folding the leg portion 50 to a bent position. Thus, accommodation space for the electric tool 9 may be compact. Further, the electric tool 9 may be tilted and/or bent, as desired, by a user to operate in relatively compact and/or tight spaces.

Further, the electric tool 9 may be used in a space that is relatively small in the longitudinal direction to perform drilling operation when the leg portion 50 is folded to a bent position to, for example, make the electric tool 9 compact in the longitudinal direction. Such operational flexibility as described here enhances the overall usability of the electric tool 9.

As disclosed in the above-described embodiments, two rechargeable 18V batteries may be used together as a power source with a total output voltage of 36V by, for example, connecting the two rechargeable 18V batteries in series. Such a power source as described here, i.e. two 18V batteries connected in series to provide a total system output voltage of 36V, may allow the electric tools shown in one or more of the above-described embodiments to be relatively flexible in terms of power requirement, i.e. such that the electric tools may be powered by readily available 18V batteries, rather than a single potentially scarce and/or expensive 36V battery. As a result, the electric tools shown in the above embodiments may demand a total system output voltage of 36V, but may also be conveniently powered by two readily-available 18V connected in series as described above, and thus enjoy greater operational flexibility and cost-efficiency.

The above-described may be further modified. For example, the two batteries 31 may be attached to a right-hand side and a left-hand side of the main tool body 10 or to a right-hand side and a left-hand side of the gear head 20, provided that such a configuration does not negatively impact and/or interfere with how the main tool body 10 may be grasped by an operator. Also, although two 18V batteries 31 are attached to the corresponding battery attachment portions 30 in the above-described examples, three or more batteries may be attached to, for example, a corresponding number of battery attachment portions. Further, while the batteries are of a generally parallelepiped-shaped lithium ion battery of the slide attachment type (i.e. a type in which only one surface such as the upper surface U may be attached to the battery attachment portion 30) in the above examples, the present invention may also be modified to be applicable to a generally stick-shaped lithium ion battery of an insertion type (i.e. a type in which a battery may be inserted into a corresponding battery receptacle configured with battery connection terminals at a given depth). Further, the battery 31 as discussed in the above-described embodiments may not be restricted solely to a lithium ion battery, and the present invention may be configured to also accommodate various other types of batteries such as a nickel-cadmium battery, for example.

Further, while two 18V batteries 31 are used as the power source of the electric motor 12 of a rated voltage of 36V in the above-described embodiments, a plurality of batteries of a rated voltage connected in series may be used as a power source of an electric motor. Such an electric motor may be operated by an output voltage that corresponds to sum total of the rated voltage of the batteries.

Moreover, in addition to that presented and discussed in the above-described embodiments, the electric motor 12 may be powered by an electric battery of a rated voltage of 18V, where the two batteries 31 may be electrically connected in parallel, rather than in a series. Connecting the batteries 31 in parallel may increase length of time during which the batteries 31 may power the electric tool 1 and/or the electric tool 9.

Further, while the electric tool 1 and/or 9 may be referred to as an "angle drill" for a drilling operation in a relatively tight and/or small space, the present invention may also be applicable to an angle impact screwdriver (i.e. an impact driver, an impact wrench) which may be a screwdriver for screw tightening operation and which may contain an impact mechanism for applying an impact in the screw tightening direction.

First Embodiment

Figure 47:
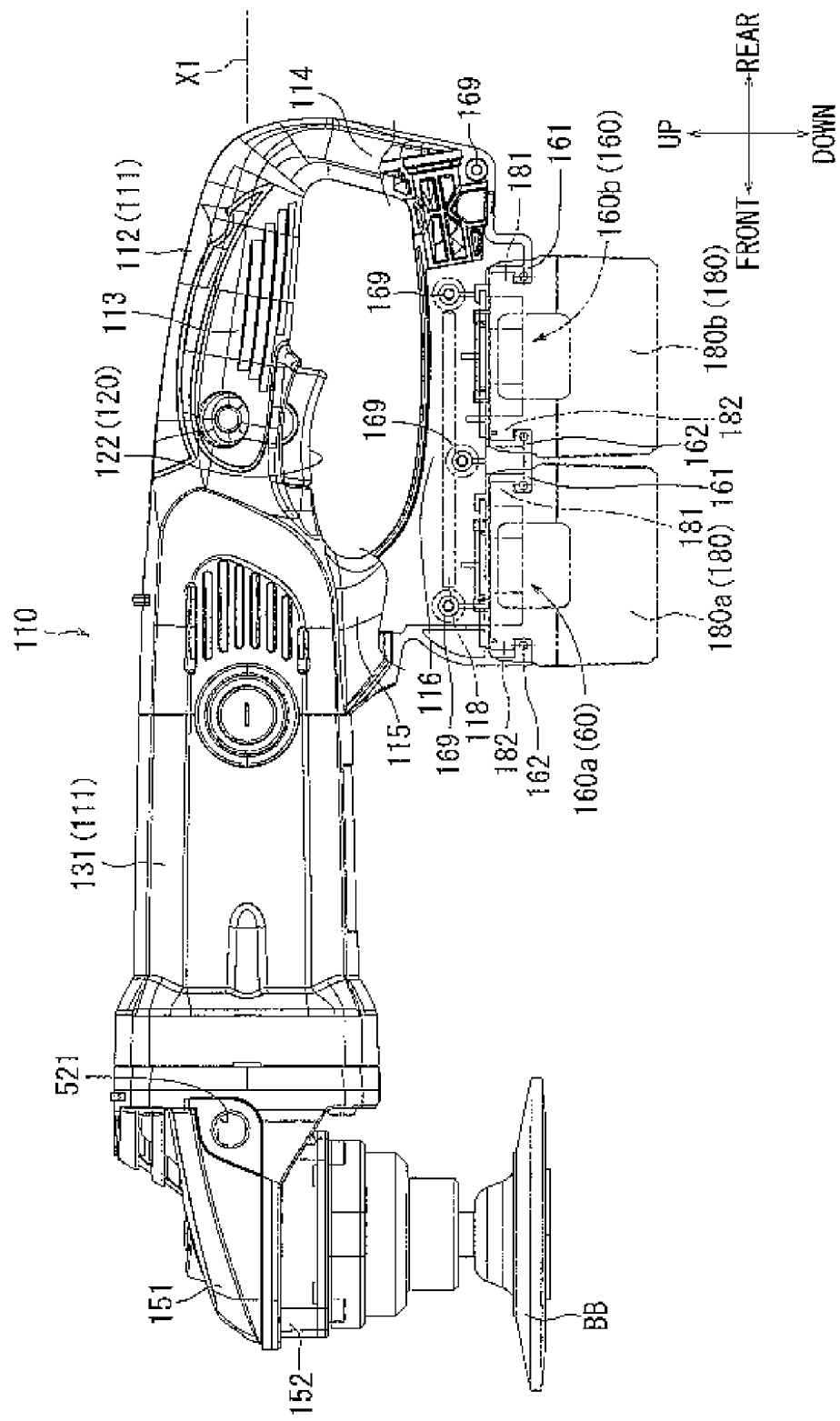
FIG. 47 is a side view of a disc grinder in accordance with a first embodiment.
Figure 48:
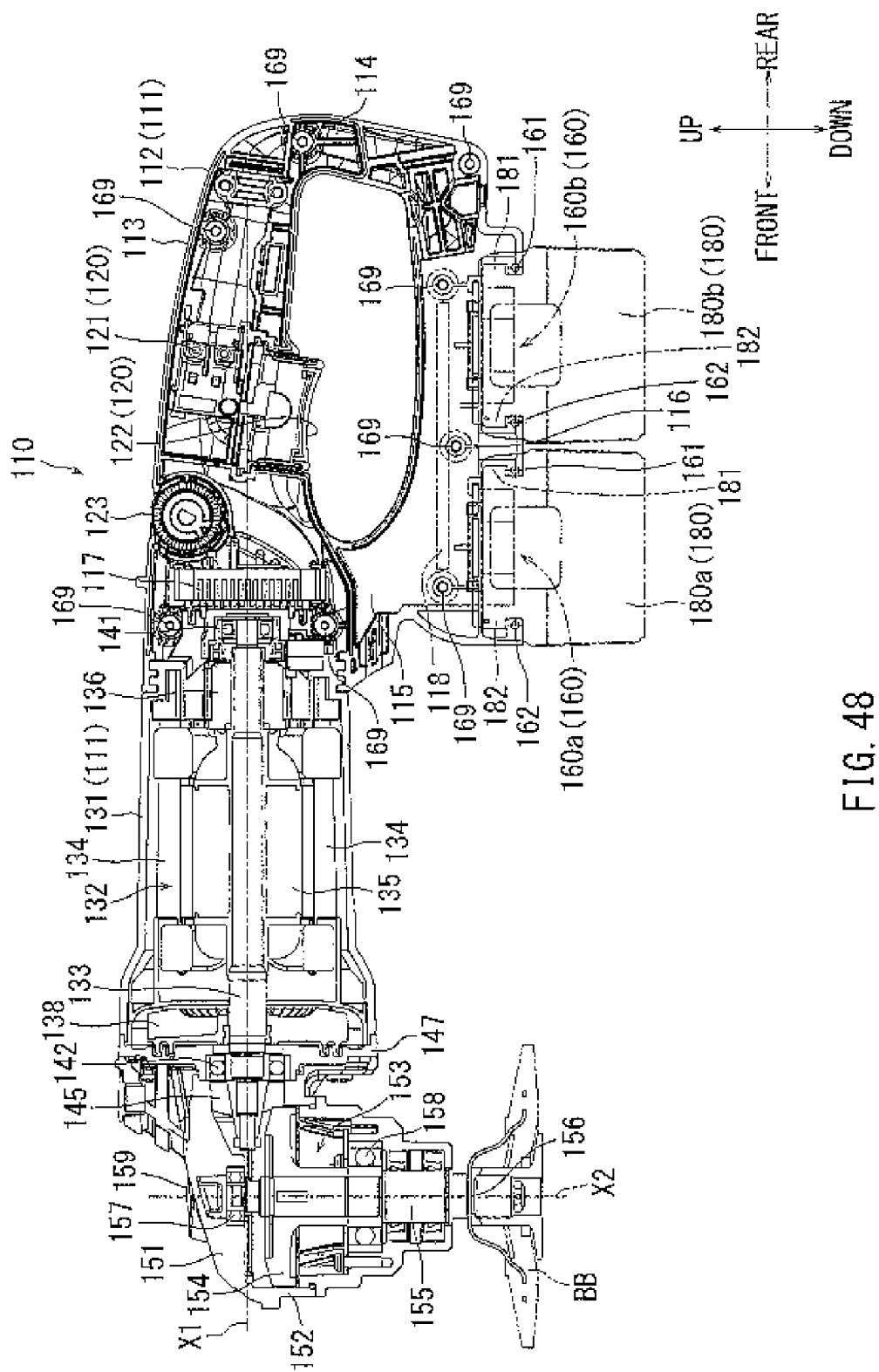
FIG. 48 is a cut-away view illustrating an inner structure of the disc grinder of FIG. 47.
Figure 49:
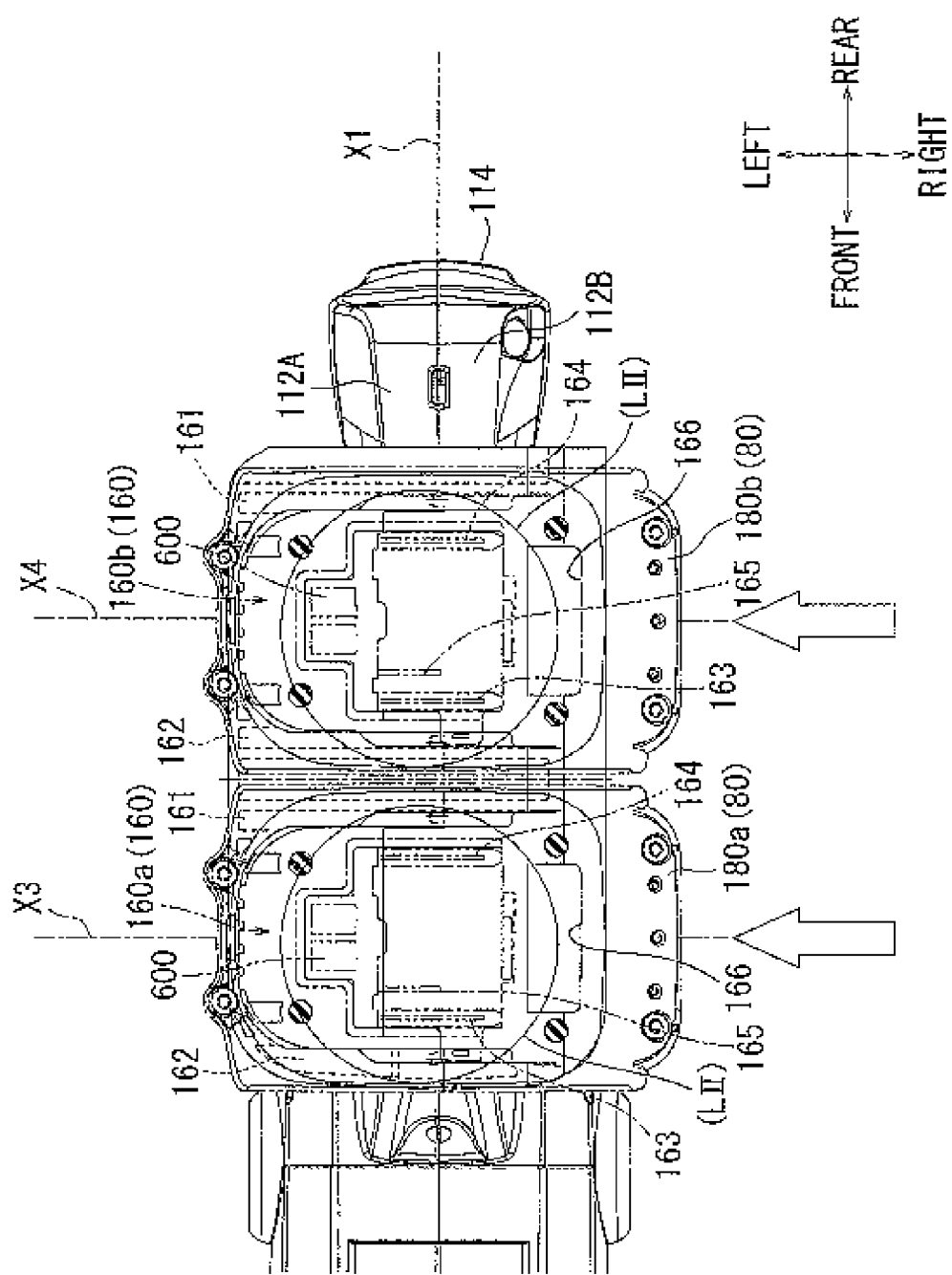
FIG. 49 is a plan view, as seen from below, of the disc grinder of FIG. 47.
Figure 50:
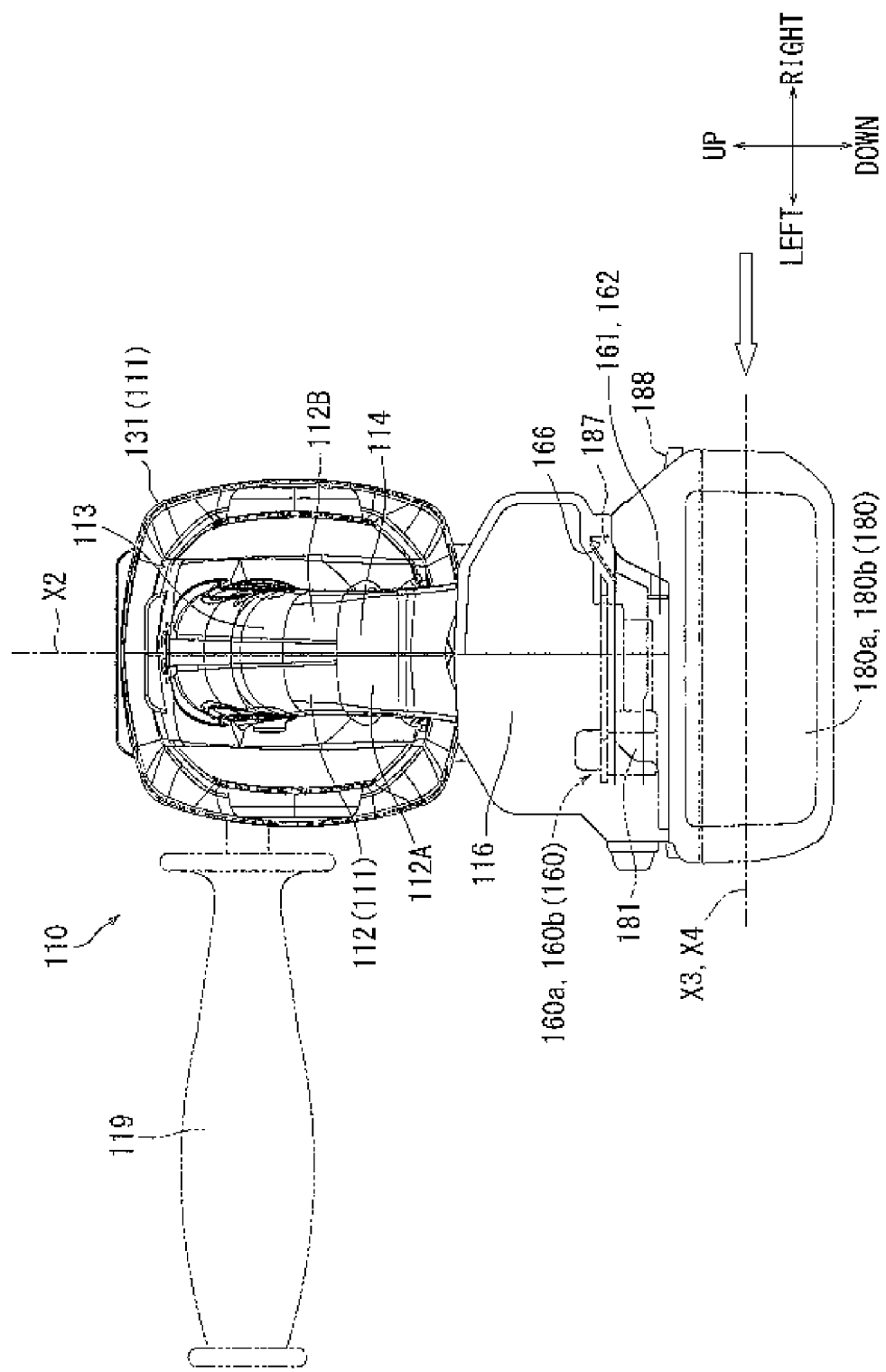
FIG. 50 is a plan view, as seen from behind, of the disc grinder of FIG. 47.
Figure 51:
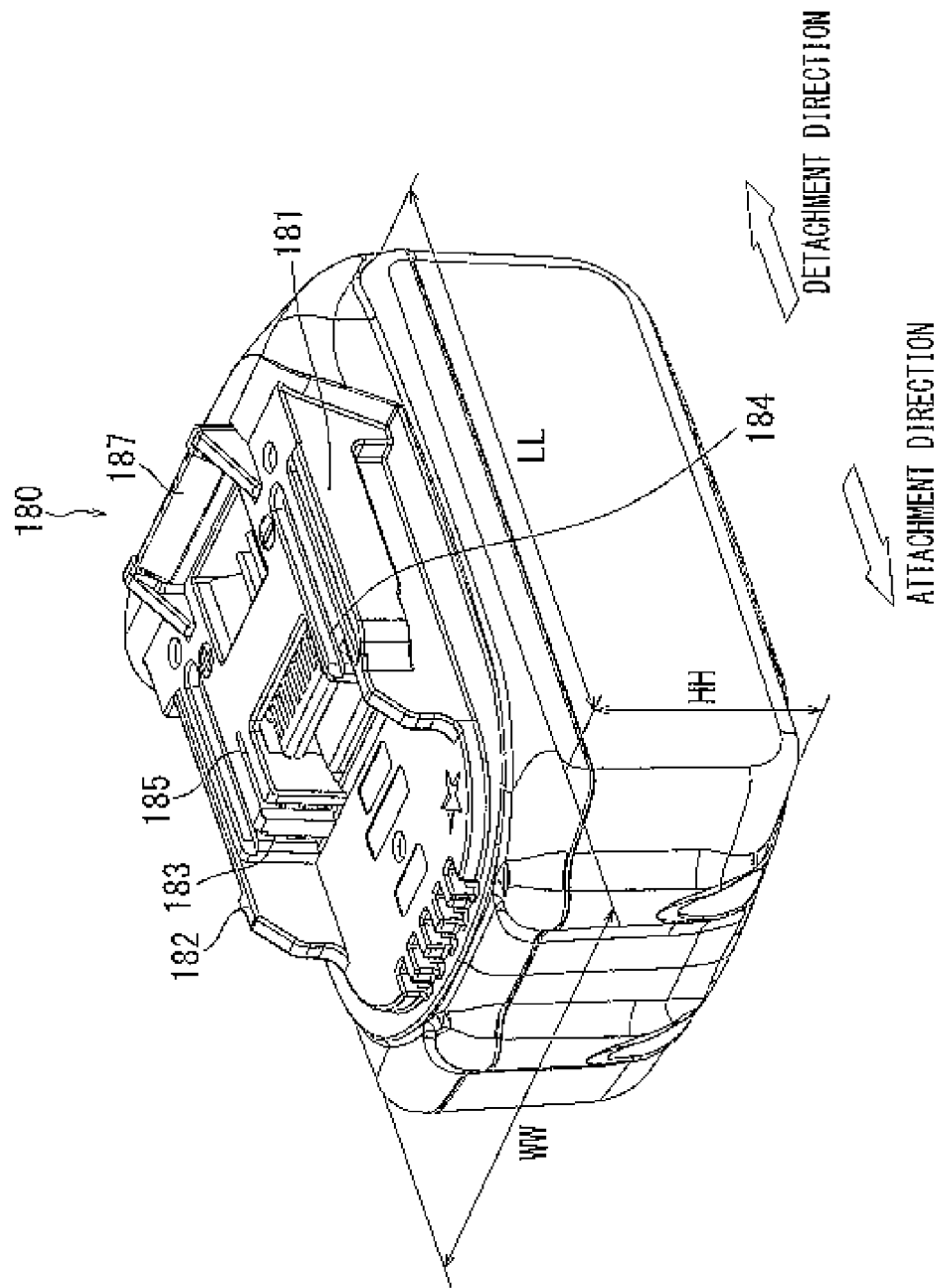
FIG. 51 is a perspective view of a rechargeable battery attached to a battery attachment portion through sliding.
Figure 52:
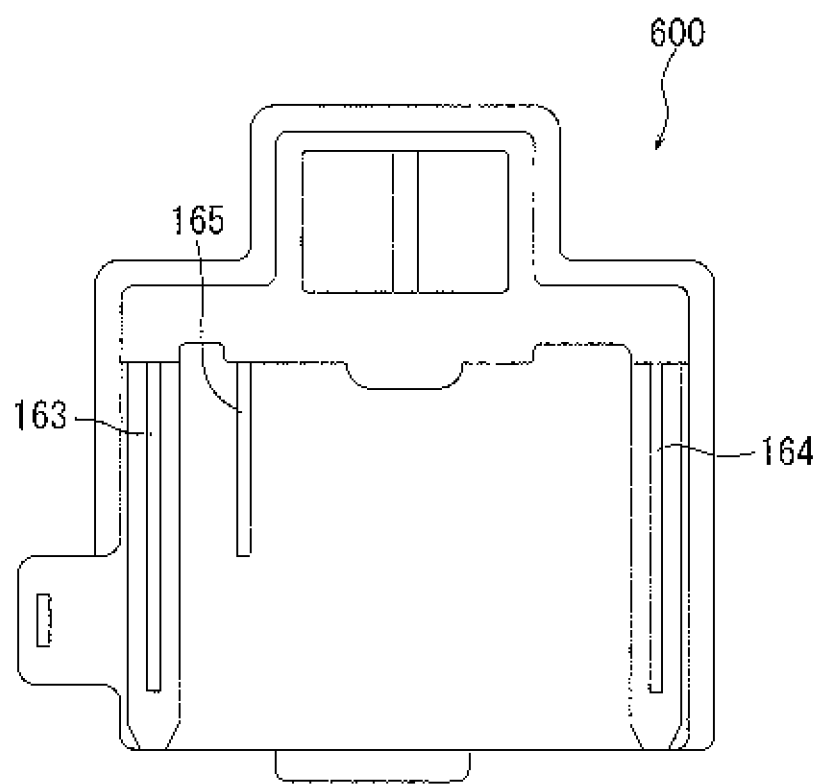
FIG. 52 is an enlarged plan view of portion (LII) of FIG. 49, illustrating a battery terminal connection portion.
Figure 53:
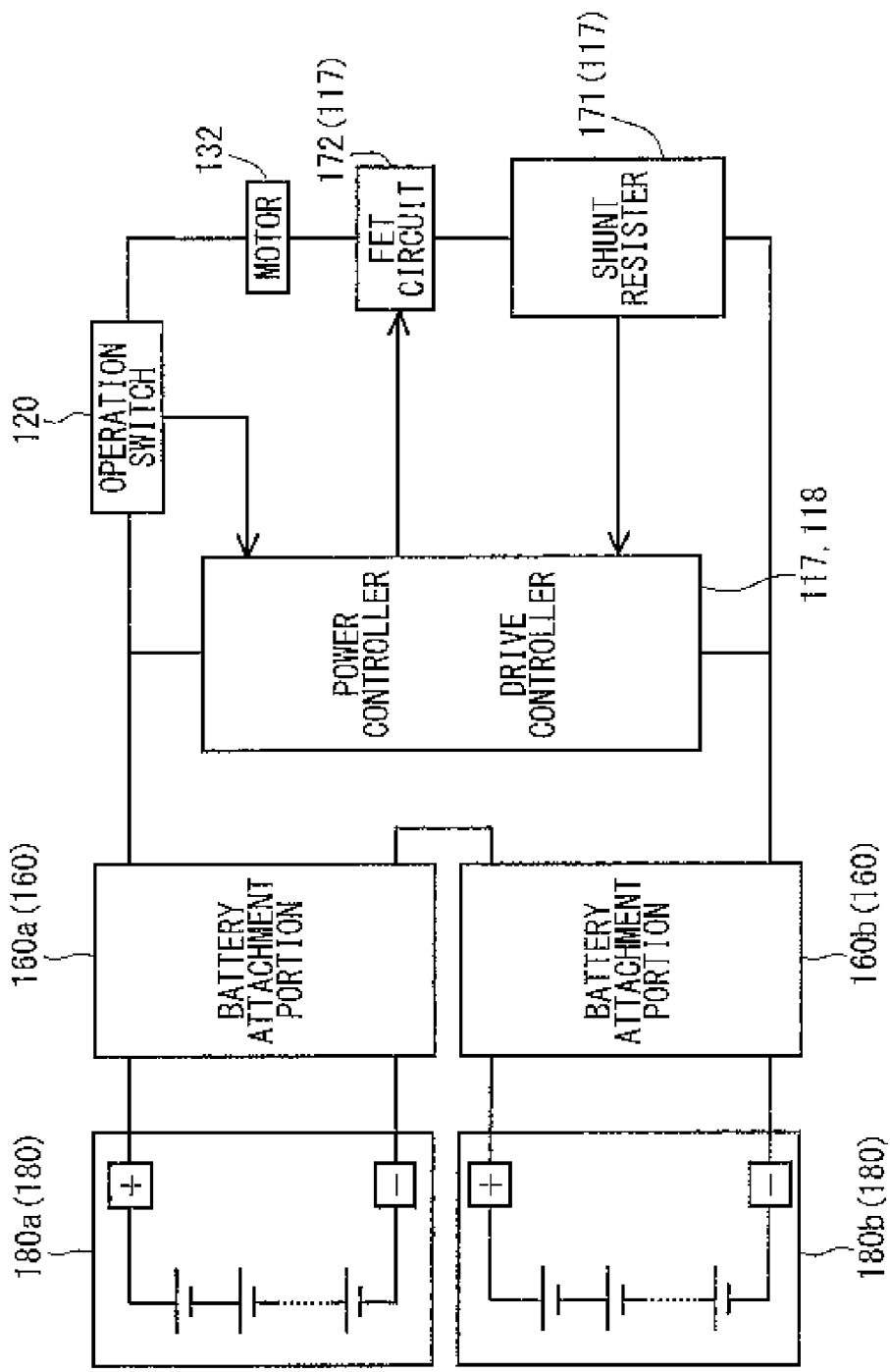
FIG. 53 is a conceptual circuit diagram illustrating the circuit structure of an electric motor schematically and conceptually.

In the following, a first embodiment of the present invention will be described in further detail with reference to FIGS. 47 through 53. In FIG. 47, reference numeral 110 denotes a disc grinder in correspondence to an electric tool in accordance with the present invention. FIG. 48 is a cut-away view of the disc grinder 110, i.e. where the disc grinder 110 is cut in half across an imaginary axis extending from a front to a rear of the disc grinder 110 as shown by the legend of FIG. 48. FIG. 49 is a plan view (i.e. a diagrammatical view), as seen from below, of the disc grinder shown in FIG. 47. FIG. 50 is a plan view, as seen from behind (i.e., the rear), of the disc grinder shown in FIG. 47. FIG. 51 is a detailed perspective view of a rechargeable battery 180 inserted into and/or attached to a battery attachment portion through, for example, sliding. FIG. 52 is an enlarged plan view of portion (LII) of FIG. 49, illustrating a battery terminal connection portion. FIG. 53 is a conceptual circuit diagram illustrating the circuit structure of an electric motor schematically and conceptually. Also, in the following detailed description, the disc grinder 110 will be further described with reference to the directions defined in the drawings.

Referring generally now to FIG. 47, the disc grinder 110 is shown in connection with a first embodiment of the invention. In detail, the disc grinder 110 may be a type of hand-held electric tool adapted to machine while being held by the hand of a user. The disc grinder 110 may be relatively high-powered and supply electric power set at a voltage of, for example, 36 V. The rechargeable battery 180 may be attached to, for example, a corresponding receptacle in the disc grinder 110 through sliding to provide a power source to allow for the operation the disc grinder 110. The disc grinder 110 may be a two-handle type that the operator uses with his or her both hands at, for example, a construction and/or work site. In detail, the disc grinder 110 may have two handles that includes a handle portion 113 formed as a part of a grip housing 112, and a head side grip 119 mounted to a mounting female screw portion 521 of a gear head 151 (head housing 152). A left-half grip housing 112A and a right-half grip housing 112B may be joined together to form the grip housing 112.

The disc grinder 110 generally may include a housing 111, an electric motor 132 encased within the housing 111 and a gear mechanism 153. The housing 111 may include the grip housing 112 and a motor housing 131, i.e. arranged sequentially when viewed from the rear of the disc grinder 110. The grip housing 112 and the motor housing 131 may be connected to each other, and configure a part of an exterior member of the disc grinder 110. Further, a gear head 151 may be attached to the front end of the motor housing 131 that is coupled with the grip housing 112 via gear housing cover 147. The grip housing 112 may be assembled from, for example, multiple separate components made from resin. Further, an operation switch 120, a drive controller 117, a power controller 118, and battery attachment portions 160 (160a and 160b) may be held in place by the grip housing 112 from both right and left sides, and may be accommodated in the grip housing 112. The right and left half molding components that constitute the grip housing 112 may be fastened to each other by using screw bosses 169.

As shown in the FIGS., the grip housing 112 may be generally configured as a loop. In detail, the grip housing 112 may have a handle portion 113 shaped as a loop. Also, and as shown in FIGS. 47 through 49, the grip housing 112 may be generally formed in a ring-like configuration (i.e., a loop configuration as described above) that extends in the front-to-rear direction. In detail, the upper portion of the grip housing 112 may function as the handle portion 113 and/or in conjunction with the handle portion 113 to allow the disc grinder 110 to be, for example, easily grasped by the hand of an operator prior to operation of the disc grinder 110. A flexible and/or rubberized material, such as an elastomer, may be attached to an outer, i.e. a peripheral, surface of the handle portion 113 handle portion 113 to, for example, provide a slip-resistant surface adapted to be easily grasped and/or held by the hand of an operator of the disc grinder 110. A rear side-connecting portion 114 may be formed and/or coupled with a rear section of the handle portion 113 and may generally extend in the downward direction as shown in FIG. 47. Further, a front side-connecting portion 115 may be formed at and/or toward a front section of the handle portion 113 and generally extend downwards. A lower portion of the rear side connecting portion 114 and a lower portion of the front side connecting portion 115 may attach and/or otherwise combine as a single continuous surface to form a lower connecting portion 116. The lower connecting portion 116, as described here, may constitute a lower portion of the grip housing 112 that, as described earlier, may be shaped and/or configured as of a loop. Also, in an embodiment, the lower connecting portion 116 may be formed in an arc-shaped and/or curved configuration. Further, two battery attachment portions 160 (160a and 160b), to be described in further detail below, may be formed at and/or near the lower connecting portion 116.

A drive controller 117 may be incorporated at and/or included within the front portion of the grip housing 112, where the drive controller 117 may include various electrical components such as a shunt resistor and a field-effect transistor (FET) circuit controller 117. Further, the drive controller 117 may be electrically connected to, for example, brushes of the electric motor 132 such that the drive controller 117 may control the disc grinder 110. Moreover, a power controller 118 may be mounted in the lower connecting portion 116, where the power controller 118 may be configured to control voltage, etc., of power supplied from the rechargeable batteries 180 (180a and 180b) attached to the battery attachment portions 160 (160a and 160b). Also, an operation switch 120 may be provided on the handle portion 113.

The operation switch 120 may include a switch main body 121 and an operation button 122, where the switch main body 121 may be contained in the grip housing 112 and may be supported by the grip housing 112. In an embodiment, the switch main body 121 may be, for example, a contact switch that is widely used. The operation button 122 may be supported by the grip housing 112 such that the operation button 122 may move freely in, for example, the generally vertical direction. A contact (not shown in the FIGS.) of the switch main body 121 may be activated through, for example, depressing the operation button 122 while grasping the handle portion 113. In detail, the switch main body 121 may input a signal to the drive controller 117 when the contact of the switch main body 121 is activated. Further, the signal, as described here, may indicate whether the switch is in, for example, an activated or deactivated condition. Further, in an embodiment, the operation button 122 may be fabricated with a biasing spring (not shown in the FIGS.) that automatically allows the operation button 122 to return to, for example, a natural, i.e. non-depressed, position associated with a switch-off state when the operation button 122 has not been depressed.

A gear change dial 123 may be located on the front portion of the handle portion 113 and on the upper portion of the handle portion 113. The gear change dial 123 may be configured to set a rotational speed of the electric motor through dialing, i.e. an operator may "dial-in" a desired rotational speed of the electric motor 132 by adjusting the gear change dial 123 as needed. The gear change dial 123 may input a signal to the drive controller 117 where such a signal may indicate attainment of a set operational speed. A rear bearing 141 may be provided at the front end of this grip housing 112, and the rear bearing 141 may support the motor shaft 133 of the electric motor 132 described below. The rear bearing 141 may be supported by the grip housing 112.

A motor housing 131 may be connected to a front portion of the grip housing 112. In detail, the motor housing 131 may be formed from a molded resin component. The motor housing 131 may surround and thus provide structural support to the electric motor 132, i.e. which may be positioned inside the motor housing 131. The electric motor 132 may be powered by electricity supplied by, for example, the rechargeable batteries 180 to rotate the motor shaft 133. In detail, in an embodiment, the electric motor 132 may be a brush motor, i.e. a motor that includes a stator 134, a rotor 135 and a commutator 136. The stator 134 may be a permanent magnet supported at least in part by the motor housing 131. rotor 135A laminated steel core (not shown in the FIGS.) may be wound one or more times with wire to generally form the rotor 135. Further, in an embodiment, the motor shaft 133 may function as a rotation shaft of and/or for the rotor 135. The rear bearing 141 and a front bearing 142 may both rotatably support the motor shaft 133 at both a rear and a front end of the motor shaft 133. A cooling fan 138 may be located toward and/or at a front of the rotor 135 and also be mounted to and/or coupled with the motor shaft 133.

A gear housing cover 147 may support the front bearing 142. Further, a pinion gear 145 may be provided at a front end of the motor shaft 133 such that the motor shaft 133 may function as, for example, a type of rotation shaft. In an embodiment, the pinion gear 145 may be a tapered bevel gear that may mesh with a bevel gear 154 of a gear mechanism 153 as to be further described in detail below. As shown in at least FIGS. 1 and 2, the motor shaft 133 may be configured to rotate about a phantom line X1 shaft 133 that extends lengthwise from a front to a rear of the disc grinder 110. A gear head 151 may be connected to the front of the motor housing 131. In detail, the gear head 151 may include both a head housing 152 and a gear mechanism 153. The head housing 152 may be constructed from an aluminum casting. The head housing 152 may contain the gear mechanism 153 that may convert and/or transition between one or more possible drive modes, i.e. rotation drive modes, of the motor shaft 133.

This gear mechanism 153 may include and/or communicate with the bevel gear 154, which may interlink and/or mesh with the pinion gear 145 mounted to and/or coupled with a front end of the motor shaft 133. Further, in an embodiment, bevel gear 154 may be positioned near and/or be in contact with an output shaft 155 which may function as shaft around with the bevel gear 154 may rotate. An upper bearing 157 and a lower bearing 158 may rotatably support the output shaft 155. The head housing 152 may support both the upper bearing 157 and the lower bearing 158. The lower end of the output shaft 155 may be formed as a mounting portion 156 that may allow for mounting of a tool accessory BB, such as a grind stone, that may be suitable to grind and/or machine a surface as needed. In detail, the mounting portion 156 may correspond to a tool accessory retaining portion.

Reference numeral 159 indicates a gear stopper that may regulate the rotation of the output shaft 155. In FIG. 48, a phantom line X2 indicates the rotation axis of the output shaft 155. A mounting female screw portion 521 for mounting a head side grip 119 may be formed on both right and left side surfaces of the head housing 152. A mounting male screw portion (not shown in the FIGS.) may be formed on the head side grip 119 to be threaded into the mounting female screw portion 521. Accordingly, the head side grip 119 may be mounted to the gear head 151.

Next, the two battery attachment portions 160 (160*a* and 160*b*) provided on the lower connecting portion 116 of the grip housing 112 will be described in further detail. The two battery attachment portions 160*a* and 160*b* may be formed on and/or near the lower connecting portion 116 of the grip housing 112. Also, in an embodiment, the two battery attachment portions 160*a* and 160*b* may be formed at a part of the loop configuration of the grip housing 112 that includes the handle portion 113. As initially described earlier, the lower connecting portion 116 of the grip housing 112 may form a portion of the loop configuration. The rechargeable batteries 180*a* and 180*b* may be slid into and thus respectively attached to their corresponding battery attachment portions 160*a* and 160*b*.

As shown in FIG. 51, the rechargeable batteries 180*a* and 180*b* may be general-purpose rechargeable batteries 180 which supply a voltage of, for example, 18 V. The rechargeable batteries 180 may be configured to accommodate attachment via sliding, i.e. as described above, to thus attach to the battery attachment portions 160 by sliding. Thus, a structure for sliding attachment and a structure for effecting electrical connection may be formed on an upper surface (i.e., a connection terminal arrangement surface) of the rechargeable batteries 180. In detail, as shown in FIG. 51, a pair of slide guide portions 181 and 182 may be formed on the upper surface of the rechargeable batteries 180 to assist in sliding attachment to the battery attachment portions 160 as described here. Further, a positive-pole terminal 183, a negative-pole terminal 184 and a signal terminal 185 may be provided on an upper surface of the rechargeable batteries 180 to allow for an electrical connection generally between the rechargeable batteries 180 and the disc grinder 110 as needed. Further, a male hook 187 may be provided on an upper surface of each battery 180, i.e. of the rechargeable batteries 180, and the male hook 187 hold the rechargeable batteries 180 in an engaged position with the battery attachment portions 160 when, for example, the rechargeable batteries 180 are connected electrically to the battery attachment portions 160 through sliding.

A pushbutton 188 may be provided on a side where the rechargeable batteries 180 may be detached (see FIG. 50, etc.) for operating the male hook 187. In detail, the pushbutton 188 may be connected to the male hook 187. For example an operator may depress the pushbutton 188 using a finger to cause the male hook 187 to either disengage or engage the rechargeable battery 180 with a corresponding attachment portion 160 as desired. Accordingly, the pushbutton may be depressed to disengage and/or detach the rechargeable battery 180 from the battery attachment portion 160 battery 180 portion 160. Referring now to FIG. 51, reference letter L FIG. 51 indicates a longitudinal length of the rechargeable battery 180; reference letter W FIG. 51 indicates a length in a width direction of the rechargeable battery 180 and reference letter H FIG. 51 indicates a length in a height direction of the rechargeable battery 180. Further, in an embodiment, the rechargeable battery 180 may have external dimensions substantially as follows: the length LL in the longitudinal direction>the width WW in the width direction>the height HH in the height direction.

Next, the battery attachment portion 160 to which the rechargeable battery 180 may be attached by sliding will be described in further detail. As shown in FIGS. 49 and 52, the battery attachment portion 160 may have a corresponding structure allowing the rechargeable battery 180 to be attached thereto by sliding to electrically connect the rechargeable battery 180 to the battery attachment portion 160 and/or other various components of the disc grinder 110 as needed.

As shown in FIG. 49, the battery attachment portion 160 has a pair of slide guide receiving portions 161 and 162 as a structure configured to attach the battery 180 to the battery attachment portion 160 through sliding as described earlier. As shown in FIG. 52, the battery attachment portion 160 has a battery terminal connection portion 600 that includes the positive-pole terminal 163, the negative-pole terminal 164 and the signal terminal 165, as structures that may allow for an electrical connection, generally between the battery 180 and the disc grinder 110. As shown in FIG. 49, when the rechargeable battery 180 is attached to the battery attachment portion 160 through sliding, the rechargeable battery 180 may engage and/or interlock with the battery attachment portion 160. In detail, a female portion (recess) 166 may be formed in the battery attachment portion 160, and the male hook 187 of the rechargeable battery 180 may thus insert into to engage with the female portion 166 as described here.

In FIG. 49, a phantom line X3 indicates an axis along which the rechargeable battery 180*a* may attach to the first battery attachment portion 160*a* by sliding. Further, in FIG. 49, a phantom line X4 indicates an axis along which the rechargeable battery 180*b* may attach to the second battery attachment portion 160*b* by sliding. The first and second battery attachment portions 160*a* and 160*b* may include the structure of the battery attachment portion 160 described above. The axis X3 and the axis X4 may be parallel to each other. Thus, the battery attachment portions 160*a* and 160*b* of the first embodiment may be attached on the lower connection portion 116 of the grip housing 112 so as to allow the two rechargeable batteries 180*a* and 180*b* to be attached by sliding in parallel.

More specifically, the first battery attachment portion 160*a* and the second battery attachment portion 160*b* may be arranged in a parallel while also being deviated, i.e. in relation to each other, in the front-rear direction with respect to the lower connecting portion 116. Both of the first and second battery attachment portions 160*a* and 160*b* may be configured to be attached to the rechargeable batteries 180*a* and 180*b* by sliding the rechargeable batteries 180*a* and 180*b* from right to left, as shown by the legend in FIG. 49. In detail, the first and second battery attachment portions 160*a* and 160*b* may be configured to be attached to the rechargeable batteries 180*a* and 180*b* by sliding the rechargeable batteries 180*a* and 180*b* in the same direction, i.e. from right to left, and in parallel. The controllers 117 and 118 may control the rechargeable batteries 180*a* and 180*b* attached to the first and second battery attachment portions 160*a* and 160*b*. In detail, as shown in the conceptual circuit diagram of FIG. 53, the drive controller 117 and the power controller 118 may control the rotational drive of the electric motor 132 of the disc grinder 110.

In detail, the drive controller 117 and the power controller 118 may receive input signals from the operation switch 120 and the shunt resistor 171 (i.e., a part of the drive controller 117), and send output signals to the FET circuit 172 (part of the drive controller 117). Thus, the drive controller 117 and the power controller 118 may control the rotational drive of the electric motor 132. In detail, a circuit connecting both the drive controller 117 and the power controller 118 to the electric motor 132 may be designed such that the rechargeable batteries 180*a* and 180*b* attached to the first and second battery attachment portions 160*a* and 160*b* may be connected in, for example, a series. Accordingly, power, i.e. electric current, supplied from the rechargeable batteries 180*a* and 180*b* may be set such that the voltage supplied via the first and second battery attachment portions 160*a* and 160*b* is, for example: 18 V+18 V=36 V.

The disc grinder 110, generally in accordance to with the first embodiment as described above, may provide advantages as to be further here. Given that the disc grinder 110 of the first embodiment includes two battery attachment portions 160 (160*a* and 160*b*), two rechargeable batteries 180 (180*a* and 180*b*) may be attached to the disc grinder 110. In such a two-battery configuration as described, grinder 110 the disc grinder 110 may be configured to receive power, i.e. electric current, from the batteries 180 with a relatively high voltage and/or large supply capacitance. As described earlier, power supplied from the batteries 180 may reach a total system voltage of 36V, i.e. 18V+18V, by using two general-purpose rechargeable batteries 180 that may supply 18V each. In this configuration, the disc grinder 110 may be a high-power type that requires high voltage for use, but may be powered by general-purpose rechargeable batteries 180 in the configuration described here.

In the disc grinder 110 of the first embodiment, the first and second battery attachment portions 160*a* and 160*b* may be formed on the lower connecting portion 116 of the grip housing 112, that may be generally formed in a loop shape including the handle portion 113. In this configuration, the weight of the rechargeable batteries 180*a* and 180*b* attached to the battery attachment portions 160*a* and 160*b* may be centered on and/or around the handle portion 113 located above the attachment portions 160*a* and 160*b*. Such an even weight distribution of the batteries 180 may allow for the disc grinder 110 to be easily grasped, lifted and held, i.e. in-hand by an operator, while machining via operation and/or rotation of the tool accessory BB. The disc grinder 110 is held in hand for performing machining, and a load is applied to a workpiece through the tool accessory BB. In comparison, a traditionally configured disc grinder may feature an attachment portion for one or more batteries at a rearmost section of the main tool body only, thus potentially contributing to a weight imbalance during battery mounting and/or operation of the disc grinder. The current configuration of placing two batteries 180 in-sequence, as that disclosed by the first embodiment, may substantially alleviate such weight-related balance issues by distributing the weight and/or mass of the batteries 180 evenly across the lower connecting portion 116, thus allowing the disc grinder to be easily grasped and/or handled by hand.

The battery attachment portions 160*a* and 160*b* may be configured such that axes X3 and X4 are parallel to each other. In detail, the rechargeable batteries 180*a* and 180*b* may slide into and thus attach to their corresponding battery attachment portions 160*a* and 160*b* along the axes X3 and X4. Accordingly, and as shown by FIG. 49, the length in an arrangement direction, i.e. from front to rear of the disc grinder 110, of the rechargeable batteries 180*a* and 180*b* when arranged side-by-side may be up to twice the length W in a width direction of the rechargeable battery 180. In detail, the relatively shorter sides of the rechargeable battery 180 may contact each other as shown in FIG. 49 to generally minimize the volume occupied by the rechargeable batteries 180*a* and 180*b* when arranged in parallel. Further, such a configuration as described here may suppress deterioration of the maneuverability of the disc grinder 110 when the disc grinder 110 is used for machining while, for example, held in hand.

In the first embodiment, the rechargeable batteries 180a and 180b may be attached to the first and second battery attachment portions 160a and 160b along the same direction, i.e. from right to left. Further, in the first and second battery attachment portions 160a and 160b, the slide attachment axes X3 and X4 may be parallel to each other as discussed above. In detail, the batteries 180 may be inserted into and mounted to and/or attached to their corresponding attachment portions 160 in unison and/or in other various combinations, as needed, i.e. one after the other. Further, in an embodiment, the rechargeable batteries 180a and 180b may be attached to the first and second battery attachment portions 160a and 160b in the same direction, i.e., from left to right.

The mounting direction of the rechargeable battery 180a with respect to the first battery attachment portion 160a may be from left to right. Alternatively, in an embodiment, the mounting direction of the rechargeable battery 180b with respect to the second battery attachment portion 160b may be from right to left. Also, in an embodiment, the mounting direction of the rechargeable battery 180a with respect to the first battery attachment portion 160a may be from right to left. However, and in contrast to the mounting direction discussed above, the mounting direction of the rechargeable battery 180b, with respect to the second battery attachment portion 160b, may be from left to right.

Second Embodiment

Next, the second and third embodiments, which may be modifications of the first embodiment described above, will be described in further detail with reference to FIGS. 54 through 59. In the second and third embodiments, only the arrangement of the battery attachment portions 160 Differs from that of the disc grinder 110 of the first embodiment. Thus, portions of the disc grinder 110 which are formed substantially in the same manner as in the first embodiment are indicated by like reference numerals in the drawings, and a description thereof will be omitted.

Figure 54:
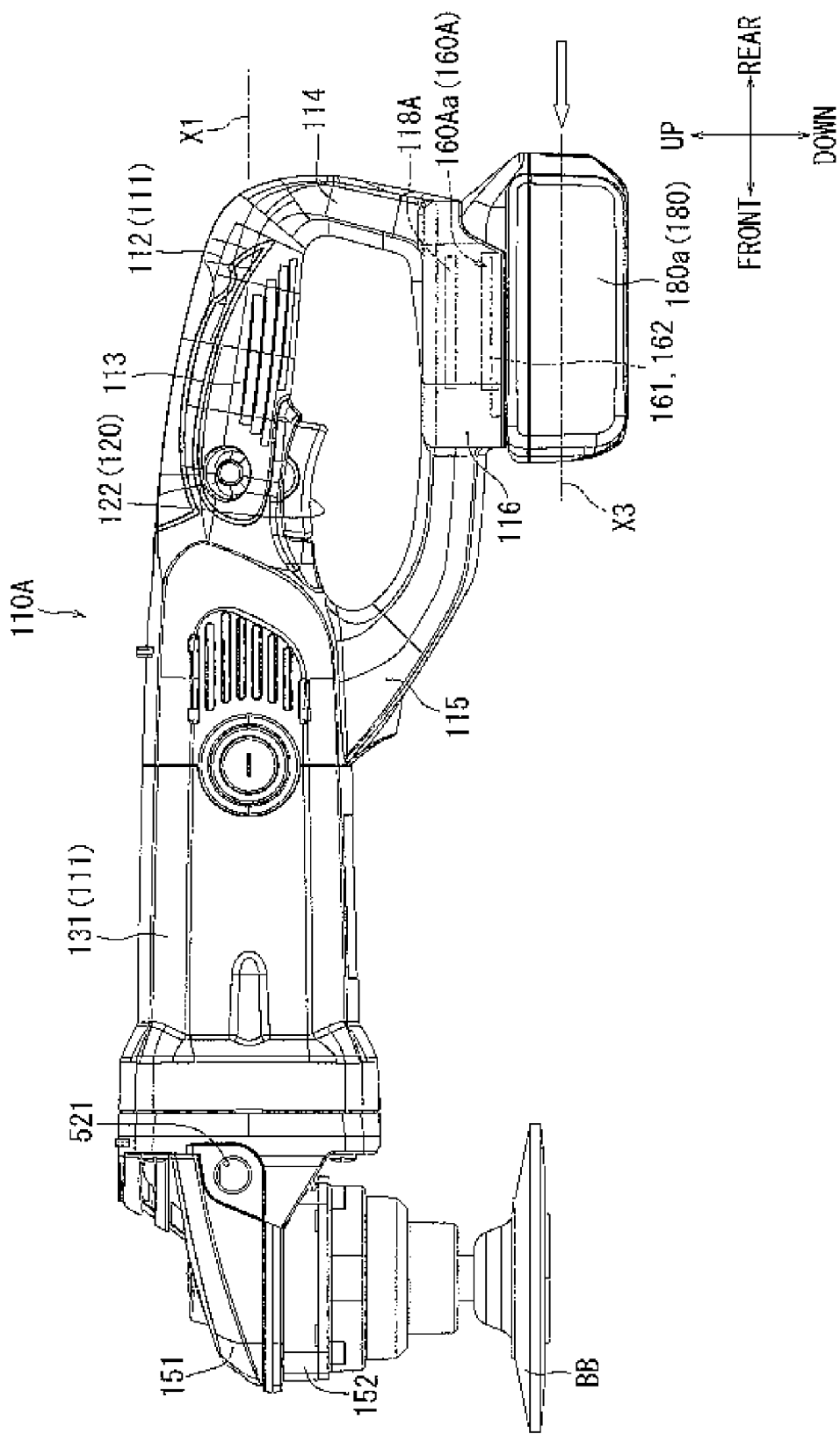
FIG. 54 is a side view of a disc grinder in accordance with a second embodiment.
Figure 55:
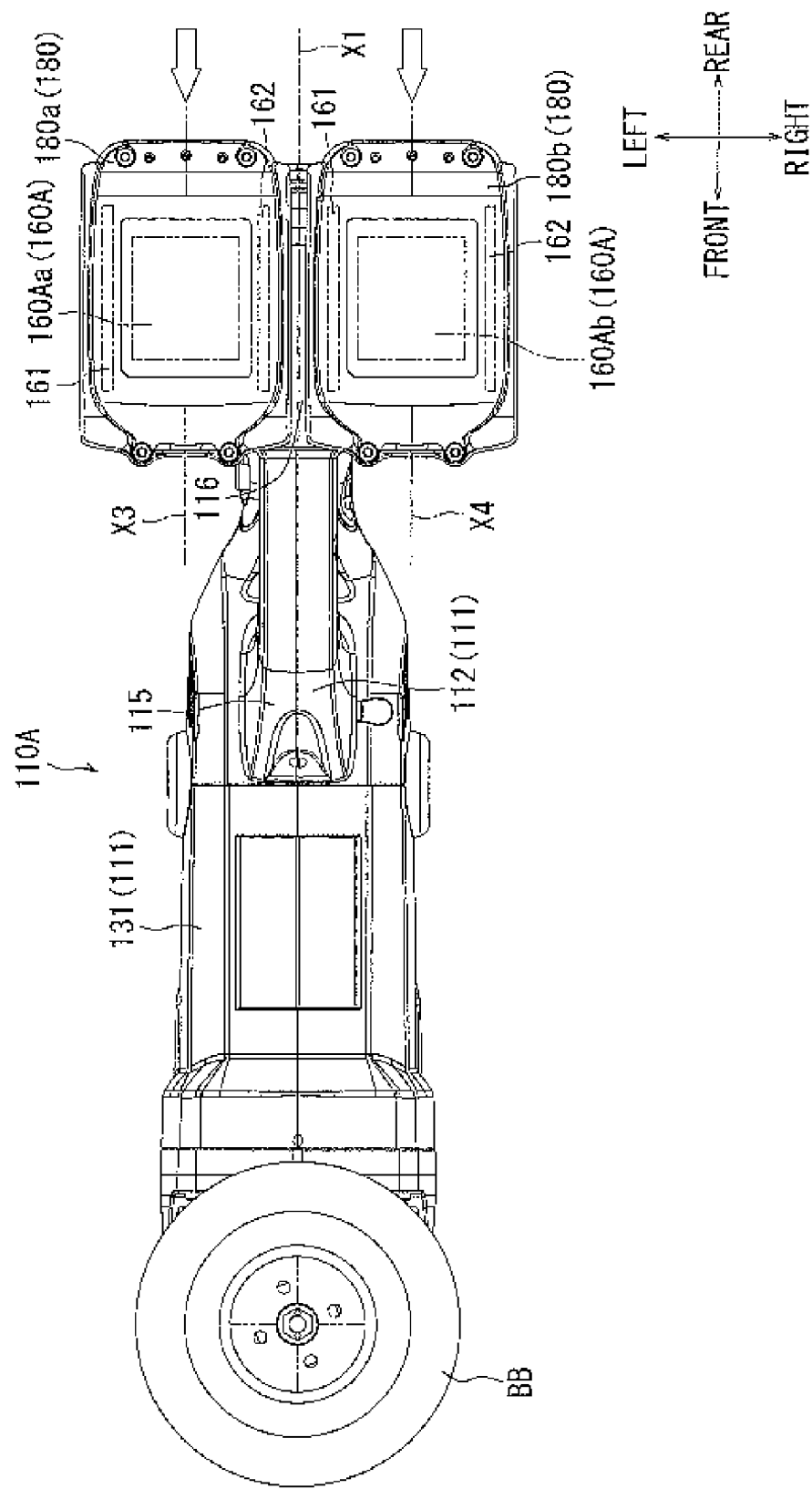
FIG. 55 is a plan view, as seen from below, of the disc grinder of FIG. 54.
Figure 56:
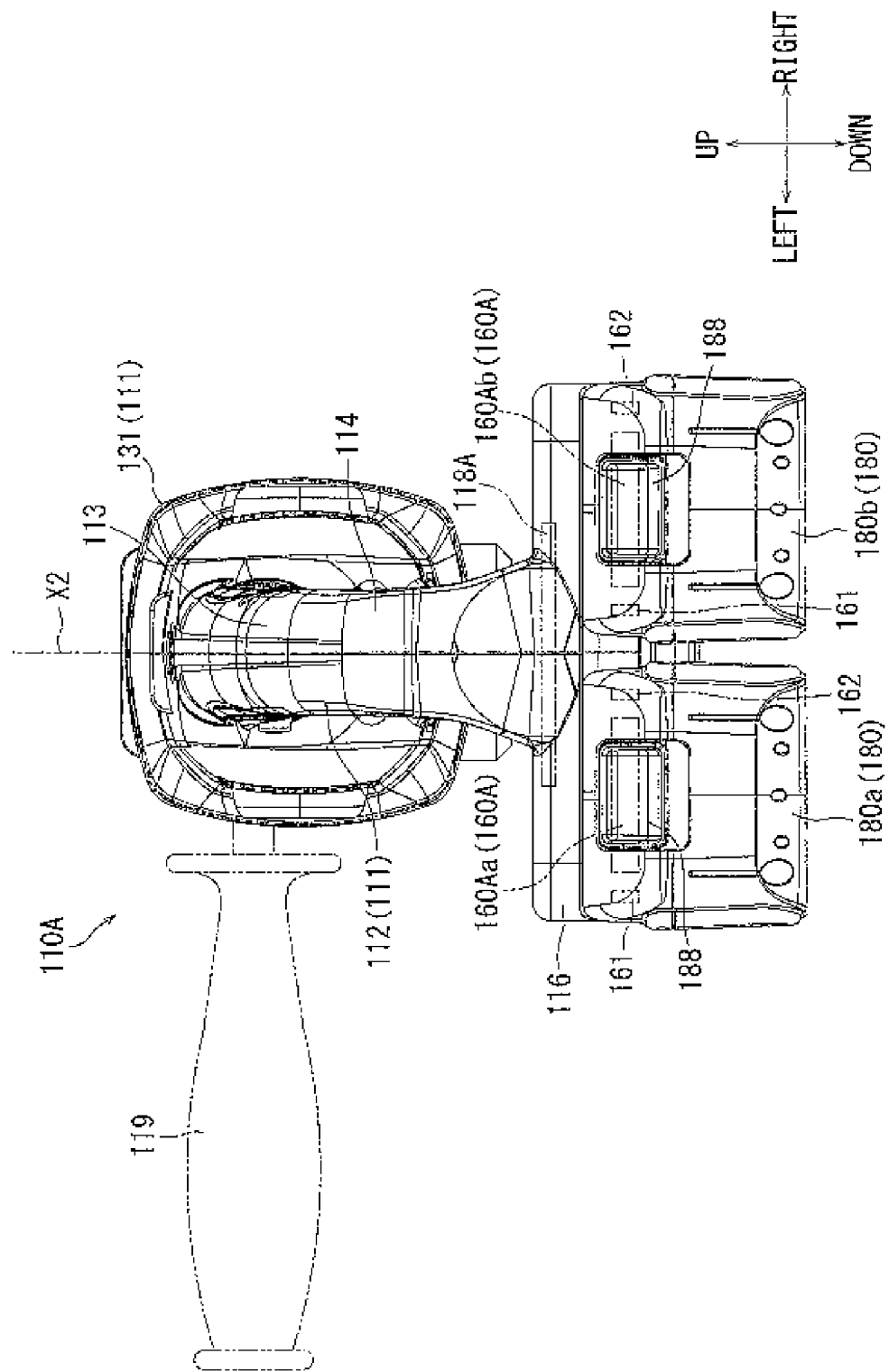
FIG. 56 is a plan view, as seen from behind, of the disc grinder of FIG. 54.

First, a disc grinder 110A according to the second embodiment will be described. FIG. 54 illustrates a side view of the disc grinder 110A of the second embodiment. FIG. 55 is a plan view, as seen from below, of the disc grinder 110A shown in FIG. 54. FIG. 56 is a plan view, as seen from behind, of the disc grinder 110A shown in FIG. 54. As shown in FIGS. 54 through 56, the battery attachment portions 160 A of the second embodiment may also be arranged on the lower connecting portion 116 of the grip housing 112 i.e. same as the battery attachment portions 160 of the first embodiment.

In further detail, a first battery attachment portion 160Aa and a second battery attachment portions 160Ab may be arranged in parallel and also may be deviated in the right-left direction with respect to the lower connecting portion 116. Both the rechargeable batteries 180a and 180b may be configured to attach to and/or connect with the first and second battery attachment portions 160Aa and 160Ab by sliding from rear-to front, i.e. the rechargeable batteries 180a and 180b may be configured to slide in the same direction, parallel each other, to attach to the first and second battery attachment portions 160Aa and 160Ab. The first and second battery attachment portions 160Aa and 160Ab may be located symmetrically with respect to the axis X1 along which the motor shaft 133 extends with respect to the grip housing 112. Further, each battery may be positioned symmetrically on either side of the axis X1. As shown in FIG. 54, reference numeral 118A indicates a power controller.

The disc grinder 110A of the second embodiment may be configured to provide the same effect as the disc grinder 110 of the first embodiment, i.e. allowing for an operator to grasp and maneuver the disc grinder 110A as may be needed for machining. Also, and in connection with the second embodiment for the disc grinder 110A, two rechargeable batteries 180 (180a and 180b) may be attached through two battery attachment portions 160 A (160Aa and 160Ab). In this configuration, power supplied to operate the disc grinder 110A may have relatively high voltage and/or large supply capacitance. In detail, power supplied, i.e. electric current, may be reach total 36V by using two general-purpose rechargeable batteries 180 that may each supply 18V. In this configuration, the disc grinder 110A may be a high-powered type that requires relatively high voltage while using general-purpose rechargeable batteries 180.

Further, in the disc grinder 110A of the second embodiment, the two battery attachment portions 160Aa and 160Ab may be respectively arranged at positions symmetrical with respect to the axis X1 of the motor shaft (not shown in the FIGS.) with respect to the grip housing 112. Such a configuration as described here may evenly distribute the weight and/or mass of the rechargeable batteries 180a and 180b attached to the disc grinder 110A to, for example, suppress deterioration in the maneuverability of the disc grinder 110 when the disc grinder 110 is used for machining operation while held by hand.

Also in the disc grinder 110A of the second embodiment, the first and second battery attachment portions 160Aa and 160Ab may be formed on the lower connecting portion 116 of the grip housing 112. In this configuration, the weight of the rechargeable batteries 180a and 180b attached to the battery attachment portions 160Aa and 160Ab may be centered on and/or around the handle portion 113 located above the attachment portions 160Aa and 160Ab. Accordingly, the weight of the batteries 180a and 180b may be effectively counterbalanced by an operator who may grasp the handle portion 113 to maneuver the disc grinder 110A to, for example, suppress deterioration in the maneuverability of the disc grinder 110A.

The battery attachment portions 160Aa and 160Ab may be configured such that the axes X3 and X4 are parallel to each other. In detail, the axes X3 and X4 indicate the directions in which the rechargeable batteries 180a and 180b may be attached to the battery attachment portions 160Aa and 160Ab by sliding. Thus, the length in the direction of arrangement of the rechargeable batteries 180a and 180b, when arranged side by side, may be up to twice the length W in the width direction of the rechargeable battery 180. In detail, the relatively shorter lengths of the external dimensions of the rechargeable battery 180 may be positioned adjacent to one-another as shown in FIG. 55 to, for example, minimize the total volume occupied by the rechargeable batteries 180a and 180b, when arranged in parallel. Such a configuration as described here may suppress deterioration in the maneuverability of the disc grinder 110, when the disc grinder 110 is used for machining operation while held in hand.

When compared with the disc grinder 110 of the first embodiment, the positions of the battery attachment portions 160Aa and 160Ab as shown in the disc grinder 110A of the second embodiment may be slightly deviated backwards. Thus, the disc grinder 110 of the first embodiment may be preferred when the disc grinder 110 may be used for machining operation applying a significant load to the tool accessory BB. In contrast, the disc grinder 110A of the second embodiment may be preferred when the disc grinder 110 is used for machining operation applying a minimal load to the tool accessory BB. Also in the second embodiment, the direction for attaching the rechargeable batteries 180a and 180b to the first and second battery attachment portions 160Aa and 160Ab through sliding may be opposite to the direction shown in FIG. 55. Moreover, the relatively directions for attaching the rechargeable batteries 180a and 180b may be the same, opposite to each other, and/or any combinations of the same.

Third Embodiment

Figure 57:
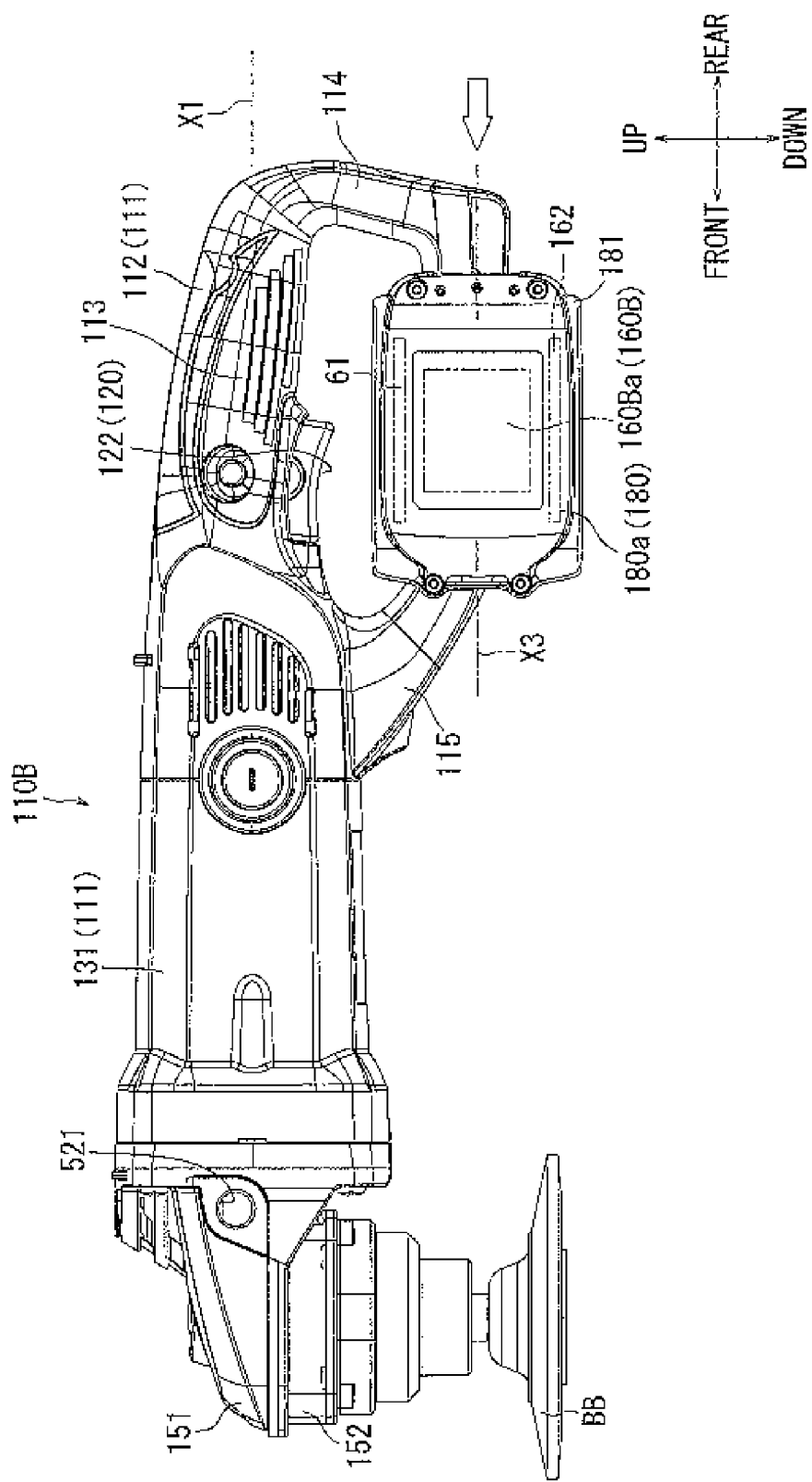
FIG. 57 is a side view of a disc grinder in accordance with a third embodiment.
Figure 58:
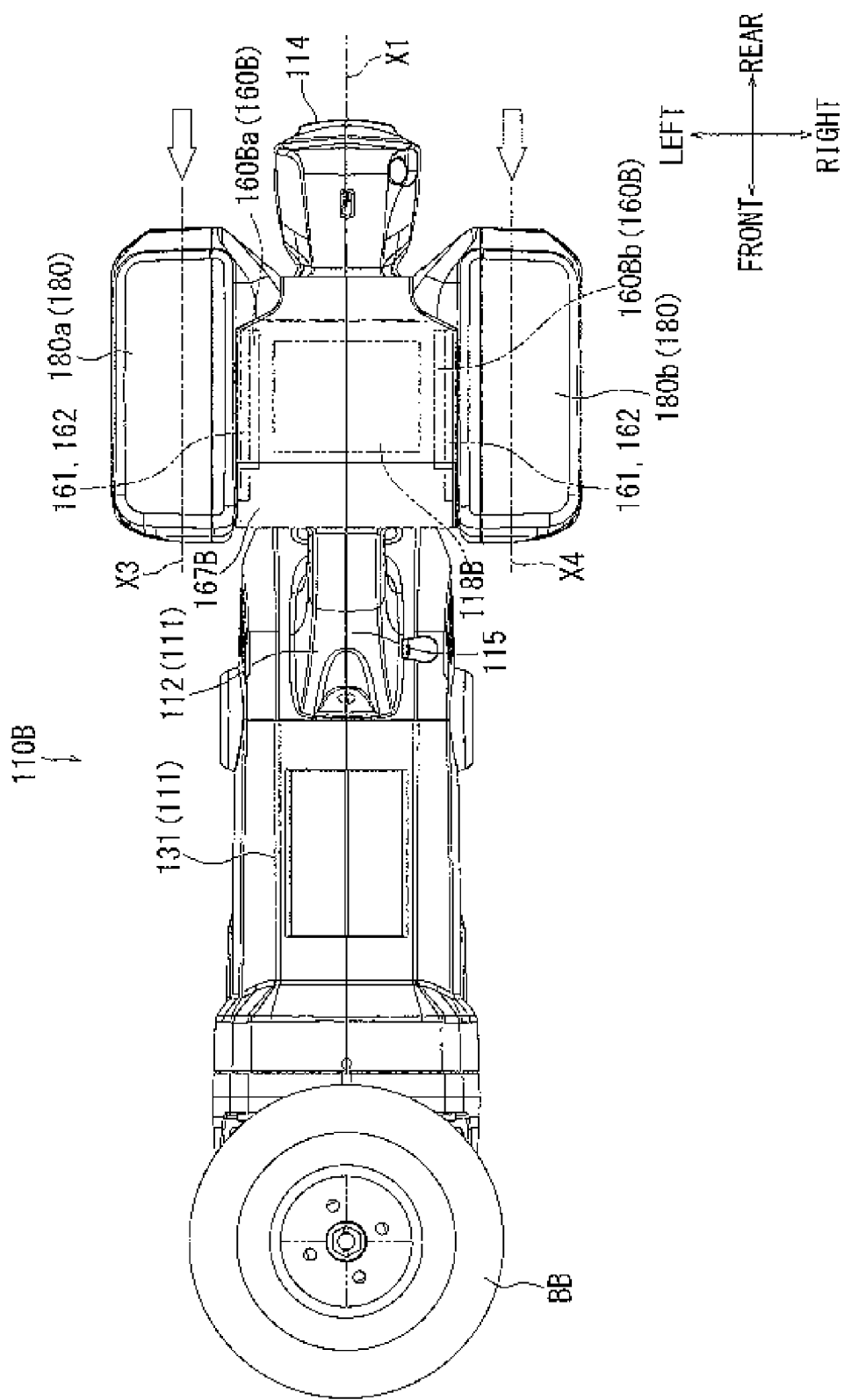
FIG. 58 is a plan view, as seen from below, of the disc grinder of FIG. 57.
Figure 59:
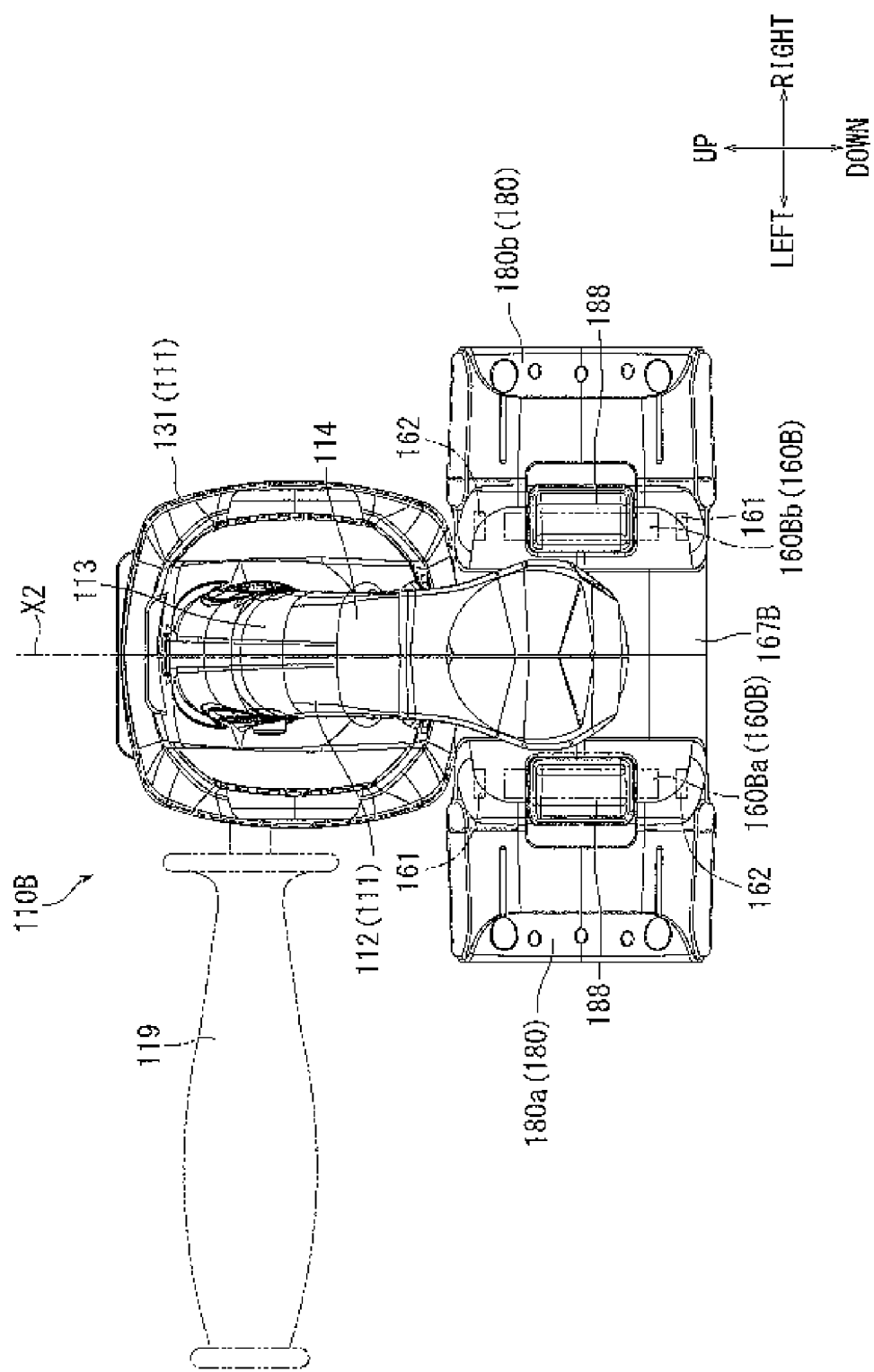
FIG. 59 is a plan view, as seen from behind, of the disc grinder of FIG. 57.

Next, a disc grinder 110B in accordance with the third embodiment will be described in further detail. FIG. 57 is a side view illustrating the disc grinder 110B of the third embodiment. FIG. 58 is a plan view, as seen from below, of the disc grinder 110B shown in FIG. 57. FIG. 59 is a plan view, as seen from behind, of the disc grinder 110B shown in FIG. 57. As shown in FIGS. 11 through 13, the battery attachment portions 160B of the third embodiment may also be arranged on the lower connecting portion 116 of the grip housing 112, the same as the battery attachment portions 160 of the first embodiment.

In further detail, a first battery attachment portion 160Ba and a second battery attachment portions 160Bb may be arranged in parallel and be deviated in right-to-left direction with respect to the lower connecting portion 116. Nevertheless, the first battery attachment portion 160Ba and the second battery attachment portion 160Bb may be arranged such that the connection terminal arrangement surfaces of the rechargeable batteries 180a and 180b face each other. More particularly, the first battery attachment portion 160Ba and the second battery attachment portion 160Bb may be positioned symmetrically with respect to the axis X1 along which the motor shaft (not shown in the FIGS.) extends, i.e., where the first battery attachment portion 160Ba is positioned on one side of the motor shaft and the second battery attachment portion 160Bb is positioned on the other side of the motor shaft, opposite to the first battery attachment portion 160Ba. In the FIGS., reference numeral 118A indicates a power controller. In this configuration, the first battery attachment portion 160Ba and the second battery attachment portion 160Bb may be arranged such that the lower connecting portion 116 of the grip housing 112 may be held between the connection terminal arrangement surfaces of the rechargeable batteries 180a and 180b.

Referring generally now to FIG. 58, the first battery attachment portion 160Ba and the second battery attachment portion 160Bb may be positioned side-by-side, where each battery attachment portions 160Ba and 160Bb may be configured to receive and/or attach to the rechargeable batteries 180a and 180b, respectively. Further, as shown in FIG. 59, an intermediate connecting portion 167B may be provided between the first battery attachment portion 160Ba and the second battery attachment portion 160Bb. The intermediate connecting portion 167B contains the power controller 118B. Further, both the rechargeable batteries 180a and 180b may be attached to the first battery attachment portion 160Ba and the second battery attachment portion 160Bb by sliding from rear to front.

The disc grinder 110B of the third embodiment may be configured to provide substantially the same effect as the disc grinder 110A of the second embodiment, i.e. directed toward machining a surface etc. In the third embodiment of the disc grinder 110B, the length, from right-to-left, i.e. the direction in which the rechargeable batteries 180a and 180b may be arranged and/or attached with their respective battery attachment portions 160a and 160b, may be added double the length W in the height direction, i.e. from right-to-left, of the rechargeable battery 180. Further, the relatively shorter dimensions of the external dimensions of the rechargeable battery 180 may be added to the width of the disc grinder 110B as shown in FIG. 59. Such a configuration as described here may minimize a total volume occupied by the disc grinder 110B and may suppress an increase of bulkiness of the disc grinder 110B as may otherwise be caused by the rechargeable batteries 180a and 180b when, for example, arranged in parallel beneath the lower connecting portion 116 (not shown in FIG. 57). The disc grinder 110B of the third embodiment may include the intermediate connecting portion 167B between the first battery attachment portion 160Ba and the second battery attachment portion 160Bb. The intermediate connecting portion 167B may contain the power controller 118B. Such a configuration as described here may suppress an increase in the total volume of the disc grinder 110B.

As compared with the disc grinder 110A of the second embodiment, the positions of the battery attachment portions 160Ba and 160Bb, in the disc grinder 110B of the third embodiment, may be slightly deviated forwards. Thus, the disc grinder 110B may be preferable over the disc grinder 110A of the second embodiment, when, for instance, the disc grinder 110B may be used in a machining operation that requires the application of a substantial load to the tool accessory BB. Also in the third embodiment, the direction for attaching the rechargeable batteries 180a and 180b to the first and second battery attachment portions 160Ba and 160Bb through sliding may be opposite to the direction as shown in FIG. 57. Further, the relative directions for attaching the rechargeable batteries 180a and 180b may be the same, opposite to each other and/or any combination of the same.

Fourth Embodiment

Figure 60:
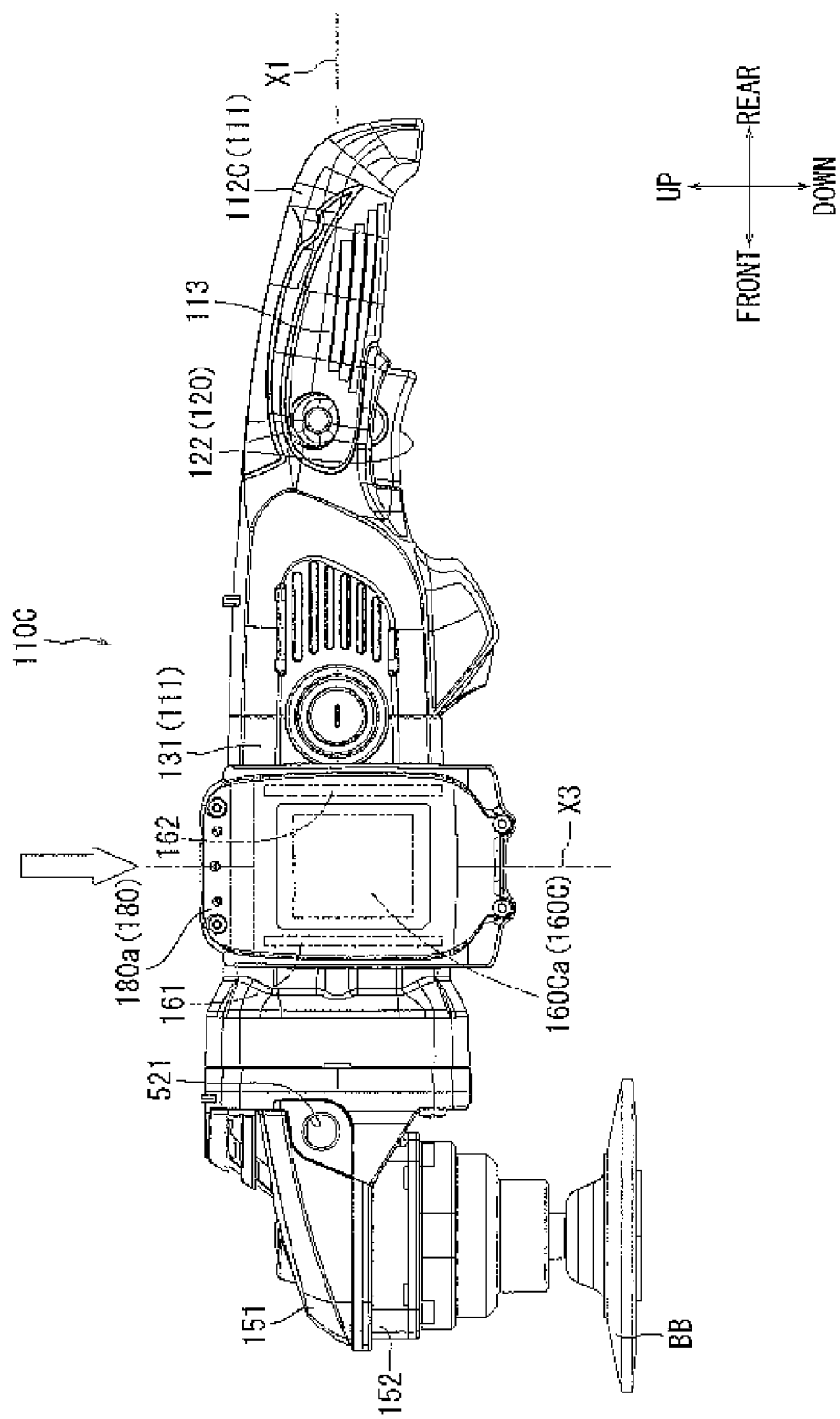
FIG. 60 is a side view of a disc grinder in accordance with a fourth embodiment.
Figure 61:
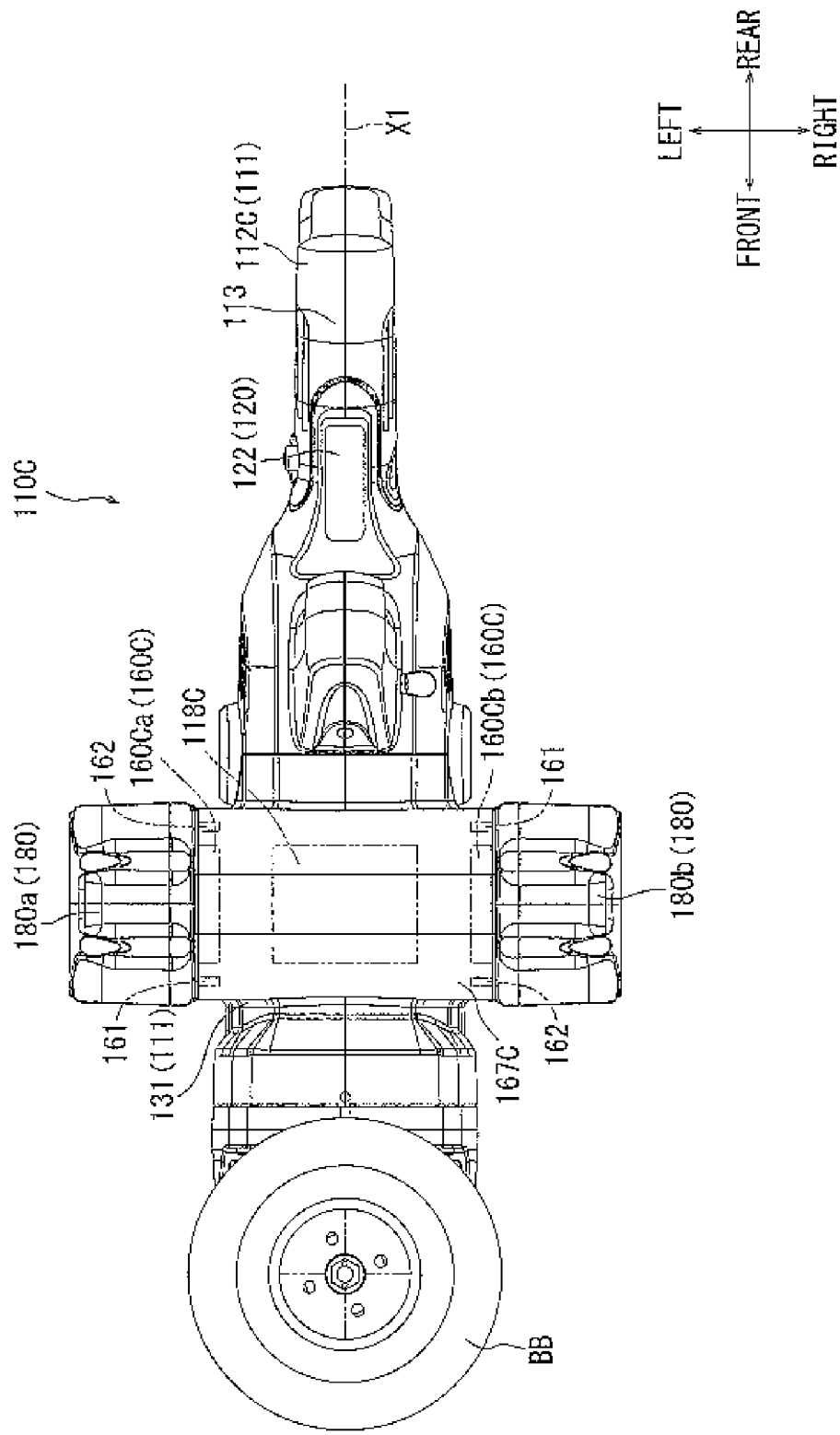
FIG. 61 is a plan view, as seen from below, of the disc grinder of FIG. 60.
Figure 62:
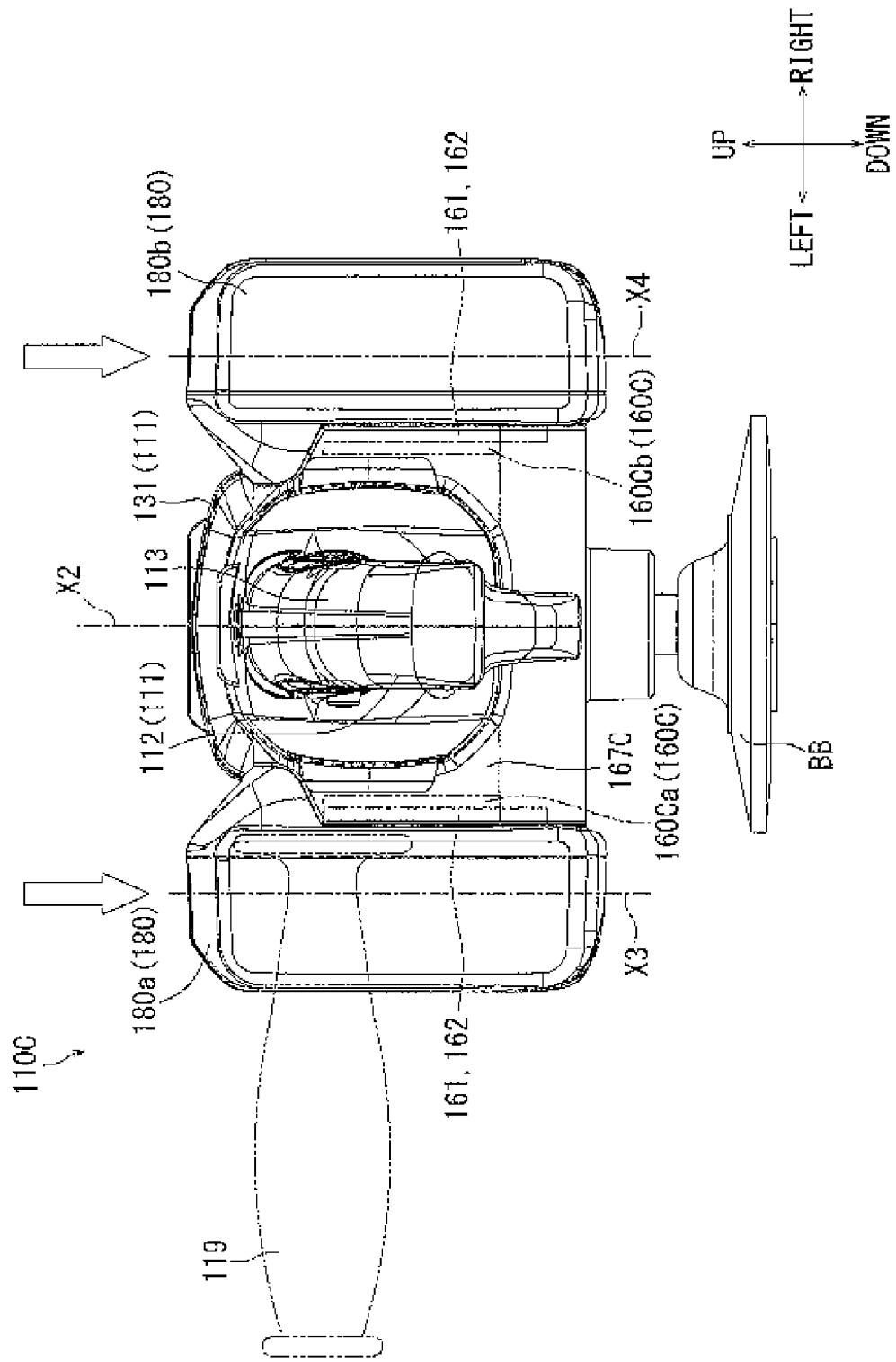
FIG. 62 is a plan view, as seen from behind, of the disc grinder of FIG. 60.

Next, a disc grinder 110C in accordance with the fourth embodiment will be described in further detail. FIG. 60 illustrates a side view of the disc grinder 110C of the fourth embodiment. FIG. 61 is a plan view, as seen from below, of the disc grinder 110C shown in FIG. 60. FIG. 62 is a plan view, as seen from behind, of the disc grinder 110C shown in FIG. 60. Battery attachment portions 160 C of the fourth embodiment may be located at various positions, where some positions may differ from that shown for the battery attachment positions 60, 60A, 60B in connection with the first through third embodiments. Thus, the following description will focus on the differences of the disc grinder 110C from the disc grinders 110, 110A, and 110B as described above. The portions that are formed substantially in the same manner as in the above-described embodiments are indicated by the same reference numerals in the FIGS., and a description thereof will be omitted.

The battery attachment portions 160, 160a and 160b of the first through third embodiments may be arranged on the lower connecting portion 116 of the grip housing 112. However, and as shown in FIGS. 60 through 62, the battery attachment portions 160 C of the fourth embodiment may be arranged on the motor housing 131 that supports the electric motor 132. More particularly, as shown in FIGS. 61 and 62, the battery attachment portions 160 C may be arranged on an intermediate connecting portion 167C provided on, for example, an outer peripheral surface of the motor housing 131. In accordance with the configuration shown by the fourth embodiment, the disc grinder 110C may include a grip housing 112C such that the lower connecting portion 116, as shown in connection with embodiments one through three, may be eliminated from the grip housing 112.

A first battery attachment portion 160Ca and a second battery attachment portion 160Cb may be positioned and/or arranged in parallel to be deviated from each other in, for example, the right-to-left direction with respect to the motor housing 131. In detail, the first battery attachment portion 160Ca and the second battery attachment portion 160Cb may be arranged on the intermediate connecting portion 167C such that connection terminal arrangement surfaces of the rechargeable batteries 180a and 180b face toward each other. More specifically, the first battery attachment portion 160Ca and the second battery attachment portion 160Cb may be arranged symmetrically with respect to the axis X1 along which the motor shaft (not shown in the FIGS.) extends. In detail, the first battery attachment portion 160Ca may be arranged on one side of the axis X1, whereas the second battery attachment portion 160Cb may be arranged on the other side of the axis X1 and be positioned opposite to, i.e. facing, the first battery attachment portion 160Ca. In such a configuration as described here, the first battery attachment portion 160Ca and the second battery attachment portion 160Cb may be arranged such that the motor housing 131 may be held between the connection terminal arrangement surfaces of the rechargeable batteries 180a and 180b.

Thus, when attaching the rechargeable batteries 180a and 180b to the first battery attachment portion 160Ca and the second battery attachment portion 160Cb, the rechargeable batteries 180a and 180b may be inverted relative to an initial position such that the rechargeable batteries 180a and 180b may face each other. The intermediate connecting portion 167C may contain the power controller 118C. Further, the rechargeable batteries 180a and 180b may be both attached to the first and second battery attachment portions 160Ca and 160Cb, respectively, by sliding generally in the up-to-down direction, i.e. downwards from above.

The disc grinder 110C of the fourth embodiment may provide substantially the same function as the disc grinder 110B of the third embodiment described above, i.e. in being directed to machine surfaces, etc. In detail, the first and second battery attachment portions 160Ca and 160Cb of the disc grinder 110C in the fourth embodiment may be arranged in parallel and be adjacent to the motor housing 131. As a result, the weight of the disc grinder 110C with attached the rechargeable batteries 180a and 180b may apply to the front thereof as compared with the disc grinders 110, 110A, and 110B of the first through third embodiments. As a result of such an arrangement, the weight and/or mass of the rechargeable batteries 180a and 180b may be evenly distributed across, for example, a center axis X1 that may extend across the disc grinder 110C in a front-to-rear direction. Accordingly, the disc grinder 110C with an even weight distribution as discussed above, may be preferable when the disc grinder 110C is used for machining operation with a substantial load applied to the tool accessory BB.

The rechargeable batteries 180a and 180b attached to the first and second battery attachment portions 160Ca and 160Cb may be arranged near the electric motor 132 that may be relatively heavy and/or massive. Thus, the close proximity of the rechargeable batteries 180a and 180b to the electric motor 132 may concentrate the weight of the disc grinder 110C around a particular section and/or area, potentially to contribute to enhanced maneuverability and/or operability.

Additionally, as generally similar to the disc grinder 110B of the third embodiment described above, in the fourth embodiment of the disc grinder 110C, the length in the direction in which the rechargeable batteries 180a and 180b may be arranged right-to-left, i.e. with a shorter length of the rechargeable batteries 180a and 180b positioned in the front-to-rear direction as shown in, for example, FIG. 60 battery 180. Further, the shortest dimensions among the external dimensions of the rechargeable battery 180 may extend width wise from the disc grinder 110C, that is from left-to-right when viewing the disc grinder 110C from the rear as shown in FIG. 62. Such a configuration of the rechargeable batteries 180 relative to the disc grinder 110C as a whole as described here may suppress an increase of bulkiness of the disc grinder 110C, and may be further noticed in comparison to the disc grinder 110B that may have the rechargeable batteries 180a and 180b arranged in parallel.

The power controller 118C may be arranged in the intermediate connecting portion 167C to suppress an increase in the size of the disc grinder 110C as a whole. Also in the fourth embodiment, the direction for attaching the rechargeable batteries 180a and 180b to the first and second battery attachment portions 160Ca and 160Cb through sliding may be opposite the direction as shown. Further, the directions for attaching the rechargeable batteries 180a and 180b may be the same, opposite each other and/or any combination of the same.

Fifth Embodiment

Figure 63:
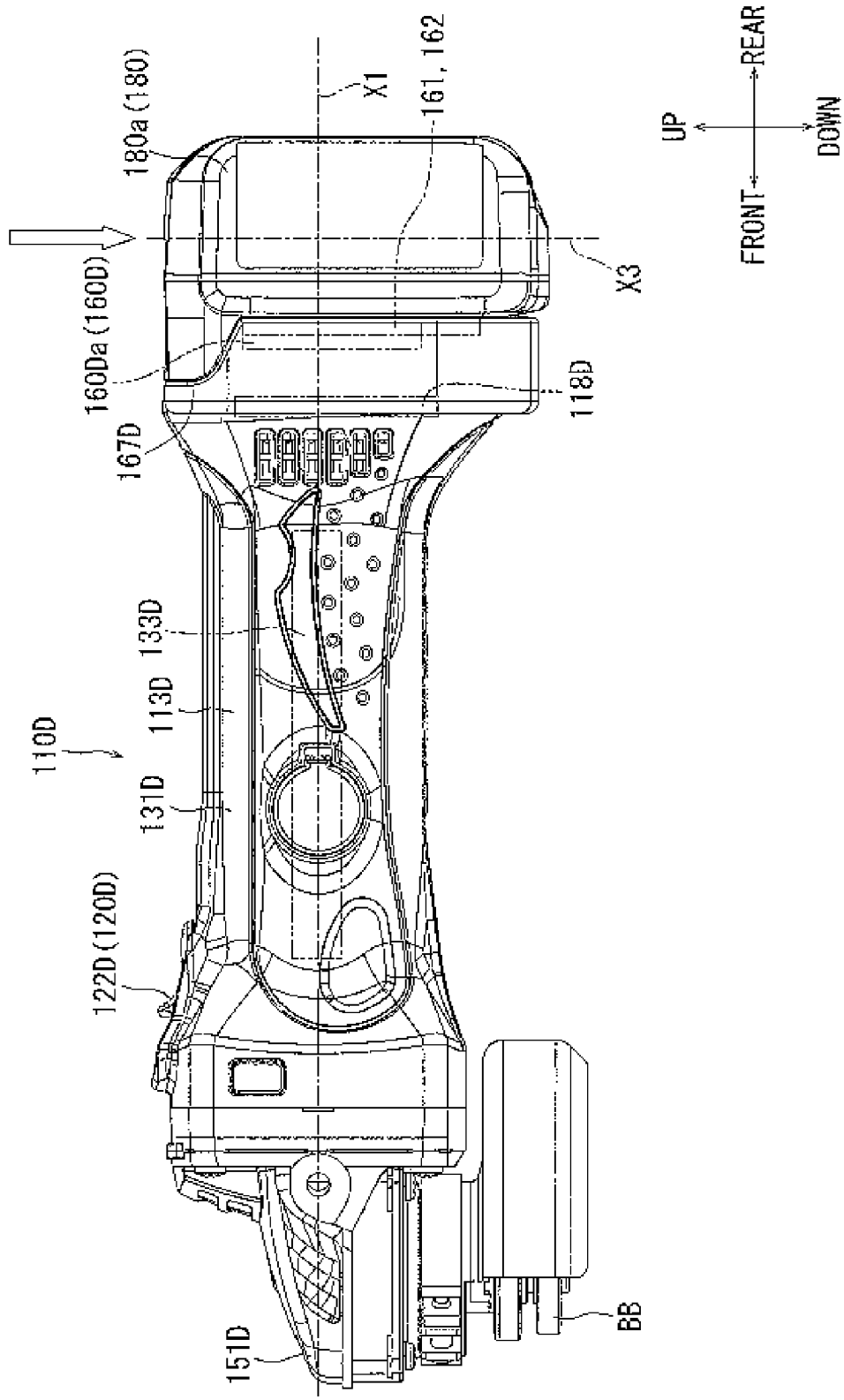
FIG. 63 is a side view of a disc grinder in accordance with a fifth embodiment.
Figure 64:
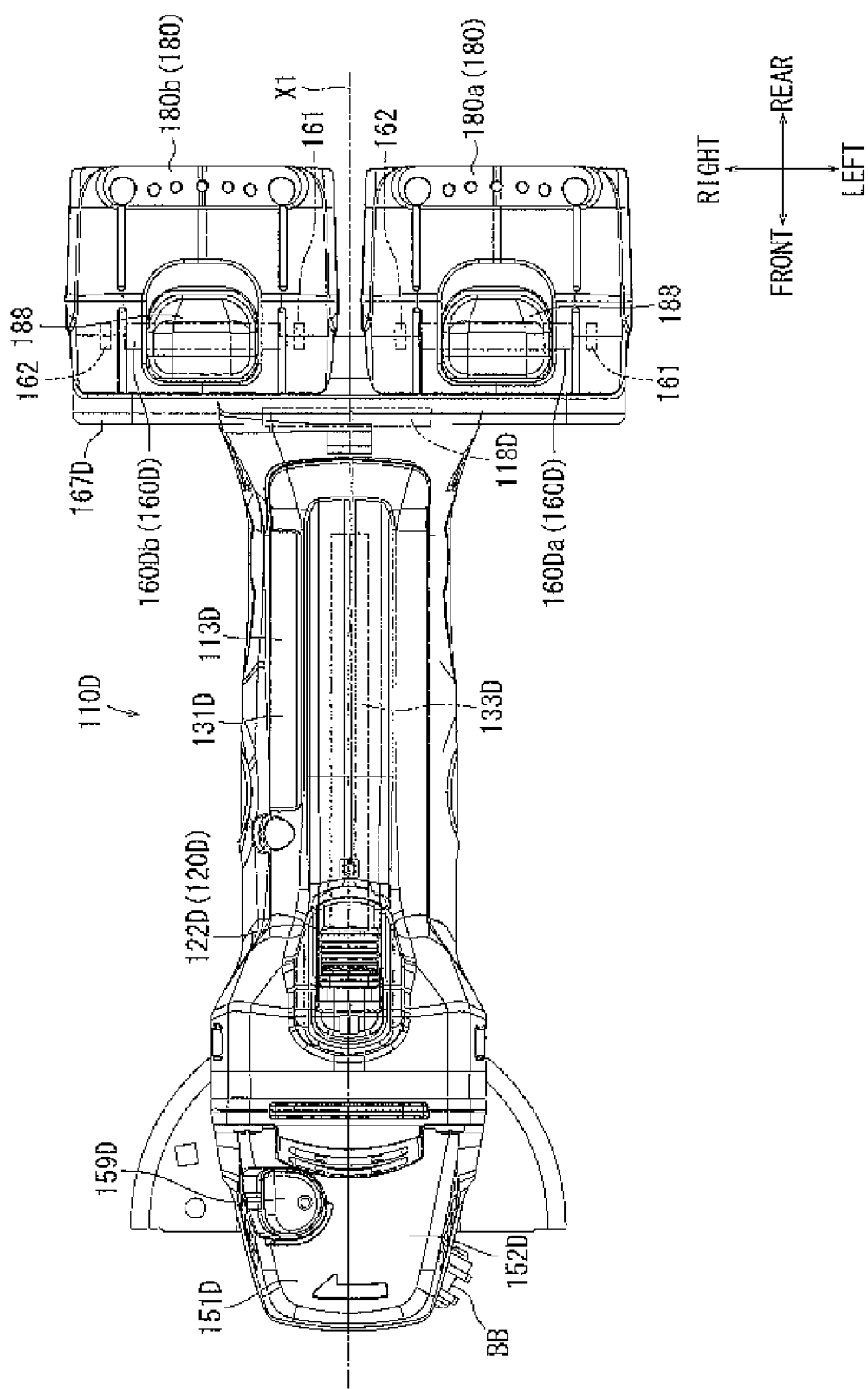
FIG. 64 a plan view, as seen from top, of the disc grinder of FIG. 63.
Figure 65:
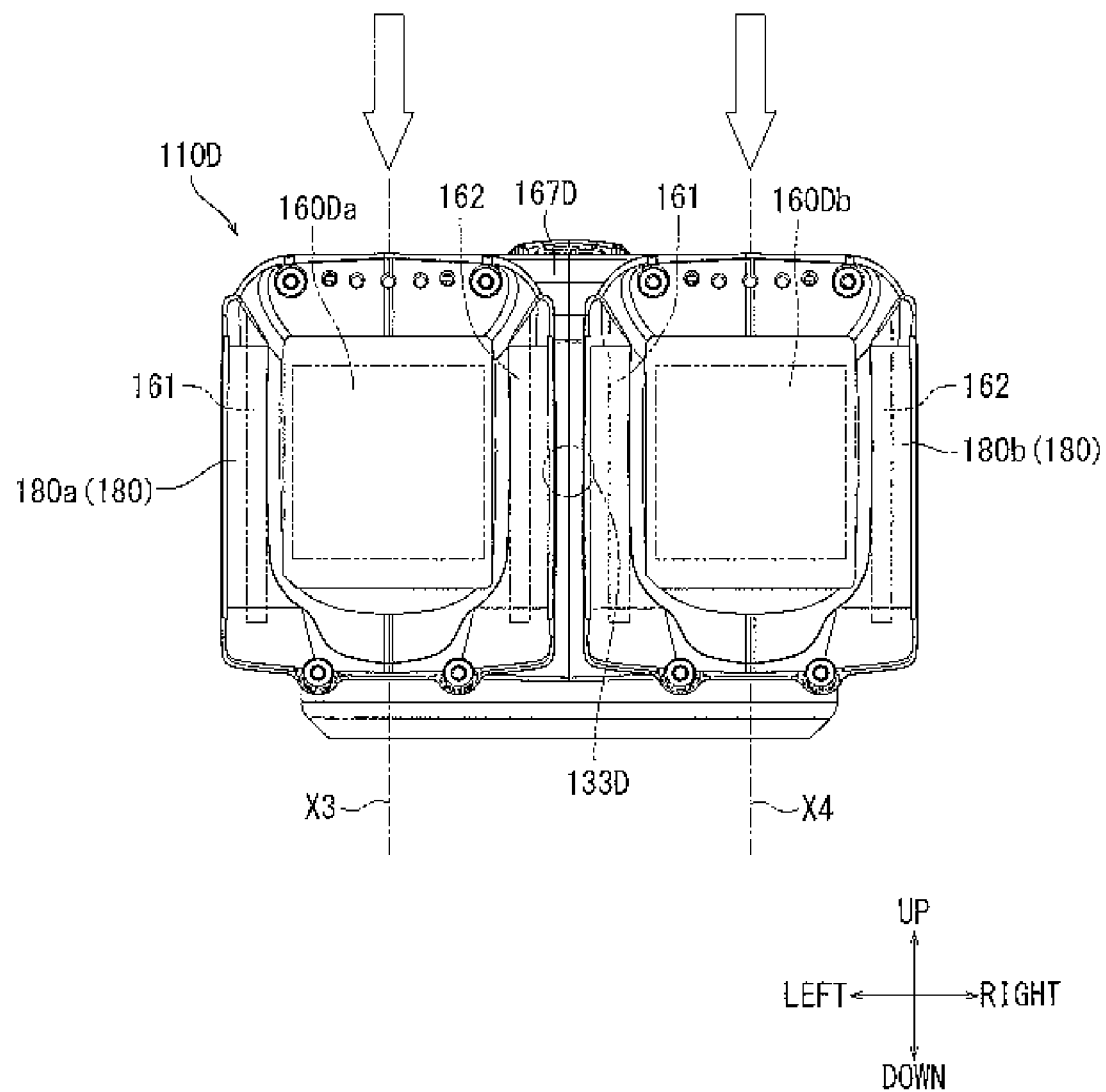
FIG. 65 is a plan view, as seen from behind, of the disc grinder of FIG. 63.

Next, a disc grinder 110D in accordance with the fifth embodiment will be described in further detail. FIG. 63 is a side view illustrating the disc grinder 110D of the fifth embodiment. FIG. 64 is a plan view, as seen from above, of the disc grinder 110C shown in FIG. 63. FIG. 65 is a plan view, as seen from behind, of the disc grinder 110D shown in FIG. 63. The disc grinder 110D shown is a tool to which an appropriate tool accessory BB is attached for cutting, separation, etc.

Unlike the disc grinders 110, 110A, 110B, and 110C described above, the disc grinder 110D may be referred to as a "one-handle type" disc grinder, i.e. which an operator may use by grasping and maneuvering the disc grinder 110D with only one hand. Thus, unlike the disc grinders 110, 110A, 110B, and 110C described above, the disc grinder 110D may be used for machining while the handle portion 113D is held only by one hand. Accordingly, the disc grinder 110D may be configured to exclude the grip housing 112 of the above embodiment. As shown in FIG. 63, the outer peripheral portion of the motor housing 131D may be formed as the handle portion 113D, which handle portion 113D may be of a straight configuration.

In the disc grinder 110D of the fifth embodiment, portions of substantially the same function as the disc grinder 110 of the first embodiment are indicated by the same reference numerals with a letter "D" attached thereto. Thus, numeral 120D indicates an operation switch, numeral 122D indicates an operation button, numeral 152D indicates a head housing, and symbol BB indicates a tool accessory, and so on. The battery attachment portions 160D of the fifth embodiment may be arranged at a rear end of the disc grinder 110D. More particularly, a first battery attachment portion 160Da and a second battery attachment portion 160Db may be arranged in parallel and deviated in the right-left direction with respect to a rear end extension portion 167D.

The rechargeable batteries 180*a* and 180*b* may both be attached to the first and second battery attachment portions 160Da and 160Db through sliding in the up-to-down direction, i.e. downwards from above. In detail, the rechargeable batteries 180*a* and 180*b* may be attached to the first and second battery attachment portions 160Da and 160Db by sliding in the same direction and parallel to each other. The first and second battery attachment portions 160Da and 160Db may be arranged symmetrically, i.e. side-by-side, with respect to the extending direction of an axis X1 of a motor shaft 133D, where each the first and second battery attachment portions 160Da and 160Db may be oriented generally vertically as shown in FIG. 63. Reference numeral 118D indicates the power controller. Also, in this embodiment, the disc grinder 110D may be configured to receive power supplied by the rechargeable batteries 180*a* and 180*b* based on the conceptual circuit diagram of FIG. 53 via the first and second battery attachment portions 160Da and 160Db. Further, power, i.e. electric current, may be configured to be delivered with a pre-set voltage of, i.e.; 18 V+18 V=36 V.

The disc grinder 110D of the fifth embodiment may produce the following results. According also to the disc grinder 110D, two rechargeable batteries 180 (180*a* and 180*b*) may be attached through two battery attachment portions 160D (60Da and 60Db). In this configuration, power supply for using the disc grinder 110D may have high voltage and/or large supply capacitance to comply with request. In detail, supply power may be attain 36V by using, for example, two general-purpose rechargeable batteries 180 that may supply 18V. In the configuration as described here, the disc grinder 110A may be a high-powered type that requires a relatively high voltage while using general-purpose rechargeable batteries 180. Further, in the disc grinder 110D of the fifth embodiment, the two battery attachment portions 160Da and 160Db are respectively arranged at positions symmetrical with respect to the axis X1 of the motor shaft 133D. Such a symmetrical arrangement of the battery attachment portions 160Da and 160Db may evenly distribute the weight and/or mass of the rechargeable batteries 180*a* and 180*b* attached to the disc grinder 110D to, for example, suppress deterioration in the maneuverability of the disc grinder 110D when the disc grinder 110D may be used for machining while held by hand.

Also in connection with the fifth embodiment of the disc grinder 110D, the length in the direction in which the rechargeable batteries 180*a* and 180*b* may be arranged may be combined, to, for example, double the width, i.e. distance W (not shown in FIG. 64), when viewed in a right-to-left direction of the rechargeable battery 180. In detail, the relatively shorter (i.e. width) dimensions from among the external dimensions of the rechargeable battery 180 may be combined to define, for example, a widest cross-section of the disc grinder 110D. Such a configuration and/or orientation as that described here may suppress an increase of bulkiness of the disc grinder 110D as may be caused by the rechargeable batteries 180*a* and 180*b* when, for example, arranged in parallel as shown in connection with one or more of the earlier discussed embodiments. Further, the configuration of the rechargeable batteries 180*a* and 180*b* shown by the fifth embodiment here may also suppress deterioration in maneuverability when, for example, performing a machining with the disc grinder 110D by hand. Also in the fifth embodiment, the direction for attaching the rechargeable batteries 180*a* and 180*b* to the first and second battery attachment portions 160Da and 160Db by sliding may be opposite the direction as shown. Further, the directions for attaching the rechargeable batteries 180*a* and 180*b* may be the same, opposite each other and/or any combinations of the same.

The electric tool in accordance with the present invention may not be restricted to a disc grinder as in the above-described embodiments. For instance, configuration, orientation and/or construction of that disclosed by the above embodiments may be incorporated and/or included as appropriate into any other hand-held electric tool that may be held by hand to complete, for example, a machining operation. For example, the above embodiments may be applicable to various other types of hand-held electric tools such as a disc sander, a polisher, and a multi-tool for grinding, cutting, polishing, glazing, etc. Further, the rechargeable batteries 180*a* and 180*b* as discussed in connection with the above embodiments may be set to a voltage of 18 V. However, in other, alternative embodiments the voltage of the rechargeable batteries may be set to a voltage other than 18V. Rechargeable batteries (i.e. secondary batteries) designed for appropriate voltages such as 10 V and 14 V may be used.

Moreover, power supplied from the two rechargeable batteries 180*a* and 180*b* may be used not only for enhancing voltage, but also for enhancing supply capacitance (i.e. a total recharging amount). Accordingly, the present invention may not be restricted to configurations and/or constructions for enhancing the voltage of the power supplied from the rechargeable batteries 180, but also to configurations and/or constructions for enhancing the supply capacitance of the power supplied from the rechargeable batteries 180. Also, the voltage of the rechargeable batteries may not be restricted to that of the embodiments, but may be set at some other system-appropriate voltage such as 10 V and/or 14 V.

In the above-described embodiments, the bevel gear 154 may be rotated by the pinion gear 145 that is fixed to the motor shaft 133. As described and/or shown by the FIGS., the angle made by the motor shaft 133, functioning the rotation shaft of the pinion gear 145, and the output shaft 155 functioning the rotation shaft of the bevel gear 154 may be each set to 90 degrees. Electric tools in accordance with the embodiments should not be construed restrictively as such a configuration, but the output shaft 155 may be driven via a plurality of shafts from the motor shafts 133. Moreover, the output shaft 155 may be driven by an appropriate swinging mechanism provided between the motor shaft 133 and the output shaft 155. In detail, in the electric tool according to the present invention, it may only be necessary for the motor shaft 133 to drive the output shaft 133 in an appropriate mode, where one or more appropriate modes may be used as necessary, such as rotation, swinging, reciprocation and/or other modes of driving.

What is claimed is:

1. An electric tool comprising:
   a main tool body with a front portion and a rear portion positioned opposite to the front portion wherein the main tool body houses a motor configured to receive electricity to be driven;
   a gear head coupled with the front portion of the main tool body wherein the gear head has a spindle in communication with a motor axis of the motor via mesh-engagement of bevel gears associated with the motor axis wherein the spindle has a cutter tool accessory attached thereto and further wherein rotation of the motor axis produces a commensurate rotation of the cutter tool accessory;
   a plurality of battery attachment portions associated with the rear portion of the main tool body wherein the plurality of battery attachment portions is configured to receive a corresponding set of batteries which provide electricity to power the motor;

a support protrusion integrally formed with the main tool body to extend outwardly from the main tool body; and a leg associated with the rear portion of the electric tool wherein the leg is tiltably connected to the support protrusion such that the leg tilts to be positioned at an angle relative to the main tool body.

2. The electric tool of claim 1 wherein the cutter tool accessory is configured rotate around a spindle axis positioned orthogonal to the motor axis of the motor.

3. The electric tool of claim 1 wherein the plurality of battery attachment portions includes two battery attachment portions.

4. The electric tool of claim 1 wherein the plurality of battery attachment portions is configured such that a battery of the corresponding set of batteries can be attached in a longitudinal state in which a longitudinal direction of each of the batteries extends vertically parallel to an axis of the spindle.

5. The electric tool of claim 4 wherein the plurality of battery attachment portions is configured so that the batteries can be attached to be arranged horizontally side-by-side relative to the motor axis.

6. The electric tool of claim 1 wherein the plurality of battery attachment portions is configured such that the corresponding set of batteries can be attached to and detached from the plurality of battery attachment portions by sliding the batteries in a vertical direction parallel to an axis of the spindle.

7. The electric tool of claim 1 wherein the plurality of battery attachment portions is configured such that the corresponding set of batteries can be attached to the plurality of battery attachment portions, wherein attachment surfaces of the battery attachment portions are positioned to face each other.

8. The electric tool of claim 1 wherein the motor is configured to be powered by electricity having a voltage rating of 36V.

9. The electric tool of claim 1 wherein each battery of the corresponding set of batteries is connected in a series to provide a total system voltage calculated as the sum of the voltage ratings of each battery of the corresponding set of batteries.

10. The electric tool of claim 1, further comprising:
a controller board C configured to control the electric tool wherein the controller board C is integrated with a power circuit of the motor.

11. The electric tool of claim 10, further comprising:
a microprocessor associated with the controller board C wherein the microprocessor assists in controlling the electric tool, and
a switching element configured to switch between circuitry associated with the controller board C.

12. The electric tool of claim 1, further comprising:
a support protrusion integrally formed with the main tool body to extend outwardly from the main tool body.

13. The electric tool of claim 1, further comprising:
a plurality of connection edges integrally formed at a front end of the leg portion such that the connection edges are parallel to each other to generally form a forked pattern,
wherein the support protrusion is inserted between the connection edges to couple the leg to the main tool body.

14. The electric tool of claim 13 wherein the support protrusion is connected to allow rotation of the leg relative to the main tool body by a connection shaft portion provided between the connection edges.

15. The electric tool of claim 14 wherein the leg portion is connected to the rear portion of the main tool body to be tiltable in a vertical direction.

16. The electric tool of claim 12, further comprising:
a plurality of steel balls retained on side surfaces of the support protrusion such that the plurality of steel balls are retained on the same circular region while being mutually deviated from each other by 180 degrees.

17. The electric tool of claim 13, further comprising:
a plurality of engagement plates wherein each engagement plate of the plurality of engagement plates is superimposed on surfaces of the support protrusion such that the plurality of engagement plates are fixed to the plurality of connection edges.

18. The electric tool of claim 17, further comprising:
a plurality of holes positioned in each engagement plate of the plurality of engagement plates wherein a plurality of steel balls on the support protrusion are fitted into the plurality of holes.

19. The electric tool of claim 1, wherein the leg portion is positioned straight with respect to the main tool body.

20. An electric tool, comprising:
first and second battery attachment portions where each battery attachment portion of the first and second battery attachment portions is configured to receive and connect to a rechargeable battery wherein the rechargeable battery connects with the each battery attachment portion by sliding;
an electric motor in communication with a motor shaft wherein the electric motor receives power supplied from the rechargeable batteries to rotate the motor shaft;
a tool accessory retaining portion driven by the motor shaft; and
a housing with a handle portion formed on a surface of the housing wherein the surface extends length-wise along the motor shaft, wherein
the electric motor is disposed between the first battery attachment portion and the second battery attachment portion,
the first and second battery attachment portions are arranged on the housing in symmetry with respect to an axis of the motor shaft,
the first battery attachment portion is configured so that a first rechargeable battery is slidably attached to the first battery attachment portion from above the first battery attachment portion, and
the second battery attachment portion is configured so that a second rechargeable battery is slidably attached to the second battery attachment portion from above the second battery attachment portion.

21. The electric tool of claim 20, wherein:
the first battery attachment portion is configured so that a first rechargeable battery is slidably attached to the first battery attachment portion,
the first rechargeable battery includes a first connection terminal arrangement surface,
the second battery attachment portion is configured so that a second rechargeable battery is slidably attached to the second battery attachment portion,
the second rechargeable battery includes a second connection terminal arrangement surface, and the first and second battery attachment portions are arranged such that the first connection terminal arrangement surface and the second connection terminal arrangement surface face toward each other.

22. An electric tool, comprising:

first and second battery attachment portions where each battery attachment portion of the first and second battery attachment portions is configured to receive and connect to a rechargeable battery wherein the rechargeable battery connects with the each battery attachment portion by sliding;

an electric motor in communication with a motor shaft wherein the electric motor receives power supplied from the rechargeable batteries to rotate the motor shaft;

a tool accessory retaining portion driven by the motor shaft, the tool accessory retaining portion being positioned orthogonal to the motor shaft; and a handle portion having an outer shape that extends length-wise along the motor shaft, wherein the first battery attachment portion and the second battery attachment portion are arranged at a rear end of the handle portion, wherein the first and second battery attachment portions are arranged on the housing in left-right symmetry with respect to an axis of the motor shaft, and wherein the each battery attachment portion is configured so that each of the rechargeable batteries is slidably attached to the each battery attachment portion from above the each battery attachment portion.

* * * * *